(12) United States Patent
Oki et al.

(10) Patent No.: US 7,313,328 B2
(45) Date of Patent: Dec. 25, 2007

(54) NODE USED IN PHOTONIC NETWORK, AND PHOTONIC NETWORK

(75) Inventors: Eiji Oki, Tokyo (JP); Wataru Imajuku, Yokohama (JP); Kohei Shiomoto, Iruma (JP); Naoaki Yamanaka, Tokyo (JP); Daisaku Shimazaki, Tokorozawa (JP); Naohide Nagatsu, Yokosuka (JP); Yoshihiro Takikawa, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 816 days.

(21) Appl. No.: 10/374,053

(22) Filed: Feb. 25, 2003

(65) Prior Publication Data

US 2003/0161633 A1 Aug. 28, 2003

(30) Foreign Application Priority Data

| Feb. 28, 2002 | (JP) | ............................ 2002-053184 |
| Apr. 2, 2002 | (JP) | ............................ 2002-100186 |
| May 8, 2002 | (JP) | ............................ 2002-133074 |
| May 9, 2002 | (JP) | ............................ 2002-134091 |
| May 9, 2002 | (JP) | ............................ 2002-134459 |

(51) Int. Cl.
*H04J 14/00* (2006.01)
*H04B 10/00* (2006.01)

(52) U.S. Cl. ............................ 398/51; 398/51; 398/54; 398/57

(58) Field of Classification Search ................ 370/404, 370/232, 310; 398/57

See application file for complete search history.

(56) References Cited

U.S. PATENT DOCUMENTS 6,671,254 B1 12/2003 Nakahira (Continued)

FOREIGN PATENT DOCUMENTS

EP 1 152 631 A2 11/2001

(Continued)

OTHER PUBLICATIONS

J. Moy, "OSPF Version 2", IETF RFC 2328, pp. 1-244, Apr. 1998.

(Continued)

*Primary Examiner*—Jason Chan
*Assistant Examiner*—Danny Wai Lun Leung
(74) *Attorney, Agent, or Firm*—Harness, Dickey & Pierce, P.L.C.

(57) ABSTRACT

A multi-layer photonic network and nodes used therein are provided. The multi-layer photonic network comprises a packet network which performs switching and transfer in packet units, and a photonic network comprising optical transmission lines and photonic switches, and which accommodates the packet network. The multi-layer photonic network also has a two layer structure of optical wavelength links (O-LSPs) and packet links (E-LSPs). The O-LSPs are constituted by the optical transmission lines and comprise optical wavelength switching capability (LSC) which is capable of switching in optical wavelength units and packet switching capability (PSC) which is capable of switching in packet units at both their ends. The E-LSPs include the O-LSPs and PSCs at both their ends. Each node includes a section for automatically establishing an O-LSP according to an establishment request for an E-LSP while taking account of path information including path cost, resource consumption, and traffic quantity.

8 Claims, 53 Drawing Sheets

U.S. PATENT DOCUMENTS

| | | | |
|---|---|---|---|
| 6,678,474 B1* | 1/2004 | Masuda et al. | 398/75 |
| 6,708,000 B1* | 3/2004 | Nishi et al. | 398/1 |
| 2001/0037401 A1* | 11/2001 | Soumiya et al. | 709/232 |
| 2002/0005967 A1 | 1/2002 | Suzuki | |
| 2002/0018269 A1 | 2/2002 | Chaudhuri et al. | |
| 2003/0147645 A1 | 8/2003 | Imajuku | |
| 2003/0156536 A1 | 8/2003 | Oki et al. | |

FOREIGN PATENT DOCUMENTS

| | | |
|---|---|---|
| JP | 06-334653 | 12/1994 |
| JP | 10-242989 | 9/1998 |
| JP | 2000-232483 | 8/2000 |
| JP | 2001-094606 | 4/2001 |
| JP | 2001-186188 | 7/2001 |
| JP | 2002-026822 | 1/2002 |
| JP | 2002-026990 | 1/2002 |
| JP | 2002-057689 | 2/2002 |
| JP | 2002-535918 | 10/2002 |
| JP | 2003-244217 | 8/2003 |
| JP | 2003-258874 | 9/2003 |
| JP | 2003-258886 | 9/2003 |
| WO | WO-00/44118 | 7/2000 |
| WO | WO-01/86998 | 11/2001 |

OTHER PUBLICATIONS

R. Coltun, "The OSPF Opaque LSA Option", IETF RFC 2370, pp. 1-15, Jul. 1998.

A. Banerjee et al., "Generalized Muliprotocol Label Switching: An Overview of Routing and Management Enhancements", IEEE Communications Magazine, pp. 144-150, Jan. 2001.

A. Banerjee et al., "Generalized Multiprotocol Label Switching: An Overview of Signaling Enhancements and Recovery Techniques", IEEE Communications Magazine, pp. 144-151, Jul. 2001.

K. Kompella et al., "OSPF Extensions in Support of Generalized MPLS", Internet Draft, draft-ietf-ccamp-ospf-gmpls-extensions-08. text (work in progress), pp. 1-12, Aug. 2002.

E. Oki et al., "Heuristic Multi-Layer Optimum Topology Design Scheme Based on Traffic Measurment for IP + Photonic Networks", Proc. of Optical Fiber Communications (OFC) 2002, pp. 104-105, Mar. 2002.

E. Oki et al., "Multi-Layer Traffic Engineering in GMPLS Networks", The Institute of Electronics, Information and Communication Engineers, B-7-118, p. 345, Mar. 2001.

K. Sato et al., "GMPLS-Based Photonic Mulilayer Router (Hiraki Router) Architecture: An Overview of Traffic Engineering and Signaling Technology", IEEE Communications Magizine, vol. 40, No. 3, pp. 96-101, Mar. 2002.

N. Yamanaka et al., "Traffic Engineering and Signaling Technologies in Photonic-GMPLS-Router Networks", 2002 Workshop on High Performance Swithcing and Routing, pp. 142-146, May 2002.

K. Shiomoto et al, "Dynamic Multi-Layer Traffic Engineering in GMPLS Networks", Proc, World Telecommunications Congress 2002, Paris France, Sep. 2002.

E. Oki et al., "Impact of Multimedia Traffic Characteristics on ATM Network Configuration", Journal of Network Systems Management, vol. 6. No. 4, pp. 377-398 1998.

K. Shiomoto et al., "Dynamic Multi-Layer Traffic Engineering in MPLambdaS Networks—The Format of Technical Report (Subtitle)", Technical Report of IEICE, PS2002-10, pp. 55-60, Apr. 2002.

E. Oki et al., "Impact of Multimedia Service Requirements on ATM-VC Network Configurations", The Institute of Electronics, Information and Communication Engineers, Technical Report of IEICE, SSE94-241, IN94-183, pp. 31-36, Mar. 1995.

K. Shimano et al., "MPLambdaS Demonstration Employing Photonic Routers (256×256 OLSPs) to Integrate Optical and IP Networks", Technical Digest of NFOEC'2001, vol. 1, pp. 5-13, Jul. 2001.

"Network Control and Management for the Next Generation Internet", Wei et al., IEICE Transactions on Communications, Communications Society, Tokyo, Japan, Oct. 2000, pp. 1-29.

"Integration Strategies for IP over WDM", Ghani, Optical Networking Workshop, Jan. 2000, pp. 1-12.

"Channel Provisioning for Higher-Layer Protocols in WDM Networks", Ghani, et al., Proceedings of the SPIE, SPIE, Bellingham, VA, vol. 3843, 1999, pp. 22-32.

Japanese Office Action dated Nov. 22, 2005 issued on Japanese Patent Application No. 2002-134459.

"A Study of Dynamic Optical Path Set-up Policy in Photonic-MPLS Network", Proceedings of the 2002 IEICE General Conference, Communications 2, Japan, The Institute of Electronics, Information and Communication Engineers, Mar. 7, 2002, p. 506.

"A QoS Routing for Efficient Failure Recovery", Technical Report of IEICE, vol. 100, No. 19, IN2000-11, Japan, The Institute of Electronics, Information and Communication Engineers, Apr. 21, 2000, pp. 19-24.

Japanese Office Action dated Nov. 29, 2005 issued on Japanese Patent Application No. 2002-134091.

"A Study of the GMPLS Control Architecture for IP Photonic Networks", Technical Report of IEICE (NS2001-180), The Institute of Electronics, Information and Communication Engineers, vol. 101, No. 508, pp. 61-66, Dec. 10, 2001.

Draft-many-ip-optical-framework-03.txt.

Draft-prs-optical-routing-01.txt.

Draft-suemura-gmpls-restoration-signaling-00.txt.

Draft-suemura-protection-hierarchy-00.txt.

Draft-ietf-mpls-lsp-hierarchy-05.txt.

Japanese Office Action dated Nov. 29, 2005 issued on Japanese Patent Application No. 2002-133074.

Office Action issued on Oct. 11, 2005, on JP-2002-53184.

Office Action issued on Apr. 4, 2006, on JP-2002-53184.

K. Zhu and B. Mukherjee, Dynamic Traffic Grooming in Optical WDM Mesh Networks with Distributed Control, Proceedings of Asia Pacific Optical and Wireless Communication Conference (APOC), Nov. 2001.

* cited by examiner

ADD ONE O-LSP TO ARRIVAL NODE

ADD ONE O-LSP TO DISPATCH NODE

ADD TWO O-LSPS TO ARRIVAL NODE

ADD TWO O-LSPS TO DISPATCH NODE

ADD TWO O-LSPS TO DISPATCH NODE
AND TO ARRIVAL NODE

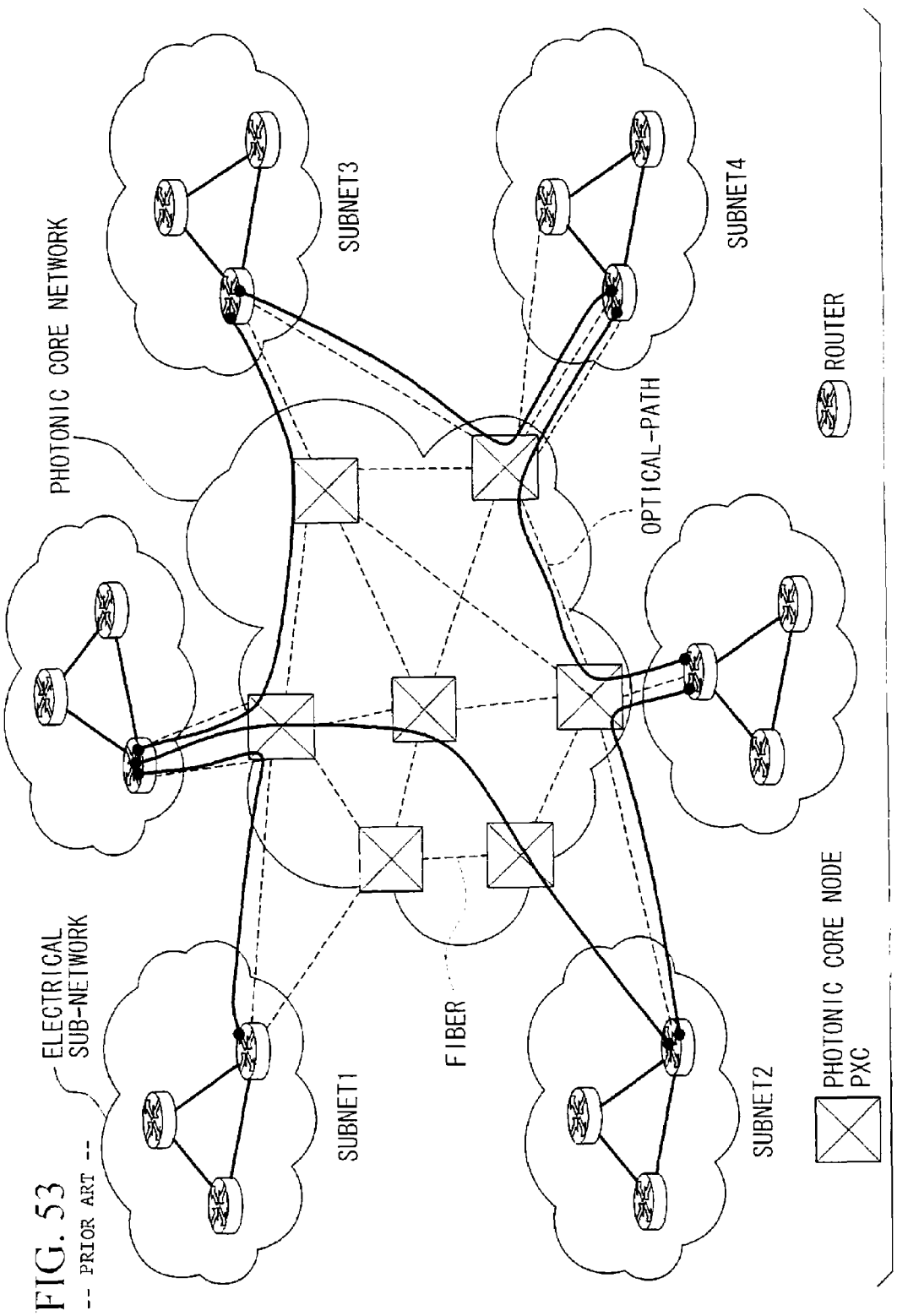
FIG. 53 -- PRIOR ART --

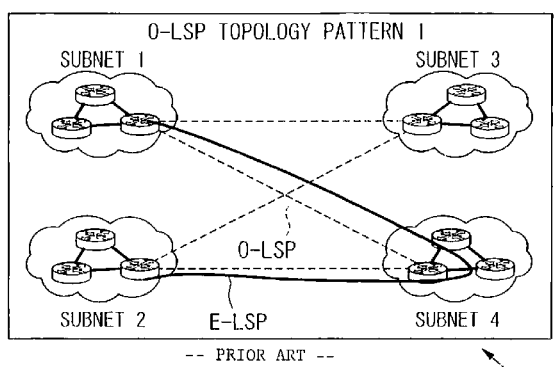
FIG. 54B
-- PRIOR ART --
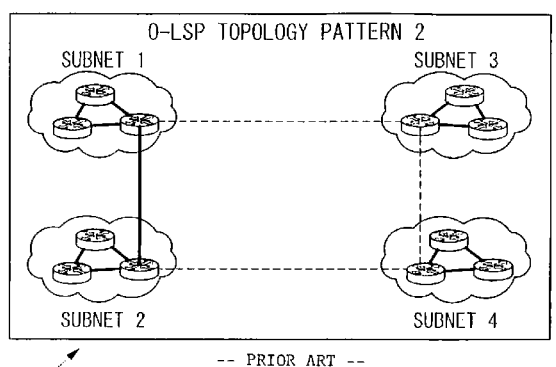
FIG. 54C
-- PRIOR ART --
FIG. 54A
-- PRIOR ART --
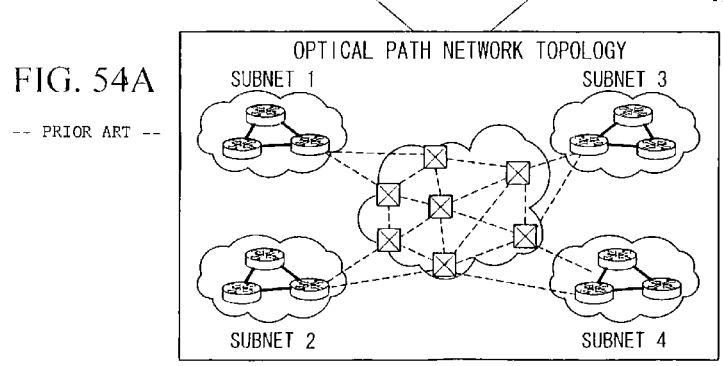

-- PRIOR ART --

-- PRIOR ART --

NODE USED IN PHOTONIC NETWORK, AND PHOTONIC NETWORK

BACKGROUND OF THE INVENTION

1. Field of the Invention

The present invention relates to a photonic network of a multi-layered structure comprising optical paths upon optical wavelengths and electrical paths which use the optical paths.

Furthermore, the present invention relates to a path establishment method in a multi-layer photonic network, which is required for implementing cooperative operation of a high capacity photonic path network which is implemented with photonic cross connect devices, and a service network which is implemented with Layer 2/3 switches, which typically are IP routers or the like.

Furthermore, the present invention is applicable to a multi-layer photonic network which is an electrical/optical path integrated communication network. In particular, the present invention concerns the technical field of traffic engineering related to methods and procedures for establishing and releasing optical paths dynamically according to traffic quantities between sub-networks.

The present application is based upon patent applications Ser. Nos. 2002-53148, 2002-100186, 2002-133074, 2002-134091, and 2002-134459 filed in Japan, the contents of which are incorporated herein by reference.

2. Description of the Related Art

There is a per se known type of photonic network which comprises a plurality of sub-networks which perform switching and transfer by units of packets, optical transmission lines which connect these sub-networks, and nodes which terminate these optical transmission lines.

With this type of photonic network, at both ends of each of the optical wavelength links which are each made up from an optical transmission line and two of the nodes, there are respectively provided an optical wavelength switching capability (abbreviated as "LSC") which is the capability of switching by optical wavelength units, and a packet switching capability (abbreviated as "PSC") which is the capability of switching by packet units. Furthermore, optical wavelength links (abbreviated as "O-LSPs") which are provided with LSC at both their ends are included in packet links (abbreviated as "E-LSPs") which are provided with PSC at both their ends.

Since this type of photonic network possesses such a two-layered structure including both O-LSPs and E-LSPs, it is termed a multi-layer photonic network. Since when performing IP transfer of packets with this type of multi-layer photonic network, the transmission upon some intermediate paths is performed as optical signal packets by O-LSPs. Accordingly, as compared with the case of the transfer along the entire path being performed as electrical signal packets, it is possible to obtain the great variety of beneficial effects which an optical transmission line possesses, such as being able to have great transmission speed and/or multiplicity.

However, with a conventional multi-layer photonic network, the O-LSPs and the E-LSPs are managed independently, so that it is not possible to modify the O-LSPs freely according to the demand upon the E-LSPs or the traffic fluctuation.

In other words, since each of the O-LSPs operates fixedly via a common carrier leased line or the like, there are the problems that their provision cannot respond to the fluctuations of the packet traffic immediately, and that it is not possible efficiently to make the best possible use of the O-LSP resources. Furthermore there is the problem that when varying the O-LSP provision, it is necessary to make application to the photonic network administrator, and it is also necessary for the photonic network administrator to change over and establish the O-LSPs manually, and the like.

In addition although it is possible for each node to calculate a path in its own most efficient manner by every node in the photonic network having the same path establishment information, this is troublesome, because it is not necessary to advertise the information regarding a path which is established in order to respond to temporary increase in traffic, to all of the nodes.

And, as described above, a photonic network is constructed using an optical transmission line and nodes which terminate this optical transmission line.

In these nodes, there is a PSC in which the optical signal packets which are transferred upon this optical transmission line are temporarily converted into electrical signal packets and their header information is read in, and they are again converted back into optical signal packets of the optical wavelengths which correspond to their destination paths and are transferred, and also there is an LSC in which transfer of the optical signal packets which are transferred upon the optical transmission line is performed based upon the optical wavelengths of the optical signals just as they are.

Furthermore, normally, a plurality of sub-networks are connected to the photonic network, and these sub-networks are mutually interconnected by electrical paths.

These electrical paths include one or a plurality of optical paths belonging to the photonic network.

However, with a conventional photonic network, the optical paths and the electrical paths are managed independently, and it has not been possible freely to vary the optical paths according to the demand for the electrical paths or the fluctuations of traffic or the like.

Furthermore, since the optical paths have been fixedly established, there have been the problems that it has not been possible to respond to the fluctuations in packet traffic immediately, and that it has not been possible efficiently to make best use of the optical path resources.

Yet further there has been the problem that, when changing an optical path, it is necessary to make application to the photonic network administrator, and for the photonic network administrator to change over the optical path manually, so that the working efficiency has been bad.

And, due to the increase in recent years of data communication traffic such as the Internet and the like, node devices have progressively been introduced which at the present have a throughput in the Tbit/sec range, and it is anticipated that in the near future the next generation of devices will have throughputs of 10 to 100 Tbits/sec or greater.

As a means for implementing a node device which possesses this order of large scale transfer capability, there is a powerful type of photonic router which operates together both packet switching (PSC: Packet Switch Capable) for processing TCP/IP packets, which is the mainstream communication protocol upon the Internet, and also photonic switching (LSC: Lambda Switch Capable) for routing an optical path (for documentation, refer to: K. Shimano, A. Imaoka, Y. Takigawa, and K.-I. Sato, Technical Digest of NFOEC 2001, vol. 1, p. 5, July 2001).

By using such a photonic router, it becomes possible more closely to cooperate a conventional type of IP network which operates by packet switching (PSC), and a high capacity photonic path network (hereinafter termed a photonic network) which operates by optical switching (LSC).

However, when operating the above described IP network and photonic network together by using a conventional node device of the type already described, there is the important aspect that the method of newly establishing an autonomous optical path should make efficient use of network resources.

And researches have recently been commenced to be performed in relation to a so-called network construction for making the subordinate network (the IP network) and the superior network (the photonic network) both operate dynamically and also autonomously and in a distributed manner, and for making them operate together; and normally, as has already been explained, the optical paths are fixed, and no scheme has as yet been implemented of establishing new optical paths dynamically while tracking packet traffic fluctuation.

As a means for constructing the above type of high capacity network, the study and development of multi-layer photonic networks has recently progressed remarkably.

FIG. 53 shows a multi-layer photonic network. The multi-layer photonic network shown in FIG. 53 comprises a photonic core network and several electrical packet switching sub-networks.

The multi-layer photonic network of FIG. 53 is a multi-layered network, in which optical paths are established over the photonic core network, while electrical path switching sub-network groups which are connected together by these optical paths constitute the overall structure of the electrical packet switching network.

The photonic core network comprises a plurality of photonic cross connects (PXCs) and a plurality of optical fiber cables which link between these PXCs. The PXCs at the boundaries between each of the electrical packet switching sub-networks and the photonic core network are mutually connected with both these networks by optical fiber links.

The optical paths by optical fiber cables are established over the photonic core network, and mutually connect together different ones of the electrical packet switching sub-networks. Information is transparently transferred between the different electrical packet switching sub-networks over these optical paths.

It is possible to change over virtually the topology of the overall electrical packet switching network according to which of the electrical packet switching networks are mutually connected together.

FIGS. 54A to 54C show a state of affairs in which it is possible to implement two types of electrical packet switching network topology (FIGS. 54B and 54C) when a single optical path network topology has been provided (FIG. 54A).

Furthermore, an explanation of the hierarchy of the optical paths and the electrical paths will be provided with reference to FIGS. 54A to 54C.

In FIGS. 54A to 54C, the optical paths are denoted by the symbol O-LSP, while the electrical paths are denoted by the symbol E-LSP. The E-LSPs are routed upon the overall electrical packet switching network which is made up from the electrical packet switching sub-networks which are mutually connected together by the O-LSPs. In the O-LSP topology pattern #1 shown in FIG. 54B, the E-LSPs are connected together in multiple hop routing.

In other words, two of the electrical packet switching sub-networks are connected together via two of the O-LSPs in series. By contrast to this, in the O-LSP topology pattern #2 shown in FIG. 54C, the E-LSPs are connected together with a single hop.

In other words, two of the electrical packet switching sub-networks are connected together via a single one of the O-LSPs.

The overall electrical packet switching network must possess a "connected" structure, in the terminology of graph theory.

In other words, although it is necessary for all of the electrical packet switching sub-networks to be mutually connected together via O-LSPs, nevertheless it is not necessary for each of the electrical packet switching sub-networks to be directly connected to each of the others by some single O-LSP; they may be connected together in multiple hop routing.

FIGS. 55A to 55C show a connected electrical packet switching network (FIG. 55B), and a non-connected electrical packet switching network (FIG. 55C).

In the connected electrical packet switching network shown in FIG. 55B it is possible for all of the four electrical packet switching sub-networks (Subnets 1 through 4) to mutually communicate via O-LSPs, but in the non-connected electrical packet switching network shown in FIG. 55C it is only possible for three of the electrical packet switching sub-networks (Subnets 1, 2, and 4) to be mutually connected together via O-LSPs, while the other one of the electrical packet switching sub-networks (Subnet 3) cannot mutually communicate with these three electrical packet switching sub-networks via any O-LSP.

Electrical packet exchange within the E-LSPs is performed according to labels by MPLS (Multi Protocol Label Switching).

The conventional type BXCQ scheme has been known as a means for solution of the dynamic optical path topology optimization problem, which is one part of the problem which the present invention seeks to address.

As documentation related to this BXCQ technique, there may be cited "The influence exerted by multi media service characteristics upon ATM-VC network structure", by Eiji Ohki and Naoaki Yamanaka, Technical Report of IEICE, SE94-241 IN94-183, March 1995.

And, FIG. 56 shows an example in which the four electrical packet switching sub-networks shown in FIG. 53 are mutually connected together.

The electrical packet switching sub-network 1 is directly connected to the electrical packet switching sub-networks 2 and 3 by optical paths; and, similarly, the electrical packet switching sub-network 2 is connected directly to the electrical packet switching sub-networks 1 and 4 by optical paths, the electrical packet switching sub-network 3 is connected directly to the electrical packet switching sub-networks 1 and 4 by optical paths, and the electrical packet switching sub-network 4 is connected directly to the electrical packet switching sub-networks 2 and 3 by optical paths. And, for transfer of packets from the electrical packet switching sub-network 1 to the sub-network 4, it is possible for them to pursue a multiple hop path from the electrical packet switching sub-network 1 to the electrical packet switching sub-network 2 and thence to the electrical packet switching sub-network 4 by multi-hop routing; or, alternatively, they may pursue a multiple hop path from the electrical packet switching sub-network 1 to the electrical packet switching sub-network 3 and thence to the electrical packet switching sub-network 4.

FIG. 57 shows an example in which, just as in FIG. 56, the four electrical packet switching sub-networks shown in FIG. 53 are mutually connected together, but in this case optical paths are established along diagonal paths between the electrical packet switching sub-networks 1 and 4, and between the electrical packet switching sub-networks 2 and 3.

In FIG. 53 and FIG. 57, an electrical border router upon the boundary of each of the electrical packet switching sub-networks is provided with two electrical packet transmission/reception ports connected to the photonic core network.

Which of the electrical border routers should be mutually directly connected together by optical paths via the two electrical packet transmission/reception ports which are provided to these border routers, is decided according to the traffic between the various electrical packet switching sub-networks.

If the traffic along the paths shown by the diagonal lines is low, the configuration shown in FIG. 56 is the most advantageous one; while, on the contrary, if this diagonal traffic is high, then the configuration shown in FIG. 57 is the most advantageous one.

If the optical paths are established without any consideration of the quantity of the traffic, then, for example, it may be the case that no direct optical path is established between some pair of the electrical packet switching sub-networks between which the packet transfer traffic is heavy, and then a necessity may arise for such packet transfer to be performed by multiple hop routing, which may lead to occurrence of the problem of congestion arising upon the optical paths.

The mutual traffic quantities between the electrical packet switching sub-networks can be determined by counting the number of packets which flow over the E-LSPs, or by counting the number of bytes in the packets.

The mutual traffic between all of the electrical packet switching sub-networks can be expressed in the form of a matrix, and this is termed the traffic matrix.

An example of a traffic matrix is shown in FIG. 58. In this FIG. 58 example, there is shown a traffic matrix for a network which is made up of N electrical packet switching sub-networks, and the (i,j)-th component of the matrix represents the quantity of traffic between the electrical packet switching sub-networks i and j.

The traffic varies with time, so that, even after an optical path has been established for the time being, it may later become necessary dynamically to re-establish the optical path according to the current conditions.

However, it is not desirable for the work of maintaining the overall network to be unduly increased, due to the job of establishing the optical paths according to traffic fluctuations in this way being performed manually.

SUMMARY OF THE INVENTION

The present invention has been conceived against this background, and it takes as its objective to propose a multi-layer photonic network, a node, a program, a recording medium, and a path establishment method with which efficient operation can be anticipated, by each node calculating the most suitable paths and automatically establishing O-LSPs and E-LSPs.

Accordingly, the present invention is distinguished by the fact that the path establishment for the O-LSPs is controlled by the nodes of the E-LSPs which include the O-LSPs.

By doing this, path establishment for O-LSPs as occasion may require is performed according to the traffic conditions upon the nodes of the E-LSPs, so that it is possible to implement efficient management of a multi-layer photonic network.

Thus, the first aspect of the present invention is a multi-layer photonic network, comprising a plurality of sub-networks which perform switching and transfer in units of packets, optical transmission lines which are connected between these sub-networks, and nodes which terminate these optical transmission lines; and having a two layer construction consisting of O-LSPs provided with LSC at both their ends, and E-LSPs which include the O-LSPs and have PSC at both their ends, and wherein, at both ends of the optical wavelength links which are constituted by the optical transmission lines and the nodes, there are provided both LSC which is capable of switching in units of optical wavelengths and also PSC which is capable of switching in units of packets.

In this way, the distinguishing feature of the present invention is that there is provided a section which automatically establishes a path for an O-LSP according to an establishment request for an E-LSP while taking account of path information which includes path cost, resource consumption, and traffic quantity.

Furthermore, the second aspect of the present invention is a node which is applied in the multi-layer photonic network of the present invention, and which is particularly distinguished by comprising a section which automatically establishes a path for the O-LSP according to an establishment request for the E-LSP while taking account of path information which includes path cost, resource consumption, and traffic quantity.

In this manner, with the multi-layer photonic network of the present invention, it is possible to perform efficient network operations, since it is possible to establish the necessary paths, in response to the generation of traffic, while taking account of path information which includes path cost, resource consumption, and traffic quantity.

It is desirable for the establishment section to comprise: a calculation section, provided to the node which requests establishment of the E-LSP, which calculates a path for the O-LSP; and a section, provided to the node on the destination side of the O-LSP, which establishes the path of the O-LSP based upon the result of calculation by the calculation section.

By doing this, it is possible for the node which requests the establishment of an E-LSP conjointly to perform O-LSP path establishment. Accordingly, since it is possible for a user uses an E-LSP to perform even as much as path establishment of an O-LSP which is included therein in response to a request, along with it being possible to enhance the convenience to the user, the network manager is not required himself to perform path establishment of O-LSPs, and furthermore, by the most suitable O-LSP path establishment being provided in response to the traffic conditions of the E-LSP, it is possible to reduce the trouble of O-LSP path establishment, and it is therefore possible to perform multi-layer photonic network management at high efficiency.

Or, the establishment section may comprise a section, provided to the node which requests establishment of the E-LSP, which calculates a path for the O-LSP, and which issues a path establishment request based upon the result of the calculation; and a section provided to the node on the destination side of the O-LSP, which, after having received the path establishment request, makes a decision as to whether or not it is possible to establish a path based upon the calculation result which is included in the path establishment request; and, if such establishment is possible, establishes a path based upon the calculation result; while on the other hand, if such establishment is not possible, it calculates the path for a second time, and establishes the path of the O-LSP.

By doing this, under the condition that the paths of the O-LSPs are frequently updated, there is a time difference between the time instant that the node which requests the establishment of an E-LSP calculates the path for an O-LSP and issues a path establishment request, and the time instant that this path establishment request arrives at the node on the destination side of the O-LSP and the destination side node actually establishes the path for the O-LSP, and, during this interval it is possible to deal with a case such as when the traffic conditions upon the O-LSPs undesirably change.

Or, the establishment section may comprise a section, provided to the node which requests establishment of the E-LSP, which issues a path establishment request for the O-LSP; and a section, provided to a node which can establish the O-LSP, which: performs calculation of the path of the O-LSP based upon the path establishment request, makes a decision as to whether or not it is possible to establish the O-LSP, and, along with communicating the results thereof to the section which issues the path establishment request, establishes the O-LSP, if such establishment is possible.

According to this, the node which requests the establishment of an E-LSP does not perform path calculation of an O-LSP; and furthermore, it does not perform establishment of the path of the O-LSP either; rather, the path calculation for the O-LSP and the establishment of the O-LSP are entrusted to a node which is capable thereof. By doing this, the load upon the node which requests the establishment of the E-LSP is alleviated. However, the node which requests the establishment of the E-LSP may perform the path establishment request for the O-LSP to a node which is capable of establishing the O-LSP, and in this case, the node which requests the establishment of the E-LSP may select a node which is capable of establishing the O-LSP which is best from the point of view of its own convenience. By doing this, it is possible to ensure a path and an optical wavelength at high probability.

For example, the path establishment request issuing section may comprise a section which issues a path establishment request by selecting, as the node at which the O-LSP can be established, that node for which the hop number from the current node or the total cost of the link is the minimum.

Or, the establishment section may comprise a section, provided to the node which requests the establishment of the O-LSP, which issues a path establishment request for the O-LSP; and a section, provided to a node which can establish the O-LSP, which: performs calculation of the path of the O-LSP based upon the path establishment request, makes a decision as to whether or not it is possible to establish the O-LSP, and communicates the result thereof to the section which issues the path establishment request; and the path establishment request issuing section may comprise a section for, if a plurality of communications to the effect that path establishment is possible have arrived from the communication section of a plurality of nodes, actually requesting the establishment of the O-LSP to that node, from among the nodes that have issued the communications to the effect that path establishment is possible, from which the communication to the effect that establishment is possible has arrived most quickly, or for which the hop number from the current node or the total cost of the link is the minimum.

According to this, the node which requests the establishment of an E-LSP does not perform path calculation of an O-LSP; and furthermore, it does not perform establishment of the path of the O-LSP either; rather, the path calculation for the O-LSP and the establishment of the O-LSP are entrusted to a node which is capable thereof. By doing this, the load upon the node which requests the establishment of the E-LSP is alleviated. However, the node which requests the establishment of the E-LSP may perform path establishment requests for an O-LSP to a plurality of nodes which are capable of establishing the O-LSP; and, in this case, the node which requests the establishment of the E-LSP may select, from among a plurality of nodes which are capable of establishing the O-LSP and from which communication has arrived to the effect that establishment is possible, that node which is capable of establishing the O-LSP which is best from the point of view of its own convenience. The node which is capable of establishing the O-LSP which is best firm the point of view of its own convenience may be, for example, the node from which the communication to the effect that establishment is possible has arrived most quickly, or for which the hop number from the current node or the total cost of the link is the minimum. By doing this, it is possible to ensure a path and an optical wavelength at high probability.

A third aspect of the present invention is a program which, by being installed upon an information processing device, implements upon the information processing device a function which corresponds to a node which is employed in the multi-layer photonic network of the present invention.

Here, the feature by which the present invention is particularly distinguished is that a function is implemented of automatically establishing a path for an O-LSP according to an establishment request for an E-LSP while taking account of path information which includes path cost, resource consumption, and traffic quantity.

As the establishment function, it is desirable to implement a function of calculating a path for the O-LSP, provided to the node which requests establishment of the E-LSP, and a function which establishes the path of the O-LSP based upon the result of calculation by the calculation function, provided to the node on the destination side of the O-LSP.

Or, as the establishment function, there may be implemented a function, provided to the node which requests establishment of the E-LSP, of calculating a path for the O-LSP, and of issuing a path establishment request based upon the result of the calculation; and a function, provided to the node on the destination side of the O-LSP, of, after having received the path establishment request, making a decision as to whether or not it is possible to establish a path based upon the calculation result which is included in the path establishment request; and, if such establishment is possible, establishing a path based upon the calculation result; while on the other hand, if such establishment is not possible, calculating the path for a second time, and establishing the path of the O-LSP.

Or, as the establishment function, there may be implemented a function, provided to the node which requests establishment of the E-LSP, for issuing a path establishment request for the O-LSP; and a function, provided to a node which can establish the O-LSP, which: performs calculation of the path of the O-LSP based upon the path establishment request, makes a decision as to whether or not it is possible to establish the O-LSP, and, along with communicating the results thereof to the section for issuing the path establishment request, establishes the O-LSP, if such establishment is possible.

In this case, it is desirable, for example, as the function of issuing the path establishment request, to implement a function of issuing a path establishment request by selecting, as the node at which the O-LSP can be established, that node for which the hop number from the current node or the total cost of the link is the least.

Or, as the establishment function, there may be implemented a function, provided to the node which requests the establishment of the O-LSP, of issuing a path establishment request for the O-LSP; and a function, provided to a node which can establish the O-LSP, of: performing calculation of the path of the O-LSP based upon the path establishment request, making a decision as to whether or not it is possible to establish the O-LSP, and communicating the result thereof to the function which issues the path establishment request; and, as the path establishment request issuing function, there may be implemented a function of, if a plurality of communications to the effect that path establishment is possible have arrived from the communication section of a plurality of nodes, actually requesting the establishment of the O-LSP to that node, from among the nodes that have issued the communications to the effect that path establishment is possible, from which the communication to the effect that establishment is possible has arrived most quickly, or for which the hop number from the current node or the total cost of the link is the minimum.

A fourth aspect of the present invention is a recording medium which can be read by the information processing device, upon which the program according to the present invention is recorded. By recording the program of the present invention upon the recording medium of the present invention, it is possible to install the program of the present invention upon the information processing device by using this recording medium. Or, it is possible to install the program of the present invention directly upon the information processing device via a network from a server upon which the program of the present invention is stored.

In this manner, by using an information processing device such as a computer or the like, and by calculating the most suitable paths for O-LSPs and E-LSPs at each node and automatically establishing them, it is possible to implement a multi-layer photonic network and a node, with which it is possible to anticipate operation at high efficiency.

A fifth aspect of the present invention is a path establishment method which is utilized in a multi-layer photonic network of the present invention, and which is particularly distinguished by the feature that, according to the E-LSP establishment request, a path for the O-LSP is automatically established while taking account of path information which includes path cost, resource consumption, and traffic quantity.

It is desirable for the path for the O-LSP to be calculated at the node which requests the establishment of the E-LSP, and for the path of the O-LSP to be established based upon the result of the calculation by the node on the destination side of the O-LSP.

Or, it is possible for, by the node which requests establishment of the E-LSP, a path to be calculated for the O-LSP, and for a path establishment request to be issued based upon the result of the calculation; and, by the node on the destination side of the O-LSP, after having received the path establishment request, for a decision to be made as to whether or not it is possible to establish a path based upon the calculation result which is included in the path establishment request; and, if such establishment is possible, a path to be established based upon the calculation result; while on the other hand, if such establishment is not possible, the path is calculated for a second time and the path of the O-LSP is established.

Or, it is possible for a path establishment request for the O-LSP to be issued from the node which requests establishment of the E-LSP; and, by a node which can establish the O-LSP, calculation of the path of the O-LSP to be performed based upon the path establishment request, a decision to be made as to whether or not it is possible to establish the O-LSP, and, along with communicating the results thereof to the node which issued the path establishment request, the O-LSP to be established, if such establishment is possible.

At this time, it is desirable for a path establishment request to be issued by, for example, selecting as that node at which the O-LSP can be established, that node for which the hop number from the current node or the total cost of the link is the least.

Or, it is possible for, from the node which requests establishment of the E-LSP, a path establishment request for the O-LSP to be issued; by a node which can establish the O-LSP, calculation of the path of the O-LSP to be performed based upon the path establishment request, a decision to be made as to whether or not it is possible to establish the O-LSP, and the result thereof to be communicated to the node which issued the path establishment request; and, if the node has received communications to the effect that path establishment is possible from a plurality of nodes, the establishment of the O-LSP to be actually requested to that node, from among the nodes that have issued the communications to the effect that path establishment is possible, from which the communication to the effect that establishment is possible has arrived most quickly, or for which the hop number from the current node or the total cost of the link is the minimum.

As has been explained above, it is possible to anticipate operation at high efficiency according to the present invention, by each node calculating and automatically establishing the most suitable path for O-LSPs and E-LSPs.

Furthermore, it is an objective of the present invention to propose a path establishment information advertisement method and a node in a multi-layer photonic network, with which efficient operation can be anticipated, by the advertisement of the establishment information for the optical paths and the electrical paths being kept to the necessary minimum level.

Thus, the present invention is particularly distinguished by the feature that operation of the network at high efficiency is implemented by alleviating the processing load upon all the nodes by preventing the spreading of topology information updating in relation to negligible path establishment or to the establishment of a path which is released over a short time period to the entire network, by suppressing its advertisement to the entire network.

In other words, a sixth aspect of the present invention is a path establishment information advertisement method which is utilized for a multi-layer photonic network having a two layer construction consisting of optical wavelength links (termed "O-LSP"s) having optical wavelength switching capability (LSC) which is capable of switching in units of optical wavelengths at both their ends, and packet links (termed "E-LSP"s) which include the O-LSPs and have packet switching capability (PSC) which is capable of switching in units of packets at both their ends, and comprising a plurality of sub-networks which perform switching and transfer in units of packets, optical transmission lines which are connected between these sub-networks, and nodes which terminate these optical transmission lines; and wherein, at both ends of the optical wavelength links which are constituted by the optical transmission lines and the nodes, there are provided both LSC and also PSC.

And herein, the particular characteristic of the present invention is that, when newly establishing an O-LSP or an E-LSP, the node related to the establishment of the O-LSP or the E-LSP retains the establishment information for the O-LSP or the E-LSP, and advertises it to all the nodes, only provided that a specified condition is satisfied.

By doing this, the advertisement of establishment information for optical paths and electrical paths is kept to the necessary minimum level, so that it is possible to anticipate operation at high efficiency.

It is desirable, if after a predetermined time period has elapsed no traffic is present upon the newly established O-LSP or E-LSP, or if, although traffic is present after a predetermined thee period has elapsed, the traffic can be shifted to another O-LSP or E-LSP, then to release the O-LSP or E-LSP.

Or it may be desirable, if, after a predetermined time period has elapsed, traffic is not present upon the newly established O-LSP or E-LSP of an amount which exceeds a threshold value which is established in common for the network as a whole, to shift the traffic to another O-LSP or E-LSP, and to release the newly established O-LSP or E-LSP.

By doing this, it is possible to take advantage of network resources efficiently by avoiding the establishment of O-LSPs or E-LSPs of poor efficiency. In the latter case, by altering the threshold value, it is possible to establish any traffic quantity which may be the object of regulation. Since, if traffic which exceeds the threshold value is not present, this traffic is to be shifted to another O-LSP or E-LSP, it should be understood that it is desirable to set the threshold value to a traffic quantity for which the traffic is easy to shift to another O-LSP or E-LSP.

The specified condition may be, for example, that the newly established O-LSP or E-LSP has not been released even after a predetermined time period has elapsed.

In this type of case, since it may be predicted that the newly established O-LSP or E-LSP will continue in existence over a long time period, it is advertised to all the nodes.

The specified condition may be, for example, that an E-LSP has been established in the newly established O-LSP after a predetermined time period has elapsed of priority which is greater than a threshold value which determines the level of the priority among the priorities which are allocated when establishing E-LSPs.

If this type of high priority E-LSP has been established, it may be predicted that the traffic quantity will be large even without observing the traffic quantity, so that, since it may be predicted that the newly established O-LSP will continue in existence over a long time period, accordingly its advertisement to all the nodes is performed.

When, after a predetermined time period has elapsed, in a newly established O-LSP, an E-LSP has been established of which the priority does not exceed a threshold value which determines the level of the priority among the priorities which are allocated when establishing the E-LSPs, the E-LSP may be shifted to another O-LSP or E-LSP, and the newly established O-LSP may be released.

Since when this type of low priority E-LSP has been established it may be predicted that the traffic quantity will be low even without observing the traffic quantity, accordingly it is possible to take advantage of network resources efficiently by shifting the E-LSP to another O-LSP and releasing the newly established O-LSP.

When an establishment request for a new O-LSP or E-LSP arrives from another node to a node related to a newly established O-LSP or E-LSP for which the advertisement has not been performed, it is desirable for the establishment request to be refused.

In other words, it may be pre-supposed that a newly established O-LSP or E-LSP for which the advertisement has not been performed will be released after a short time period. Accordingly, when an establishment request for the new O-LSP or E-LSP arrives from another node, if, by receiving this request, the O-LSP or E-LSP would have existed continuously for a long time period, it is desirable to refuse this type of request, because a necessity would arise to undertake troublesome procedures such as performing advertisement for a second time, and the like.

The establishment of an E-LSP of priority which exceeds a threshold value which determines the level of the priority within the priorities which are accorded when the E-LSPs are being established, over an O-LSP for which the establishment information has not been advertised to all the nodes, is desirably prohibited.

Since it may be predicted in advance that the traffic quantity for an E-LSP of high priority will be great, it is desirable to perform establishment of the E-LSP, in this manner, over an O-LSP whose establishment has been advertised. In other words, if there has been a request to establish the E-LSP over an O-LSP which is unknown and whose advertisement has not been performed, there is a possibility that this establishment request will be refused by the section for refusing establishment requests, so that it is desirable to prohibit the establishment of an E-LSP of high priority over an O-LSP whose establishment information has not been advertised to all the nodes, since otherwise there is a danger of inviting the result that traffic of high priority may be held up.

Furthermore, an O-LSP which has not been advertised is established under the pre-supposition that it will be released within a short time period, and, when an E-LSP of high priority is established over this type of O-LSP, it becomes necessary to re-advertise this O-LSP as an O-LSP which is established to continue over a long time period; and, since the procedures for such re-advertisement are troublesome, with the present invention, it is desirable for the establishment of a high priority E-LSP over an O-LSP whose advertisement has not been performed to be prohibited.

A seventh aspect of the present invention is a node which is used for a multi-layer photonic network having a two layer construction consisting of optical wavelength links (termed "O-LSP"s) having optical wavelength switching capability (LSC) which is capable of switching in units of optical wavelengths at both their ends, and packet links (termed "E-LSP"s) which include the O-LSPs and have packet switching capability (PSC) which is capable of switching in units of packets at both their ends, and comprising a plurality of sub-networks which perform switching and transfer in units of packets, optical transmission lines which are connected between these sub-networks, and nodes which terminate these optical transmission lines; wherein, at both ends of the optical wavelength links which are constituted by the optical transmission lines and the nodes, there are provided both LSC and also PSC.

Here, the particular distinguishing feature of the present invention is that there is further included a section which, when this node is a node related to a newly established O-LSP or an E-LSP, this node retains the establishment information for the O-LSP or the E-LSP, and advertises it to all the nodes, only provided that a specified condition is satisfied.

It is desirable for there to be further included a section which releases the O-LSP or E-LSP, if after a predetermined time period has elapsed no traffic is present upon the newly established O-LSP or E-LSP, or if, although traffic is present after a predetermined time period has elapsed, the traffic can be shifted to another O-LSP or E-LSP.

Or, there may be further included a section which, if, after a predetermined time period has elapsed, traffic is not present upon the newly established O-LSP or E-LSP of an amount which exceeds a threshold value which is established in common for the network as a whole, shifts the traffic to another O-LSP or E-LSP, and releases the newly established O-LSP or E-LSP.

The specified condition may, for example, be the condition that the newly established O-LSP or E-LSP has not been released by the release section even after a predetermined time period has elapsed.

Or, the specified condition may, for example, be the condition that an E-LSP has been established in the newly established O-LSP after a predetermined time period has elapsed of priority which is greater than a threshold value which determines the level of the priority among the priorities which are allocated when establishing E-LSPs.

There may be further included a section which, when, after a predetermined time period has elapsed, in a newly established O-LSP, an E-LSP has been established of which the priority does not exceed a threshold value which determines the level of the priority among the priorities which are allocated when establishing the E-LSPs, shifts the E-LSP to another O-LSP or E-LSP, and releases the newly established O-LSP.

It is desirable further to include a section which, when this node is a node related to a newly established O-LSP or E-LSP for which the advertisement by the advertising section has not been performed, and an establishment request for a new O-LSP or E-LSP arrives from another node, refuses the establishment request.

It is desirable further to include a section which prohibits the establishment over an O-LSP for which the establishment information has not been advertised to all the nodes, of an E-LSP of priority which exceeds a threshold value which determines the level of the priority within the priorities which are accorded when the E-LSPs are being established.

An eighth aspect of the present invention is a multi-layer photonic network whose particular feature is that it comprises a node according to the present invention.

A ninth aspect of the present invention is a program which, by being installed upon an information processing device, implements upon the information processing device a function of controlling a node which is used for a multi-layer photonic network having a two layer construction consisting of optical wavelength links (termed "O-LSP"s) having optical wavelength switching capability (LSC) which is capable of switching in units of optical wavelengths at both their ends, and packet links (termed "E-LSP"s) which include the O-LSPs and have packet switching capability (PSC) which is capable of switching in units of packets at both their ends, and comprising a plurality of sub-networks which perform switching and transfer in units of packets, optical transmission lines which are connected between these sub-networks, and nodes which terminate these optical transmission lines; wherein, at both ends of the optical wavelength links which are constituted by the optical transmission lines and the nodes, there are provided both LSC and PSC.

Here, the particular distinguishing feature of the present invention is that there is further implemented a function for, when this node is a node related to a newly established O-LSP or an E-LSP, this node retaining the establishment information for the O-LSP or the E-LSP, and advertising it to all the nodes, only provided that a specified condition is satisfied.

It is desirable for there to be further implemented a function of releasing the O-LSP or E-LSP, if after a predetermined time period has elapsed no traffic is present upon the newly established O-LSP or E-LSP, or if, although traffic is present after a predetermined time period has elapsed, the traffic can be shifted to another O-LSP or E-LSP.

Or, there may be further implemented a function for, if, after a predetermined time period has elapsed, traffic is not present upon the newly established O-LSP or E-LSP of an amount which exceeds a threshold value which is established in common for the network as a whole, shifting the traffic to another O-LSP or E-LSP, and releasing the newly established O-LSP or E-LSP.

The specified condition may, for example, be the condition that the newly established O-LSP or E-LSP has not been released by the release section even after a predetermined time period has elapsed.

Or, the specified condition may, for example, be the condition that an E-LSP has been established in the newly established O-LSP after a predetermined time period has elapsed of priority which is greater than a threshold value which determines the level of the priority among the priorities which are allocated when establishing E-LSPs.

There may be further implemented a function for, when, after a predetermined time period has elapsed, in a newly established O-LSP, an E-LSP has been established of which the priority does not exceed a threshold value which determines the level of the priority among the priorities which are allocated when establishing the E-LSPs, shifting the E-LSP to another O-LSP or E-LSP, and releasing the newly established O-LSP.

It is desirable further to implement a function for, when this node is a node related to a newly established O-LSP or E-LSP for which the advertisement by the advertising section has not been performed, and an establishment request for a new O-LSP or E-LSP arrives from another node, refusing the establishment request.

It is desirable further to implement a function for prohibiting the establishment over an O-LSP for which the establishment information has not been advertised to all the nodes, of an E-LSP of priority which exceeds a threshold value which determines the level of the priority within the priorities which are accorded when the E-LSPs are being established.

A tenth aspect of the present invention is a recording medium which can be read by the information processing device, upon which the program according to the present invention is recorded. By recording the program of the present invention upon the recording medium of the present invention, it is possible to install the program of the present invention upon the information processing device by using this recording medium. Or, it is possible to install the program of the present invention directly upon the information processing device via a network from a server upon which the program of the present invention is stored.

By doing this, using an information processing device such as a computer device or the like, it is possible to keep the advertisement of the establishment information for the optical paths and for the electrical paths to the necessary minimum level, so that it is possible to implement a multi-layer photonic network and a node which can be anticipated to operate at high efficiency.

As has been explained above, according to the present invention, by keeping the advertisement of the establishment information for the optical paths and for the electrical paths to the necessary minimum level, that it is possible for the multi-layer photonic network to operate at high efficiency.

Furthermore, the present invention takes as an objective to propose a multi-layer photonic network, an optical relay router, a program, and a recording medium which are capable of performing establishment, alteration, and release of optical paths autonomously according to demand upon electrical paths.

For this, the present invention is one which can take efficient advantage of network resources by suitably changing or releasing optical paths using nodes and border routers which are provided with PSC or LSC, in order to implement establishment of electrical paths.

In other words, an eleventh aspect of the present invention is a multi-layer photonic network, and it is distinguished in that it comprises a plurality of sub-networks which perform switching and transfer in units of packets, optical transmission lines which are mutually connected between this plurality of sub-networks, and nodes which terminate these optical transmission lines; in which, at the end points of the optical wavelength links which are connected mutually between the nodes, and between the nodes and border routers within the sub-networks, there are provided optical wavelength switching section which perform switching in units of optical wavelengths, or packet switching section which perform switching in units of packets; and by comprising optical paths, both ends of which are connected to the packet switching section, and electrical paths, both ends of which are connected to the packet switching section, and which are made using one or a plurality of the optical paths.

It is desirable to provide a calculation section which calculates a path for the optical path, taking as object an optical wavelength link which comprises the optical wavelength switching section at least at one of its ends, and a section which calculates a path for the electrical path based upon the path of the optical path which has been calculated by the calculation section.

In other words since, with regard to each of a plurality of optical paths which make up an electrical path, it is desirable to provide LSC at least at one of its ends, accordingly the path of the optical path is calculated by taking as an object this type of optical wavelength link. For example, it is possible to utilize an optical wavelength link which is provided with LSC at both of its ends as a relay for optical path. Furthermore, it is possible to utilize an optical wavelength link which is provided at one of its ends with LSC and at the other of its ends with PSC as an end portion of an optical path.

It is desirable to provide a section which, when establishment of the optical path or the electrical path has been performed based upon the result of calculation by the calculation section, advertises its establishment information to the nodes and to the border routers.

By doing this, it is possible for the nodes and the border routers to perform changeover or release of the establishment of the optical paths in an autonomous and distributed manner.

It is possible to provide a plurality of the border routers connected to the photonic network within a single one of the sub-networks, so that a plurality of connection paths are available between the single one of the sub-networks and the photonic network.

By doing this, along with it being possible to increase transmission line capacity more easily as compared with the case of having only a single connection path, also it is possible to enhance the reliability.

It is desirable to include a section for the nodes or the border routers to change or to release the establishment of the optical paths and the electrical paths in an autonomous and distributed manner, based upon a policy which includes hop number, traffic conditions, and network cost. By doing this, it is possible to take advantage of network resources efficiently, by matching them to the conditions of use of the network moment by moment.

It is possible to provide an optical relay router which comprises the packet switching section and the optical wavelength switching section, and to make this optical relay router so that a portion of the input and output ports of the optical wavelength switching section are connected to the packet switching section.

By doing this, it is possible to implement packet exchange with great flexibility, by putting each of the PSC and the LSC functions to its proper use.

A twelfth aspect of the present invention is an optical relay router which is used in the multi-layer photonic network of the present invention, comprising the packet switching section and the optical wavelength switching section, and in which a portion of the input and output ports of the optical wavelength switching section are connected to the packet switching section.

A thirteenth aspect of the present invention is a program which, by being installed upon an information processing device, implements upon the information processing device, as a function which corresponds to a device which is employed in the multi-layer photonic network of the present invention: a function of calculating a path for the optical path, taking as object an optical wavelength link which comprises the optical wavelength switching section at least at one of its ends; and a function of calculating a path for the electrical path based upon the path of the optical path which has been calculated by this calculation function.

It is desirable to implement a function of, when establishment of the optical path or the electrical path has been performed based upon the result of calculation by the calculation function, advertising its establishment information to the nodes and to the border routers.

It is desirable to implement a function of the nodes or the border routers changing or releasing the establishment of the optical paths and the electrical paths in an autonomous and distributed manner, based upon a policy which includes hop number, traffic conditions, and network cost.

A fourteenth aspect of the present invention is a recording medium which can be read by the information processing device, upon which the program according to the present invention is recorded. By recording the program of the present invention upon the recording medium of the present invention, it is possible to install the program of the present invention upon the information processing device by using this recording medium. Or, it is possible to install the program of the present invention directly upon the information processing device via a network from a server upon which the program of the present invention is stored.

By doing this, using an information processing device such as a computer or the like, it is possible to implement a multi-layer photonic network in which it is possible to perform establishment, alteration, and release of optical paths autonomously, in response to demand upon electrical paths.

As has been explained above, according to the present invention, it is possible autonomously to perform establishment, change, and release of the optical paths according to the demand upon the electrical paths.

Furthermore, the present invention aims to solve the above described problems, and it takes as its objective to make it possible newly to establish optical paths dynamically according to requests for accommodation of packet traffic, and moreover to perform new establishment of the most suitable optical paths according to the conditions of network load.

In order to solve the above described problem, a fifteenth aspect of the present invention is, in a multi-layer network comprising a packet network which comprises optical path links and packet switches, and a photonic network which comprises fiber links which accommodate the packet network and optical switches, to perform accommodation of packet traffic between specified grounds by searching out the path for which the optical path link cost, as seen from the point of view of the packet network, is minimum; and only to perform new establishment of an optical path if it is impossible for the packet traffic to reach the destination via an already established optical path.

A sixteenth aspect of the present invention is, in the above described fifteenth aspect of the present invention, to perform the new establishment of the optical path when it is impossible for the packet traffic which is to be accommodated to reach the destination via an already established optical path within a number of hops which is determined in advance.

A seventeenth aspect of the present invention is, in a multi-layer network comprising a packet network which comprises optical path links and packet switches, and a photonic network which comprises fiber links which accommodate the packet network and optical switches, to perform accommodation of packet traffic between specified grounds by searching out the path for which the fiber link cost, as seen from the point of view of the photonic network, is minimum; and only to perform new establishment of an optical path if it is impossible for the packet traffic upon the path to reach the destination via an already established optical path.

An eighteenth aspect of the present invention is, in the above described seventeenth aspect of the present invention, to perform the new establishment of the optical path when it is impossible for the packet traffic which is to be accommodated to reach the destination via an already established optical path within a number of hops which is determined in advance.

A nineteenth aspect of the present invention is, in a multi-layer network comprising a packet network which comprises optical path links and packet switches, and a photonic network which comprises fiber links which accommodate the packet network and optical switches, to perform new establishment of an optical path in response to a request for accommodation of packet traffic between specified grounds, and, at this time, newly to establish the optical path upon a path for which the fiber link cost, as seen from the point of view of the photonic network, is minimum.

As has been explained above, according to the present invention, it becomes possible newly to establish optical paths dynamically according to requests for accommodation of packet traffic, and moreover to perform new establishment of the most suitable optical paths according to the conditions of network load.

Furthermore, the present invention takes as an objective to propose a multi-layer photonic network, a program, a recording medium, and a traffic engineering method for the network, with which it is possible to perform establishment, release, and rearrangement of the most suitable O-LSPs or E-LSPs dynamically according to the traffic which changes over time.

Due to this, the present invention is particularly distinguished by the feature that rearrangement of all the E-LSPs is performed in response to detection of congestion upon any one of the O-LSPs in the network. By doing this, it is possible to perform establishment, release, and rearrangement of the most suitable O-LSPs or E-LSPs dynamically according to the traffic which changes over time.

At this time, it is possible to conjointly perform rearrangement of the O-LSPs along with the rearrangement of all the E-LSPs. For example, it may be decided whether or not it is possible newly to make an O-LSP in a single hop by which is made the E-LSP whose bandwidth used is the widest, or whose hop number is the largest, or whose path cost is the highest, and, if it is possible to do so, the O-LSP may be newly made.

In other words, since, by rearranging the E-LSP whose bandwidth used is the widest, or whose hop number is the largest, or whose path cost is the highest, into an O-LSP of a single hop, it is possible to make the flow of traffic smoother, so that accordingly it is possible to make the most suitable O-LSPs or E-LSPs dynamically according to the traffic.

Or, it is possible to perform rearrangement of the O-LSPs virtually a plurality of times, and to actually execute that rearrangement of the O-LSPs, from among these results of rearrangement a plurality of times, whose path cost is the least.

By doing this, it is possible to simulate the rearrangement before actually performing the rearrangement, so that it is possible to implement the most suitable rearrangement.

In this case, it is desirable to restrict the number of times, or the time period, for which the rearrangement of the O-LSPs is virtually performed. By doing this, and by thus imposing a restriction upon the time period for simulation, it is possible to anticipate a shortening of the time period for processing.

Furthermore, it is desirable to perform the rearrangement of the O-LSPs virtually by cut and try, and to actually rearrange the O-LSPs according to the order of the cut and try which has been performed virtually. By doing this, it is possible to perform the rearrangement according to the simulation.

In regard to an O-LSP for which the usage ratio has dropped below a threshold value, it is desirable to execute release of the O-LSP if it has been confirmed that the changing over of the E-LSPs which were made in the O-LSP to other O-LSPs has already been completed, that it is ensured that all the routers will still be connected even if the O-LSP is released, and that congestion will not arise upon some other O-LSP even if the O-LSP is released. By doing this, it is possible to release the O-LSPs which are not required, and to take efficient advantage of network resources.

In regard to a request to make a new E-LSP, it is desirable to make a new O-LSP, only provided that it is not possible to make it in an already established O-LSP. By doing this, the increase of newly established O-LSPs is prevented as much as possible, and accordingly it is possible to take efficient advantage of network resources.

Furthermore, in regard to a request to make a new E-LSP, E-LSPs and O-LSPs may be newly established or rearranged according to a predetermined policy.

In this case, the policy may, for example, include a policy of, in regard to a request to make a new E-LSP: deciding whether or not it is possible to accommodate the E-LSP in an already established O-LSP of a single hop; if such accommodation is possible, thus accommodating it; if it is not possible to accommodate the E-LSP in an already established O-LSP of a single hop, deciding whether or not it is possible to accommodate the E-LSP in an already established O-LSP whose hop number is within a predetermined hop number; if such accommodation is possible, thus accommodating it; if it is not possible to accommodate the E-LSP in an already established O-LSP whose hop number is within the predetermined hop number, deciding whether or not it is possible to make a newly established O-LSP of a single hop; and, if it is possible to make one, accommodating the E-LSP in the newly established O-LSP.

According to the policy, first, an attempt is made to implement the E-LSP in a single hop; but, if this implementation is difficult, an attempt is made to implement the E-LSP within the predetermined hop number. By doing this, the flow of traffic is made smooth, and it is possible to take advantage of network resources efficiently.

Or the policy may, for example, include a policy of, in regard to a request to make a new E-LSP: deciding whether or not it is possible to accommodate the E-LSP in an already established O-LSP of a single hop; if such accommodation is possible, thus accommodating it; if it is not possible to accommodate the E-LSP in an already established O-LSP of a single hop, deciding whether or not it is possible to make a newly established O-LSP of a single hop; if it is possible to make one, accommodating the E-LSP in the newly established O-LSP; if it is not possible to make the newly established O-LSP, deciding whether or not it is possible to accommodate the E-LSP in an already established O-LSP whose hop number is within a predetermined hop number; and, if such accommodation is possible, thus accommodating it.

According to the policy, by making an attempt, as far as possible, to implement the E-LSP in a single hop, the flow of traffic is made smooth, and it is possible to take advantage of network resources efficiently.

Or the policy may, for example, include a policy of, in regard to a request to make, a new E-LSP: deciding whether or not it is possible to make a newly established O-LSP of a single hop which accommodates the E-LSP; if it is possible to make one, newly establishing the O-LSP and accommodating the E-LSP in it; if it is not possible to make one, deciding whether or not it is possible to accommodate the E-LSP in an already established O-LSP of a single hop; if such accommodation is possible, accommodating the E-LSP in the already established O-LSP; if it is not possible to accommodate the E-LSP in the already established O-LSP, deciding whether or not it is possible to accommodate the E-LSP in an already established O-LSP whose hop number is within a predetermined hop number; and, if such accommodation is possible, thus accommodating it.

According to the policy, first, a structure of a newly established O-LSP is attempted; and, if this is impossible, an attempt is made to take advantage of an already established O-LSP, so that it is possible to perform the rearrangement procedure at a higher speed, as compared to the case of initially searching through the O-LSPs which are already established.

Or the policy may, for example, include a policy of, in regard to a request to make a new E-LSP: deciding whether or not it is possible to accommodate the E-LSP by making a single newly established O-LSP whose hop number is within a predetermined hop number; if such accommodation is possible, accommodating the E-LSP in the newly established O-LSP, and, at this time, if a plurality of candidates for the newly established O-LSP are available, selecting from among the candidates the one for which, after accommodating the E-LSP, the path cost is the minimum; while, if it is not possible to accommodate the E-LSP by making such a single, newly established O-LSP, deciding whether or not it is possible to accommodate the E-LSP by making up to M newly established O-LSPs whose hop number is within the predetermined hop number; and, if it is possible to make them, accommodating the E-LSP by distributing it among the up to M newly established O-LSPs.

According to the policy, first, an attempt is made to implement the E-LSP in a single hop; but, if this implementation is difficult, an attempt is made to implement the E-LSP by distributing it over a plurality of O-LSPs within the predetermined hop number. By doing this, the flow of traffic is made smooth, and it is possible to take advantage of network resources efficiently.

Furthermore, if E-LSPs of the already established bandwidth reservation type are present upon the network, by performing the rearrangement while omitting them, it is possible to ensure the bandwidths reserved for them.

A twentieth aspect of the present invention is a multi-layer photonic network having a two layer construction consisting of optical wavelength links (termed "O-LSP"s) having optical wavelength switching capability (LSC) which is capable of switching in units of optical wavelengths at both their ends, and packet links (termed "E-LSP"s) which include the O-LSPs and have packet switching capability (PSC) which is capable of switching in units of packets at both their ends, and comprising a plurality of sub-networks which perform switching and transfer in units of packets, optical transmission lines which are connected between these sub-networks, and nodes which terminate these optical transmission lines; wherein, at both ends of the optical wavelength links which are constituted by the optical transmission lines and the nodes, there are provided both LSC and also PSC.

And, the particular distinguishing feature of the present invention is that a rearrangement section is provided for performing rearrangement of all the E-LSPs in response to detection of congestion upon any one of the O-LSPs.

It is desirable for the rearrangement section to comprise a section for conjointly performing rearrangement of the O-LSPs along with the rearrangement of all the E-LSPs.

The conjointly performing section may, for example, comprise a section for deciding whether or not it is possible newly to make an O-LSP in a single hop by which is made the E-LSP whose bandwidth used is the widest, or whose hop number is the largest, or whose path cost is the highest, and, if it is possible to do so, newly making the O-LSP.

Or, the conjointly performing section may comprise a rearrangement simulation section which performs rearrangement of the O-LSPs virtually a plurality of times, and a section for actually executing that rearrangement of the O-LSPs, from among the results of rearrangement performed by the rearrangement simulation section a plurality of times, whose path cost is the least.

It is desirable for the rearrangement simulation section to comprise a section for restricting the number of times, or the time period, for which the rearrangement of the O-LSPs is virtually performed.

It is desirable for the rearrangement simulation section to comprise a section for performing the rearrangement of the O-LSPs virtually by cut and try, and for the actual execution section to comprise a section for actually rearranging the O-LSPs according to the order of the cut and try which has been performed virtually.

It is desirable further to include a section for, in regard to an O-LSP for which the usage ratio has dropped below a threshold value, executing release of the O-LSP if it has been confirmed that the changing over of the E-LSPs which were made in the O-LSP to other O-LSPs has already been completed, that it is ensured that all the routers will still be connected even if the O-LSP is released, and that congestion will not arise upon some other O-LSP even if the O-LSP is released.

It is desirable to further include a section for, in regard to a request to make a new E-LSP, making a new O-LSP, only provided that it is not possible to make it in an already established O-LSP.

Furthermore, there may be comprised a section for, in regard to a request to make a new E-LSP, newly establishing or arranging E-LSPs and O-LSPs according to a predetermined policy.

The policy may, for example, include a policy of, in regard to a request to make a new E-LSP: deciding whether or not it is possible to accommodate the E-LSP in an already established O-LSP of a single hop; if such accommodation is possible, thus accommodating it; if it is not possible to accommodate the E-LSP in an already established O-LSP of a single hop, deciding whether or not it is possible to accommodate the E-LSP in an already established O-LSP whose hop number is within a predetermined hop number; if such accommodation is possible, thus accommodating it; if it is not possible to accommodate the E-LSP in an already established O-LSP whose hop number is within the predetermined hop number, deciding whether or not it is possible to make a newly established O-LSP of a single hop; and, if it is possible to make one, accommodating the E-LSP in the newly established O-LSP.

Or, the policy may, for example, include a policy of, in regard to a request to make a new E-LSP: deciding whether or not it is possible to accommodate the E-LSP in an already established O-LSP of a single hop; if such accommodation is possible, thus accommodating it; if it is not possible to accommodate the E-LSP in an already established O-LSP of a single hop, deciding whether or not it is possible to make a newly established O-LSP of a single hop; if it is possible to make one, accommodating the E-LSP in the newly established O-LSP; if it is not possible to make the newly established O-LSP, deciding whether or not it is possible to accommodate the E-LSP in an already established O-LSP whose hop number is within a predetermined hop number; and, if such accommodation is possible, thus accommodating it.

Or, the policy may, for example, include a policy of, in regard to a request to make a new E-LSP: deciding whether or not it is possible to make a newly established O-LSP of a single hop which accommodates the E-LSP; if it is possible to make one, newly establishing the O-LSP and accommodating the E-LSP in it; if it is not possible to make one, deciding whether or not it is possible to accommodate the E-LSP in an already established O-LSP of a single hop; if such accommodation is possible, accommodating the E-LSP in the already established O-LSP; if it is not possible to accommodate the E-LSP in the already established O-LSP, deciding whether or not it is possible to accommodate the E-LSP in an already established O-LSP whose hop number is within a predetermined hop number; and, if such accommodation is possible, thus accommodating it.

Or, the policy may, for example, include a policy of, in regard to a request to make a new E-LSP: deciding whether or not it is possible to accommodate the E-LSP by making a single newly established O-LSP whose hop number is within a predetermined hop number; if such accommodation is possible, accommodating the E-LSP in the newly established O-LSP, and, at this time, if a plurality of candidates for the newly established O-LSP are available, selecting from among the candidates the one for which, after accommodating the E-LSP, the path cost is the minimum; while, if it is not possible to accommodate the E-LSP by making such a single newly established O-LSP, deciding whether or not it is possible to accommodate the E-LSP by making up to M newly established O-LSPs whose hop number is within the predetermined hop number; and, if it is possible to make them, accommodating the E-LSP by distributing it among the up to M newly established O-LSPs.

Furthermore, as the section for performing rearrangement, it is desirable to provide a section for performing rearrangement with the exception of E-LSPs of the already established bandwidth reservation type.

A twenty-first aspect of the present invention is a program which, by being installed upon an information processing device, implements upon the information processing device a function which is applied in the multi-layer network of the present invention; and, here, the feature by which the present invention is particularly distinguished is that a function is implemented of performing rearrangement of all the E-LSPs in response to detection of congestion upon any one of the O-LSPs.

As the function of performing rearrangement, it is desirable to implement a function of conjointly performing rearrangement of the O-LSPs along with the rearrangement of all the E-LSPs.

As the conjointly performing function, a function may be implemented of deciding whether or not it is possible newly to make an O-LSP in a single hop by which is made the E-LSP whose bandwidth used is the widest, or whose hop number is the largest, or whose path cost is the highest, and, if it is possible to do so, newly making the O-LSP.

Or, as the conjointly performing function, there may be implemented a rearrangement simulation function of performing rearrangement of the O-LSPs virtually a plurality of times, and a function of actually executing that rearrangement of the O-LSPs, from among the results of rearrangement performed by the rearrangement simulation function a plurality of times, whose path cost is the minimum.

Furthermore, as the rearrangement simulation function, a function of limiting the number of times or the time period that the virtual rearrangement of the O-LSPs is performed.

It is desirable to implement a function of, as the rearrangement simulation function, performing the rearrangement of the O-LSPs virtually by cut and try, and, as the actually executing function, to implement a function of actually rearranging the O-LSPs according to the order of the cut and try which has been performed virtually.

In regard to an O-LSP for which the usage ratio has dropped below a threshold value, it is desirable to provide a section which executes release of the O-LSP if it has been confirmed that the changing over of the E-LSPs which were made in the O-LSP to other O-LSPs has already been completed, that it is ensured that all the routers will still be connected even if the O-LSP is released, and that congestion will not arise upon some other O-LSP even if the O-LSP is released.

It is desirable to implement a function of, in regard to a request to make a new E-LSP, making a new O-LSP, only provided that it is not possible to make it in an already established O-LSP.

A function may be implemented of, in regard to a request to make a new E-LSP, newly establishing or arranging E-LSPs and O-LSPs according to a predetermined policy.

The policy may, for example, include a policy of, in regard to a request to make a new E-LSP: deciding whether or not it is possible to accommodate the E-LSP in an already established O-LSP of a single hop: if such accommodation is possible, thus accommodating it; if it is not possible to accommodate the E-LSP in an already established O-LSP of a single hop, deciding whether or not it is possible to accommodate the E-LSP in an already established O-LSP whose hop number is within a predetermined hop number; if such accommodation is possible, thus accommodating it; if it is not possible to accommodate the E-LSP in an already established O-LSP whose hop number is within the predetermined hop number, deciding whether or not it is possible to make a newly established O-LSP of a single hop; and, if it is possible to make one, accommodating the E-LSP in the newly established O-LSP.

Or, the policy may, for example, include a policy of, in regard to a request to make a new E-LSP: deciding whether or not it is possible to accommodate the E-LSP in an already established O-LSP of a single hop; if such accommodation is possible, thus accommodating it; if it is not possible to accommodate the E-LSP in an already established O-LSP of a single hop, deciding whether or not it is possible to make a newly established O-LSP of a single hop; if it is possible to make one, accommodating the E-LSP in the newly established O-LSP; if it is not possible to make the newly established O-LSP, deciding whether or not it is possible to accommodate the E-LSP in an already established O-LSP whose hop number is within a predetermined hop number; and, if such accommodation is possible, thus accommodating it.

Or, the policy may, for example, include a policy of, in regard to a request to make a new E-LSP: deciding whether or not it is possible to make a newly established O-LSP of a single hop which accommodates the E-LSP; if it is possible to make one, newly establishing the O-LSP and accommodating the E-LSP in it; if it is not possible to make one, deciding whether or not it is possible to accommodate the E-LSP in an already established O-LSP of a single hop; if such accommodation is possible, accommodating the E-LSP in the already established O-LSP; if it is not possible to accommodate the E-LSP in the already established O-LSP, deciding whether or not it is possible to accommodate the E-LSP in an already established O-LSP whose hop number is within a predetermined hop number; and, if such accommodation is possible, thus accommodating it.

Or, the policy may, for example, include a policy of, in regard to a request to make a new E-LSP: deciding whether or not it is possible to accommodate the E-LSP by making a single newly established O-LSP whose hop number is within a predetermined hop number; if such accommodation is possible, accommodating the E-LSP in the newly established O-LSP, and, at this time, if a plurality of candidates for the newly established O-LSP are available, selecting from among the candidates the one for which, after accommodating the E-LSP, the path cost is the minimum; while, if it is not possible to accommodate the E-LSP by making such a single newly established O-LSP, deciding whether or not it is possible to accommodate the E-LSP by making up to M newly established O-LSPs whose hop number is within the predetermined hop number; and, if it is possible to make them, accommodating the E-LSP by distributing it among the up to M newly established O-LSPs.

As the function of performing rearrangement, it is desirable to implement a function of performing rearrangement with the exception of E-LSPs of the already established bandwidth reservation type.

The twenty-second aspect of the present invention is a recording medium which is capable of being read by the information processing device, upon which the program of the present invention is recorded. By recording the program of the present invention upon the recording medium of the present invention, it is possible to install the program of the present invention upon the information processing device by using this recording medium. Or, it is possible to install the program of the present invention directly upon an information processing device via a network from a server upon which the program of the present invention is stored.

By doing this, using an information processing device such as a computer device or the like, it is possible to implement a multi-layer photonic network which can perform establishment, release, and rearrangement of the most suitable O-LSPs and E-LSPs dynamically according to the traffic which changes over time.

A twenty-third aspect of the present invention is a traffic engineering method which is applied in the multi-layer photonic network of the present invention, in which the particular distinguishing feature is that rearrangement of all the E-LSPs is performed in response to detection of congestion upon any one of the O-LSPs.

It is possible conjointly to perform rearrangement of the O-LSPs along with the rearrangement of all the E-LSPs. For example, it may be decided whether or not it is possible newly to make an O-LSP in a single hop by which is made the E-LSP whose bandwidth used is the widest, or whose hop number is the largest or whose path cost is the highest, and, if it is possible to do so, the O-LSP may be newly made.

Or, rearrangement of the O-LSPs may be performed virtually a plurality of times, and, from among these results of rearrangement a plurality of times, that rearrangement of the O-LSPs may be actually executed whose path cost is the minimum. In this case, it is desirable to restrict the number of times, or the time period, for which the rearrangement of the O-LSPs is virtually performed. Furthermore, it is desirable to perform the rearrangement of the O-LSPs virtually by cut and try, and to actually rearrange the O-LSPs according to the order of the cut and try which has been performed virtually.

In regard to an O-LSP for which the usage ratio has dropped below a threshold value, it is desirable to execute release of the O-LSP if it has been confirmed that the changing over of the E-LSPs which were made in the O-LSP to other O-LSPs has already been completed, that it is ensured that all the routers will still be connected even if the O-LSP is released, and that congestion will not arise upon some other O-LSP even if the O-LSP is released.

It is desirable, in regard to a request to make a new E-LSP, to make the new O-LSP, provided that it is not possible to make it in an already established O-LSP.

Or, in regard to a request to make a new E-LSP, it is also possible to newly establish or arrange E-LSPs and O-LSPs according to a predetermined policy.

In this case, this policy may include a policy of, in regard to a request to make a new E-LSP: deciding whether or not it is possible to accommodate the E-LSP in an already established O-LSP of a single hop; if such accommodation is possible, thus accommodating it; if it is not possible to accommodate the E-LSP in an already established O-LSP of a single hop, deciding whether or not it is possible to accommodate the E-LSP in an already established O-LSP whose hop number is within a predetermined hop number; if such accommodation is possible, thus accommodating it; if it is not possible to accommodate the E-LSP in an already established O-LSP whose hop number is within the predetermined hop number, deciding whether or not it is possible to make a newly established O-LSP of a single hop; and, if it is possible to make one, accommodating the E-LSP in the newly established O-LSP.

Or, the policy may include a policy of, for example, in regard to a request to make a new E-LSP: deciding whether or not it is possible to accommodate the E-LSP in an already established O-LSP of a single hop; if such accommodation is possible, thus accommodating it; if it is not possible to accommodate the E-LSP in an already established O-LSP of a single hop, deciding whether or not it is possible to make a newly established O-LSP of a single hop; if it is possible to make one, accommodating the E-LSP in the newly established O-LSP; if it is not possible to make the newly established O-LSP, deciding whether or not it is possible to accommodate the E-LSP in an already established O-LSP whose hop number is within a predetermined hop number; and, if such accommodation is possible, thus accommodating it.

Or, the policy may include a policy of, for example, in regard to a request to make a new E-LSP: deciding whether or not it is possible to make a newly established O-LSP of a single hop which accommodates the E-LSP; if it is possible to make one, newly establishing the O-LSP and accommodating the E-LSP in it; if it is not possible to make one, deciding whether or not it is possible to accommodate the E-LSP in an already established O-LSP of a single hop; if such accommodation is possible, accommodating the E-LSP in the already established O-LSP; if it is not possible to accommodate the E-LSP in the already established O-LSP, deciding whether or not it is possible to accommodate the E-LSP in an already established O-LSP whose hop number is within a predetermined hop number; and, if such accommodation is possible, thus accommodating it.

Or, the policy may include a policy of, for example, in regard to a request to make a new E-LSP: deciding whether or not it is possible to accommodate the E-LSP by making a single newly established O-LSP whose hop number is within a predetermined hop number; if such accommodation is possible, accommodating the E-LSP in the newly established O-LSP, and, at this time, if a plurality of candidates for the newly established O-LSP are available, selecting from among the candidates the one for which, after accommodating the E-LSP, the path cost is the minimum; while, if it is not possible to accommodate the E-LSP by making such a single newly established O-LSP, deciding whether or not it is possible to accommodate the E-LSP by making up to M newly established O-LSPs whose hop number is within the predetermined hop number; and, if it is possible to make them, accommodating the E-LSP by distributing it among the up to M newly established O-LSPs.

Furthermore, it is desirable to perform the rearrangement with the exception of the E-LSPs of the already established bandwidth reserved type.

As has been explained above, according to the present invention, it is possible to perform establishment, release, and rearrangement of the most suitable O-LSPs and E-LSPs dynamically according to the traffic between the various nodes which changes with time.

BRIEF DESCRIPTION OF THE DRAWINGS

FIG. 53 is a drawing showing a model of a multi-layer photonic network.

FIGS. 54A through 54C are drawings showing routings upon O-LSP and E-LSP layers and of an E-LSP upon an O-LSP.

DETAILED DESCRIPTION OF THE PREFERRED EMBODIMENTS

Figure 1:
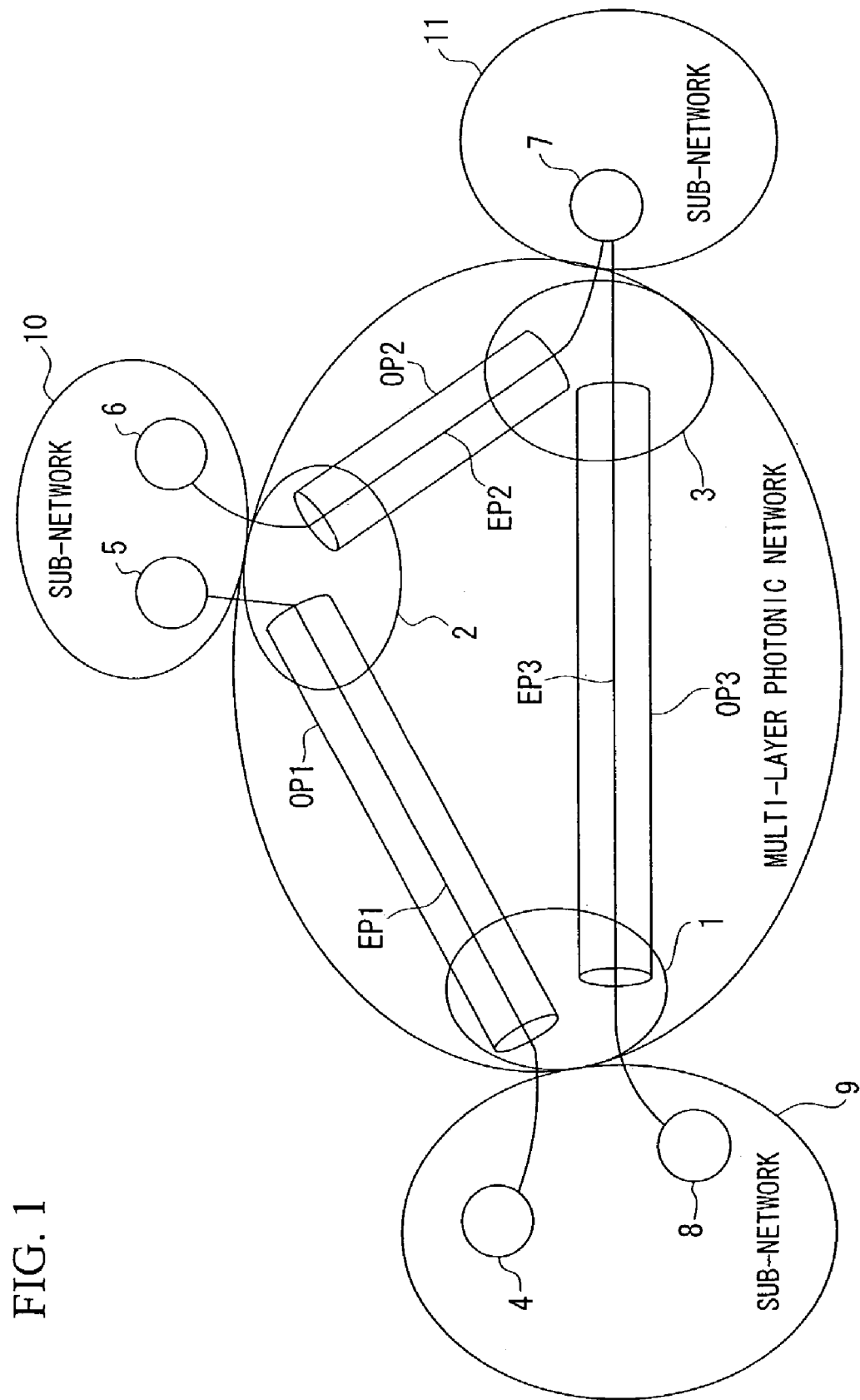
FIG. 1 is an overall structural view showing a multi-layer photonic network according to the first through fifth preferred embodiments of the present invention.

The first through the fifth preferred embodiments of the multi-layer photonic network according to the present invention will now be explained with reference to FIG. 1. FIG. 1 is a diagram showing the overall structure of the multi-layer photonic network of these first through fifth preferred embodiments.

As shown in FIG. 1, each of these preferred embodiments is a multi-layer photonic network, comprising a plurality of sub-networks 9 through 11 which perform switching and transfer in packet units, optical paths OP1 through OP3 which are O-LSPs which connect these sub-networks 9 through 1, and nodes 1 through 3 which terminate these optical paths OP1 through OP3; and, in addition to the nodes 1 through 3 which are LSCs which are capable of switching in units of optical wavelengths at both ends of the optical wavelength links which consist of the optical paths OP1 through OP3 and the nodes 1 through 3, there are provided respective border routers 4 through 8 as nodes which comprise PSCs which are capable of switching in units of packets. In this manner, the multi-layer photonic network has a two layer construction including the optical paths OP1 through OP3 which are O-LSPs which comprise the nodes 1 through 3 at both their ends, and electrical paths EP1 through EP3 which are E-LSPs which comprise the border routers 4 through 8 at both their ends and include these optical paths OP1 through OP3.

Here, the, distinguishing feature of these first through fifth preferred embodiments of the present invention is that the nodes 1 through 3 establish the paths of the optical paths OP1 through OP3 automatically, according to establishment requests of the electrical paths EP1 through EP3 by the border routers 4 through 8, while taking into consideration path information which includes path cost, resource consumption, and traffic quantity.

In this manner, with the multi-layer photonic networks of these first through fifth preferred embodiments of the present invention, it is possible to establish a path as required in consideration of the path information which includes the path cost, the resource consumption, and the traffic quantity, thus taking advantage of the opportunities presented by the traffic which is generated. Accordingly, it is possible to perform network operations efficiently.

In the first preferred embodiment of the present invention, the border routers 4 through 8 calculate the optical paths OP1 through OP3, and the nodes 1 through 3 establish the optical paths OP1 through OP3 based upon the result of that calculation.

By doing this, it is possible for the border routers 4 through 8 also to serve the function of establishing the optical paths OP1 through OP3. Accordingly, a user who is utilizing the border routers 4 through 8 is able to perform path establishment for the optical paths OP1 through OP3 which are included in the multi-layer photonic network according to requests. Therefore, along with being able to enhance the convenience for the user, it is not necessary for the network administrator himself to perform path establishment for the optical paths OP1 through OP3. Furthermore, by performing the most suitable path establishment for the optical paths OP1 through OP3 according to the traffic conditions of the electrical paths EP1 through EP3, it is possible to perform multi-layer photonic network management at high efficiency, due to the fact that the trouble of path establishment for the optical paths OP1 through OP3 is curtailed.

In the second preferred embodiment of the present invention, the border routers 4 through 8 calculate the optical paths OP1 through OP3 and issue a path establishment request based upon the result of that calculation, and the nodes 1 through 3, after having received this path establishment request, make a decision as to whether or not to establish a path based upon the result of that calculation which is included in this path establishment request; and, if the result is that such path establishment is possible, they establish the path based upon the calculation result; while, if the result is that such path establishment is not possible, they calculate the path for a second time, and establish the optical paths OP1 through OP3.

Under the condition that the optical paths OP1 through OP3 is frequently updated, there is a time difference between the time instant that the border routers 4 through 8 have calculated the optical paths OP1 through OP3 and have issued a path establishment request, and the time instant that this path establishment request arrives at the nodes 1 through 3 and the nodes 1 through 3 actually establish the optical paths OP1 through OP3; and, during this interval, the traffic conditions of the optical paths OP1 through OP3 should change. However, according to the second embodiment, it is possible to deal with the above condition.

In the third preferred embodiment of the present invention, the border routers 4 through 8 issue a path establishment request for the optical paths OP1 through OP3, and the nodes 1 through 3 perform path calculation for the optical paths OP1 through OP3 based upon this path establishment request, and make a decision as to whether or not it is possible to establish the optical paths OP1 through OP3; and, as well as communicating the result of this decision to the border routers 4 through 8, the border routers 4 through 8 establish the O-LSP, if such establishment is possible.

At this time, the border routers 4 through 8 issue the path establishment request by selecting, as the one of the nodes 1 through 3 for which establishment of the optical paths OP1 through OP3 is possible, that node i (i is one of 1 through 3) for which the number of hops from that same border router, or the total cost of the link, is the least.

According to this, the border routers 4 through 8 do not perform path calculation for the optical paths OP1 through OP3, and also they are arranged not to perform the establishment of the paths either; but, rather, the path calculation for the optical paths OP1 through OP3 is entrusted to the nodes 1 through 3. By doing this, the load upon the border routers 4 through 8 is alleviated. However, the border routers 4 through 8 are able to perform path establishment requests for the optical paths OP1 through OP3 to the nodes 1 through 3, and, at this time, the border routers 4 through 8 are each able to select the node i for which the convenience is the greatest, from the point of view of this border router itself. Due to this, it is possible to ensure the path and the optical wavelength at high probability.

In the fourth preferred embodiment of the present invention, the border routers 4 through 8 issue a path establishment request for the optical paths OP1 through OP3, and the nodes 1 through 3 perform path calculation for the optical paths OP1 through OP3 based upon this path establishment request and make a decision as to whether or not it is possible to establish the optical paths OP1 through OP3, and communicate the result of this decision to the border routers 4 through 8; and, if a plurality of communications to the effect that establishment is possible have arrived from a plurality of the nodes 1 through 3, the border routers 4 through 8, from among the nodes 1 through 3 which have issued these communications to the effect that establishment is possible, actually request the establishment of the optical path OPi to that node i from which the communication to the effect that establishment is possible has arrived the most quickly, or to that node i for which the number of hops from this border router itself or the total cost of the link is the least.

According to this, the border routers 4 through 8 do not perform the path calculation for the optical paths OP1 through OP3, and also it is not arranged for them to perform the path establishment; but, rather, the path calculation for the optical paths OP1 through OP3 is entrusted to the nodes 1 through 3. Due to this, the load upon the border routers 4 through 8 is alleviated. However, the border routers 4 through 8 are able to perform path establishment requests for the optical paths OP1 through OP3 to the plurality of nodes 1 through 3, and, at this time, the border routers 4 through 8 are each able to select, from the plurality of the nodes 1 through 3 from which communication to the effect that establishment is possible has been received, that node i for which the convenience is the greatest, from the point of view of this border router itself. As this node for which the convenience is the greatest, for example, there may be taken that node i from which the communication to the effect that establishment is possible has arrived the most quickly or that node i for which the number of hops from this border router itself or the total cost of the link is the least. Due to this, it is possible to ensure the path and the optical wavelength at high probability.

The nodes 1 through 3 and the border routers 4 through 8 of these preferred embodiments can be implemented by the use of a computer device, which is an information processing device. That is to say, by installing upon a computer device a program which implements, on this computer device, functions which correspond to the nodes 1 through 3 and to the border routers 4 through 8 which are used in the multi-layer photonic network of these preferred embodiments, and by installing upon the computer device a program which implements a function of automatically establishing the optical paths OP1 through OP3 according to establishment requests of the electrical paths EP1 through EP3, in consideration of path information which includes path cost, resource consumption, and traffic quantity, it is possible to make this computer device serve as a device which corresponds to the nodes 1 through 3 and the border routers 4 through 8 of these preferred embodiments.

As this establishment function, by installing upon the computer device a program which implements the function provided to the border routers 4 through 8 of calculating the optical paths OP1 through OP3, and the function provided to the nodes 1 through 3 of establishing the optical paths OP1 through OP3 based upon the calculation result of the calculation function, it is possible to make this computer device serve as a device which corresponds to the nodes 1 through 3 and the border routers 4 through 8 of the first preferred embodiment.

Or, as this establishment function, by installing upon the computer device a program which implements the function provided to the border routers 4 through 8 of calculating a path of the optical paths OP1 through OP3 and of issuing a path establishment request based upon the result of that calculation, and the function provided to the nodes 1 through 3 of, after receiving this path establishment request, based upon that calculation result which is included in the path establishment request, making a decision as to whether or not path establishment is possible, and, if such path establishment is possible, establishing a path based upon that calculation result, while, if such path establishment is not possible, calculating a path for a second time and establishing the optical paths OP1 through OP3, it is possible to make this control device serve as a device which corresponds to the nodes 1 through 3 and the border routers 4 through 8 of the second preferred embodiment.

Or, as this establishment function, by installing upon the computer device a program which implements: the function provided to the border routers 4 through 8 of issuing a path establishment request for the optical paths OP1 through OP3 the function provided to the nodes 1 through 3 of performing a calculation of the optical paths OP1 through OP3 based upon this path establishment request and making a decision as to whether or not establishment of the optical paths OP1 through OP3 is possible, and, along with communicating the result thereof to the border routers 4 through 8, if such path establishment is possible, establishing the optical paths OP1 through OP3; and, as the function of issuing the path establishment request, a function of selecting, from the nodes 1 through 3, that node i for which the number of hops from this border router itself or the total cost of the link is the least, and issuing the path establishment request; it is possible to make this computer device serve as a device which corresponds to the nodes 1 through 3 and the border routers 4 through 8 of the third preferred embodiment.

Or, as this establishment function, by installing upon the computer device a program which implements: the function provided to the border routers 4 through 8 of issuing a path establishment request for the optical paths OP1 through OP3; the function provided to the nodes 1 through 3 of performing a calculation of the optical paths OP1 through OP3 based upon this path establishment request, making a decision as to whether or not establishment of the optical paths OP1 through OP3 is possible, and communicating the result thereof to the border routers 4 through 8; and, as the function of issuing the path establishment request, a function of, if a plurality of communications to the effect that establishment is possible have arrived by the communication function from a plurality of the nodes 1 through 3, actually requesting the establishment of the optical path OPi for the node i, from among those nodes 1 through 3 which have issued these communications to the effect that establishment is possible, for which the communication to the effect that establishment is possible has arrived the most quickly, or for which the number of hops from this border router itself or the total cost of the link is the least; it is possible to make this computer device serve as a device which corresponds to the nodes 1 through 3 and the border routers 4 through 8 of the fourth preferred embodiment.

By recording the program of these preferred embodiments upon the recording medium of these preferred embodiments, it is possible to install the program of these preferred embodiments upon a computer device by using this recording medium. Or, it is possible to install the program of these preferred embodiments directly upon a computer device via a network from a server upon which the program of these preferred embodiments is stored.

As described above, by each of the nodes 1 through 3 and the border routers 4 through 8 calculating the most suitable path and automatically establishing the O-LSP and the E-LSP, it is possible to implement a multi-layer photonic network and nodes which can be expected to operate efficiently using a computer device.

In the following, these preferred embodiments will be explained in greater detail. It should be understood that, in the following, in order to make the explanation easier to understand, the explanation is provided with reference to an isolated portion of the multi-layer photonic network shown in FIG. 1.

The First Preferred Embodiment

The first preferred embodiment of the present invention will be explained with reference to FIG. 1. The reference symbols 1, 2, and 3 denote nodes of the multi-layer photonic network, while the reference symbols 4, 5, 6, 7, and 8 denote border routers of the sub-networks; and OP1, OP2, and OP3 are optical paths (O-LSPs), EP1, EP2 and EP3 are electrical paths, and the reference symbols 9, 10, and 11 denote the sub-networks. The electrical path EP1 is established, for the border router 4 and the border router 5 by using the optical path OP1. Moreover, the electrical path EP2 is established for the border router 6 and the border router 7 by using the optical path OP2.

Now, if traffic has been newly generated between the border router 8 and the border router 7, the border router 8 requests the establishment of an E-LSP with the border router 7 to the node 1. At the node 1, since there is no O-LSP between the node 1 and the node 3 while it is possible to establish an E-LSP with the border router 7 via the node 2, it is also possible to establish the electrical path EP3 by newly establishing the optical path OP3 directly with the node 3. The decision as to which of these is the most suitable to be established is made by the node 1.

The Second Preferred Embodiment

Figure 2:
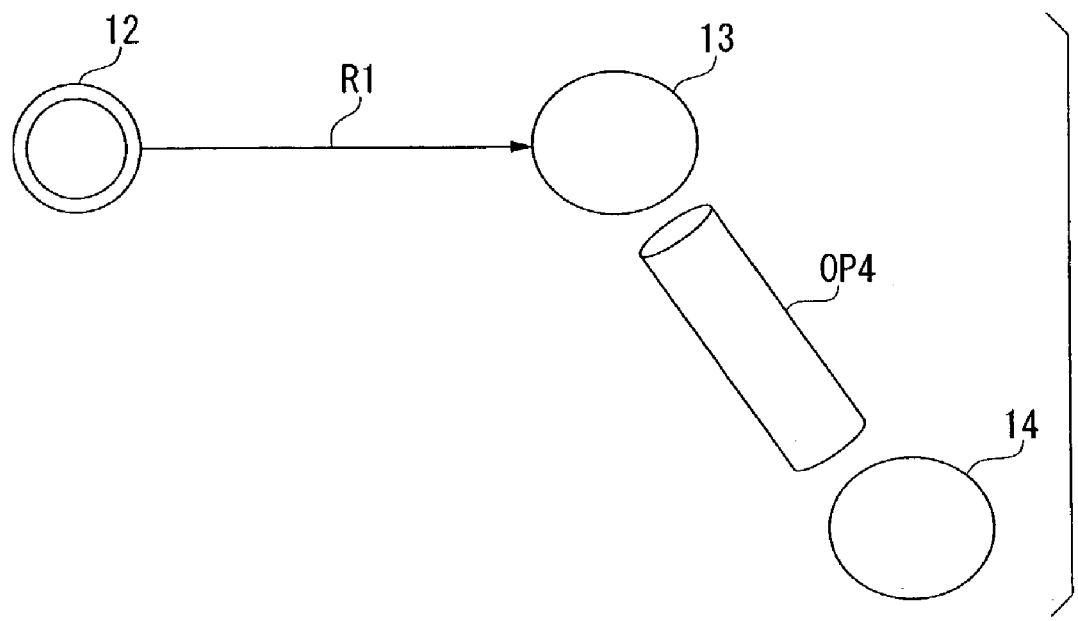
FIG. 2 is a drawing for explanation of an O-LSP establishment procedure according to the second preferred embodiment of the present invention.

The second preferred embodiment of the present invention will be explained with reference to FIG. 2. FIG. 2 is a diagram for explanation of the O-LSP establishment procedure of this second preferred embodiment of the present invention. The reference symbols 12, 13, and 14 denote nodes which can terminate O-LSPs and each of which has both PSC and LSC, while RI is an O-LSP path designation signal and OP4 is an O-LSP. If the node 12 has decided to establish an E-LSP which uses the node 14 via the node 13 as the current result of path calculation of the E-LSP, then the node 12 dispatches a signal R1 to the node 13 which designates the use of the optical path OP4 between the node 12 and the node 14, and the node 13 performs establishment of an E-LSP using the optical path OP4.

The Third Preferred Embodiment

Figure 3:
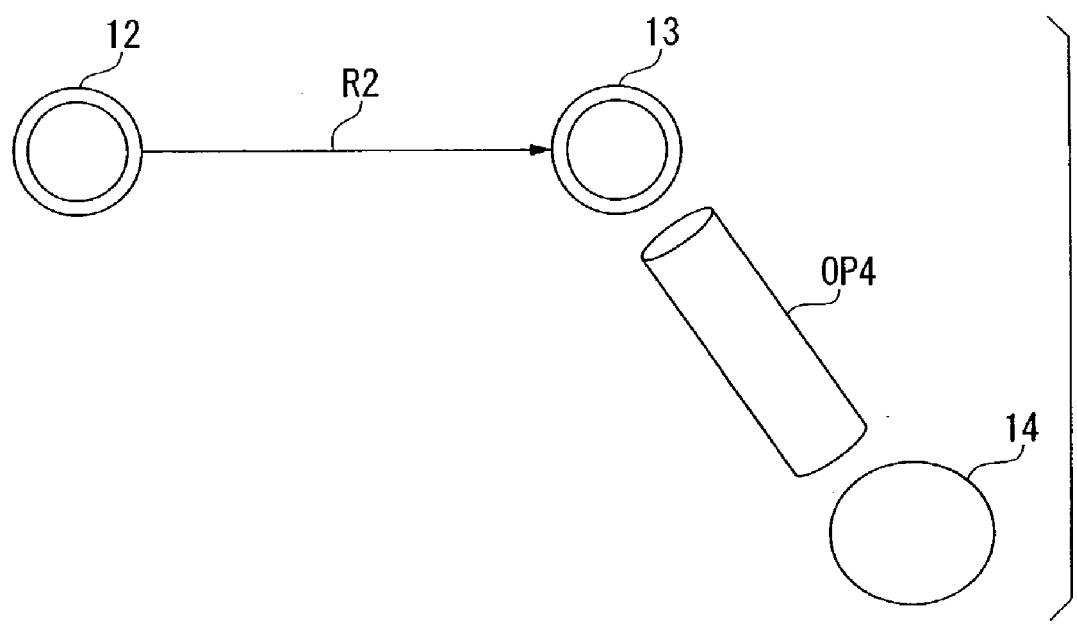
FIG. 3 is a drawing for explanation of an O-LSP establishment procedure according to the third preferred embodiment of the present invention.

The third preferred embodiment of the present invention will be explained with reference to FIG. 3. FIG. 3 is a diagram for explanation of the O-LSP establishment procedure of this third preferred embodiment of the present invention. The reference symbol R2 denotes an O-LSP establishment designation signal. If the node 12 has decided to establish an E-LSP via the node 13 as the result of current path calculation of the E-LSP, then the node 12 dispatches a signal R2 to the node 13 which designates the establishment of the optical path OP4 between the node 12 and the node 14. In the node 13, path calculation is performed for a second time, and the optical path OP4 is established with the node 14 which is considered to be the most suitable one.

The Fourth Preferred Embodiment

Figure 4:
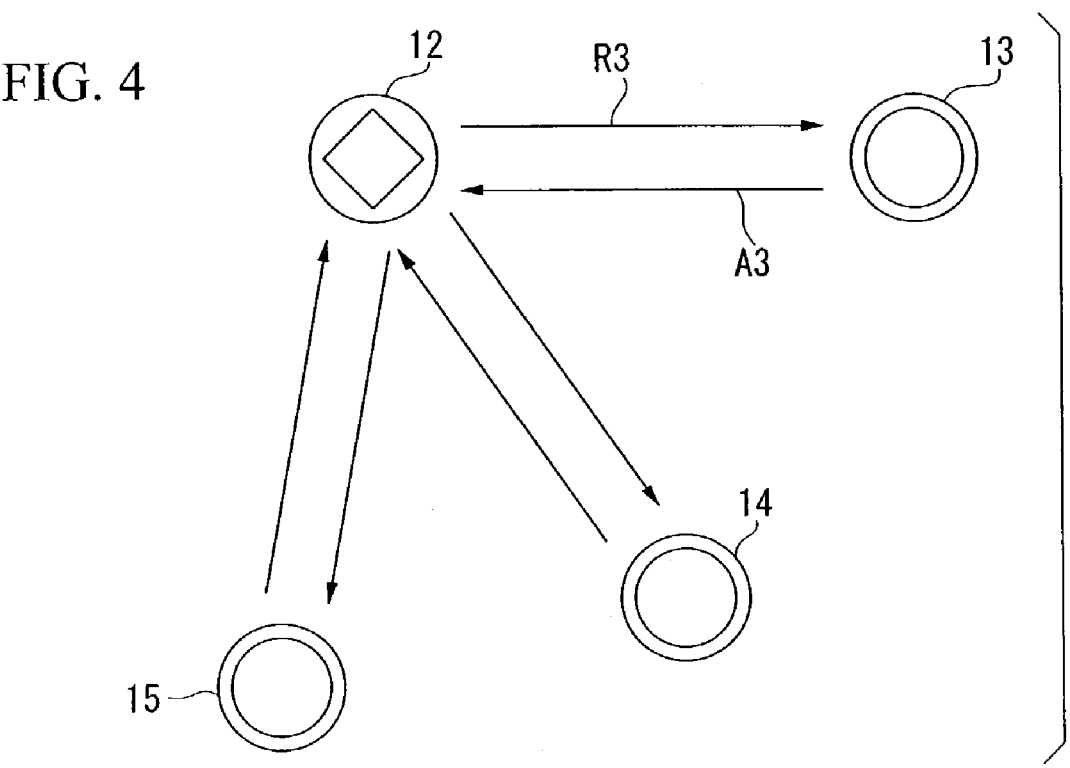
FIG. 4 is a drawing for explanation of an O-LSP establishment procedure according to them, fourth preferred embodiment of the present invention.

The fourth preferred embodiment of the present invention will be explained with reference to FIG. 4. FIG. 4 is a diagram for explanation of the O-LSP establishment procedure of this fourth preferred embodiment of the present invention. The reference symbol 15 denotes a node which is capable of terminating an O-LSP and which, just like the other nodes, has both PSC and LSC, while R3 denotes an O-LSP establishment request signal and A3 denotes an O-LSP establishment possible/impossible notification signal.

The node 12 calculates the path for making the E-LSP, and dispatches the signal R3 which requests the establishment of an O-LSP with the next node to the node 13 which possesses an O-LSP establishment capability. In the node 13 it is investigated whether or not it is possible to establish the O-LSP, based upon the signal R3, and if it is possible then the O-LSP is established, and a signal A3 is returned to the node 12 with contents which indicate that establishment has been possible; while if the establishment of the O-LSP which has been designated by the signal R3 is not possible, then a signal A3 is returned with contents which indicate that such establishment is not possible. In the node 12 the returned signal is inspected, and if the signal A3 from the node 13 is a signal which indicates that establishment is not possible, then the path calculation is performed for a second time, and a signal R3 requesting the establishment of an O-LSP is dispatched to the node 14. If a signal that establishment of an O-LSP is not possible is returned from the node 14, then next an O-LSP establishment request signal is dispatched to the node 15. This operation is repeated until the node 12 is able to make an E-LSP path. It should be understood that the order of the partner nodes to which the node 12 dispatches O-LSP establishment requests is performed in order of the results of path calculation of the E-LSP, or, if an O-LSP is established, in the order of smallest hop number, or in the order of smallest total cost.

The Fifth Preferred Embodiment

Figure 5:
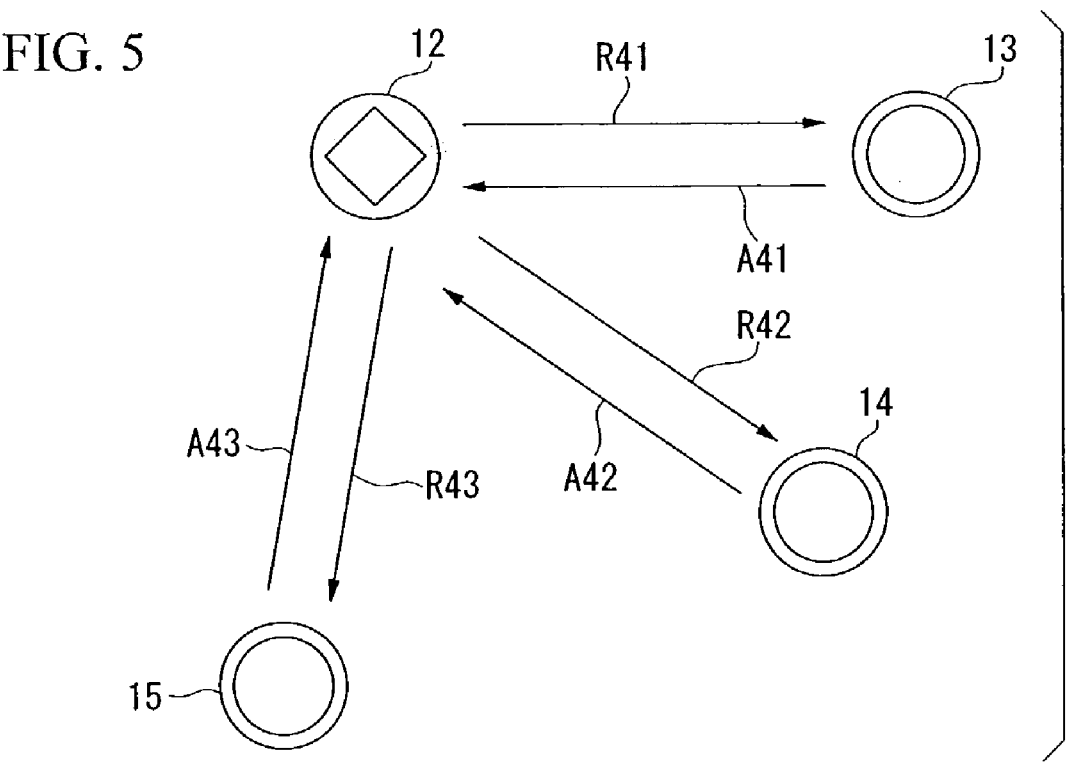
FIG. 5 is a drawing for explanation of an O-LSP establishment procedure according to the fifth preferred embodiment of the present invention.

The fifth preferred embodiment of the present invention will be explained with reference to FIG. 5. FIG. 5 is a diagram for explanation of the O-LSP establishment procedure of this fifth preferred embodiment of the present invention. The reference symbols R41, R42, and R43 denote O-LSP path calculation request signals, while A41, A42, and A43 denote O-LSP path calculation result signals. When making an E-LSP. the node 12 dispatches O-LSP path calculation request signals at the same time to all of the nodes which have O-LSP establishment capability at the present time.

The nodes which have received the O-LSP path calculation request signals perform their respective O-LSP path calculations, and return the results thereof to the node 12 carried in O-LSP path calculation result signals. From among the nodes which have returned contents as their returned O-LSP path calculation result signals which indicate that O-LSP establishment is possible, one or the other of the node which has returned its O-LSP path calculation result signal the most quickly, or the node for which the calculated cost is the least, or the node for which the calculated number of hops is the least, is adopted in the node 12 as the result, and an O-LSP establishment command is issued to its node.

Figure 6:
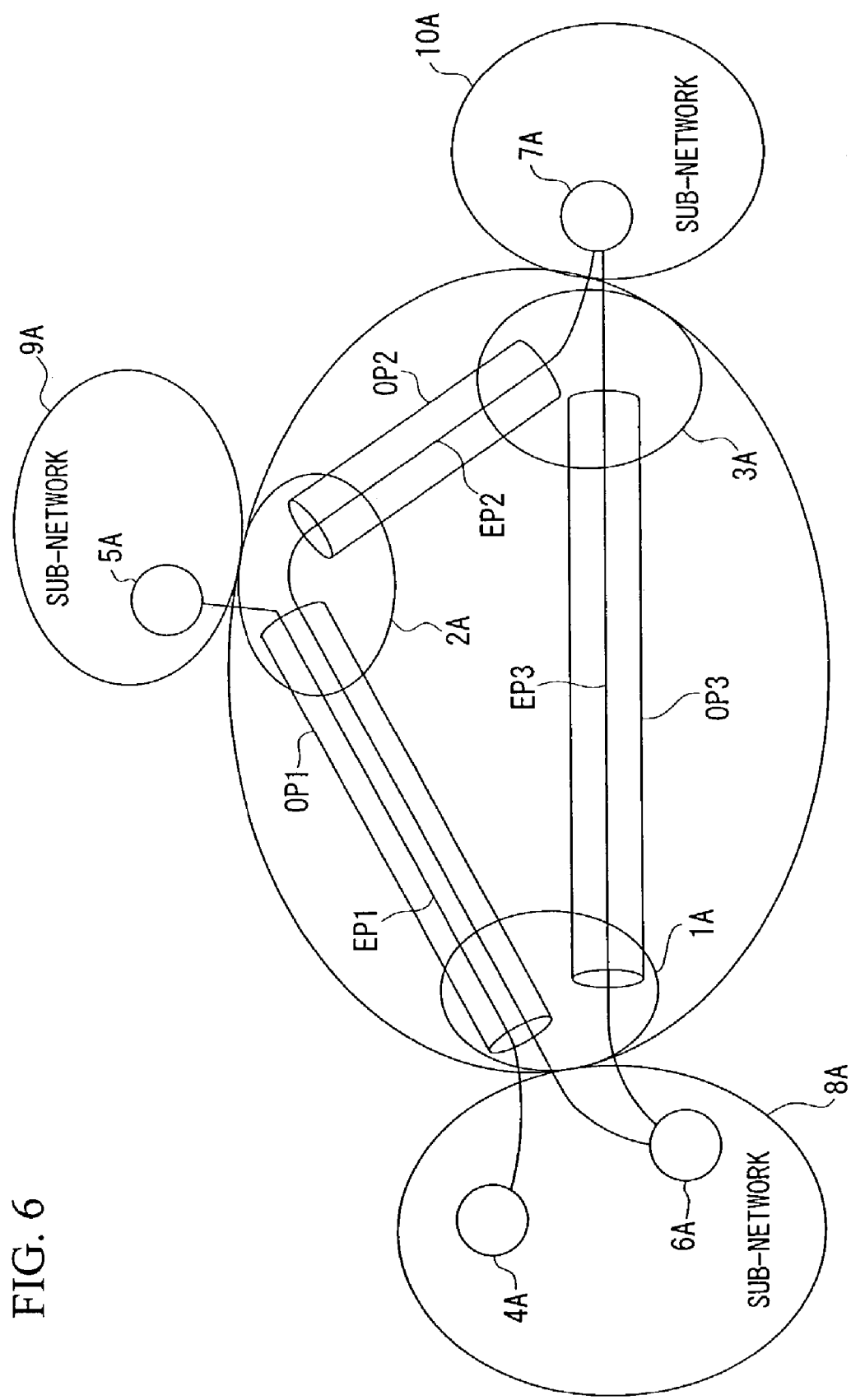
FIG. 6 is an overall structural view showing a multi-layer photonic network according to the sixth through thirteenth preferred embodiments of the present invention.

Next, the sixth through the thirteenth preferred embodiments of the multi-layer photonic network of the present invention will be explained with reference to FIG. 6. FIG. 6 is an overall structural view of the multi-layer photonic network according to these preferred embodiments. The reference numerals 1A, 2A, and 3A denote nodes of the photonic network, while 4A, 5A, 6A, and 7A denote border routers of sub-networks, 8A, 9A, and 10A denote the sub-networks themselves, OP1, OP2, and OP3 denote optical paths (O-LSPs), and EP1, EP2, and EP3 denote electrical paths (E-LSPs). The electrical path EP1 is established for the border router 4A and the border router 5A using the optical path OP1. Furthermore, the electrical path EP2 is established for the border router 6A and the border router 7A using the optical path OP1 and the optical path OP2. The electrical path EP2 is relayed at the node 2A.

These sixth through thirteenth preferred embodiments of the present invention, as shown in FIG. 6, each comprises the plurality of sub-networks 8A through 10A which perform switching and transfer by packet units, the optical paths OP1 through OP3 which are O-LSPs which connect these sub-networks 8A through 10A, and the nodes 1A through 3A which terminate these optical paths OP1 through OP3; and, at both the ends of the optical wavelength links which are constituted by the optical paths OP1 through OP3 and the nodes 1A through 3A, in addition to the nodes 1A through 3A which are endowed with the LSC capability of switching in units of optical wavelengths, the border routers 4A through 7A are also respectively provided as nodes which are endowed with the PSC capability of switching in units of packets. In this manner, a node 1A through 3A or a border router 4A through 7A is applied to a multi-layer photonic network of a two layer construction, consisting of the optical paths OP1 through OP3 which are O-LSPs which are provided with the nodes 1A through 3A at both their ends, and the electrical paths EP1 through EP3 which are E-LSPs which are provided with the border routers 4A through 7A at both their ends and include these optical paths OP1 through OP3.

Here, the characteristic feature of these preferred embodiments is that, when a node 1A through 3A or a border router 4A through 7A is a node 1A through 3A or a border router 4A through 7A which is related to an O-LSP or an E-LSP which has been newly established, this is advertised to all the nodes, only provided that the establishment information for the O-LSP or E-LSP which the node 1A through 3A or the border router 4A through 7A maintains satisfies a specified condition.

The Sixth Preferred Embodiment

Figure 7:
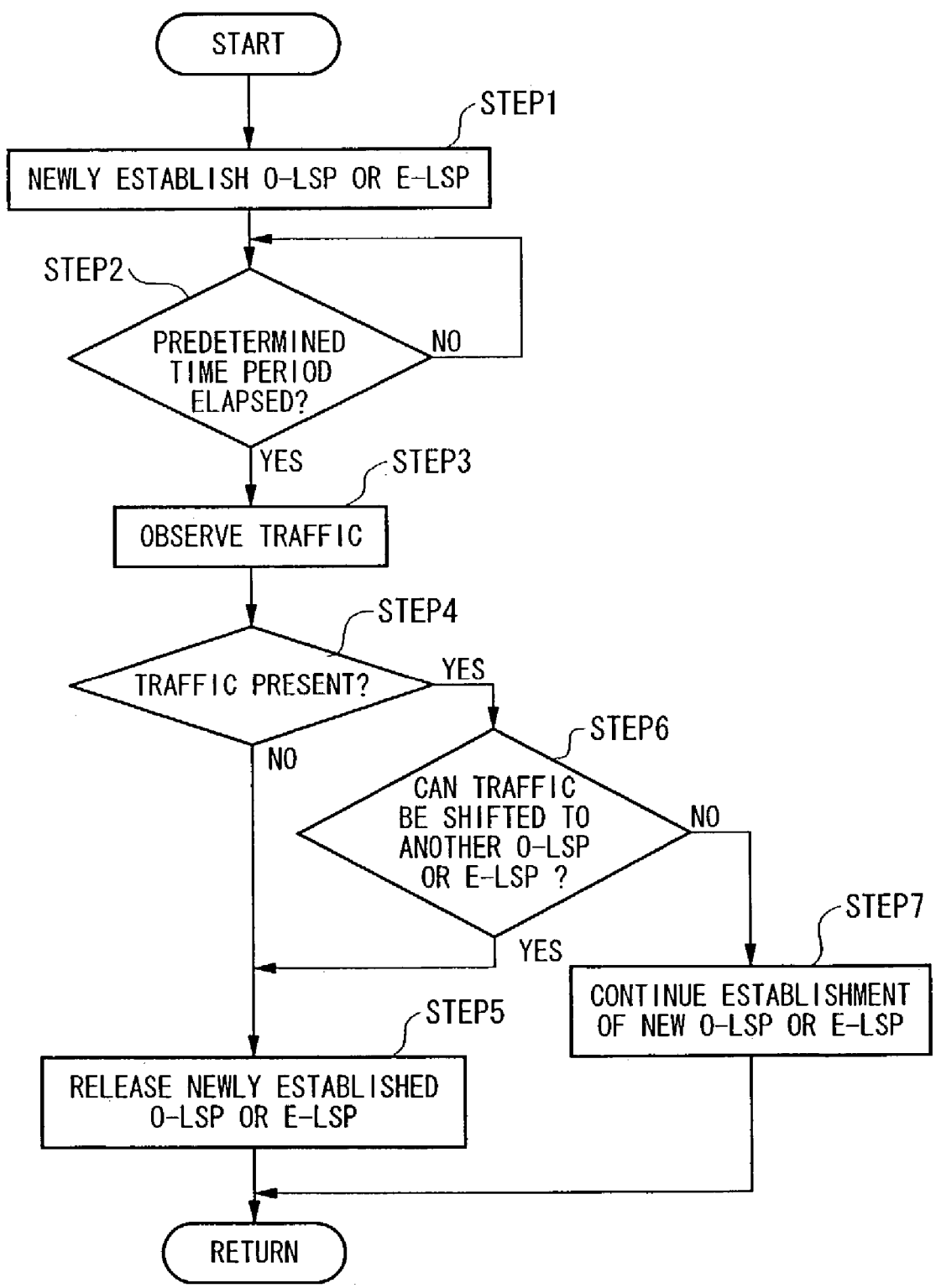
FIG. 7 is a flow chart showing an establishment procedure for an O-LSP or an E-LSP according to the sixth preferred embodiment of the present invention.

The establishment procedure for an O-LSP or an E-LSP of the sixth preferred embodiment of the present invention will be explained with reference to FIG. 7. FIG. 7 is a flow chart showing the establishment procedure for an O-LSP or an E-LSP of the sixth preferred embodiment In the sixth preferred embodiment of the present invention, if after a predetermined time period has elapsed no traffic is present upon an O-LSP or an E-LSP which has been newly established, or if, although traffic is present after the predetermined time period has elapsed, this traffic can be shifted to another O-LSP or E-LSP, then the node 1A through 3A or the border router 4A through 7A releases the O-LSP or E-LSP.

In other words, as shown in FIG. 7, the node 1A through 3A or the border router 4A through 7A newly establishes an O-LSP or E-LSP (in the step 1), and after a predetermined time period has elapsed (in the step 2), then the traffic is observed (in the step 3). If the result of this observation is that no traffic is present (in the step 4), then the newly established O-LSP or E-LSP is released (in the step 5). Furthermore, if the result of the observation in the step 3 is that traffic is present (in the step 4) and if it is possible to shift this traffic to another O-LSP or E-LSP (in the step 6), then the newly established O-LSP or E-LSP is released (in the step 5). Moreover, if the result of the observation in the step 3 is that traffic is present (in the step 4), and if it is not possible to shift this traffic to another O-LSP or E-LSP (in the step 6), then the establishment of the newly established O-LSP or E-LSP is continued (in the step 7).

The Seventh Preferred Embodiment

Figure 8:
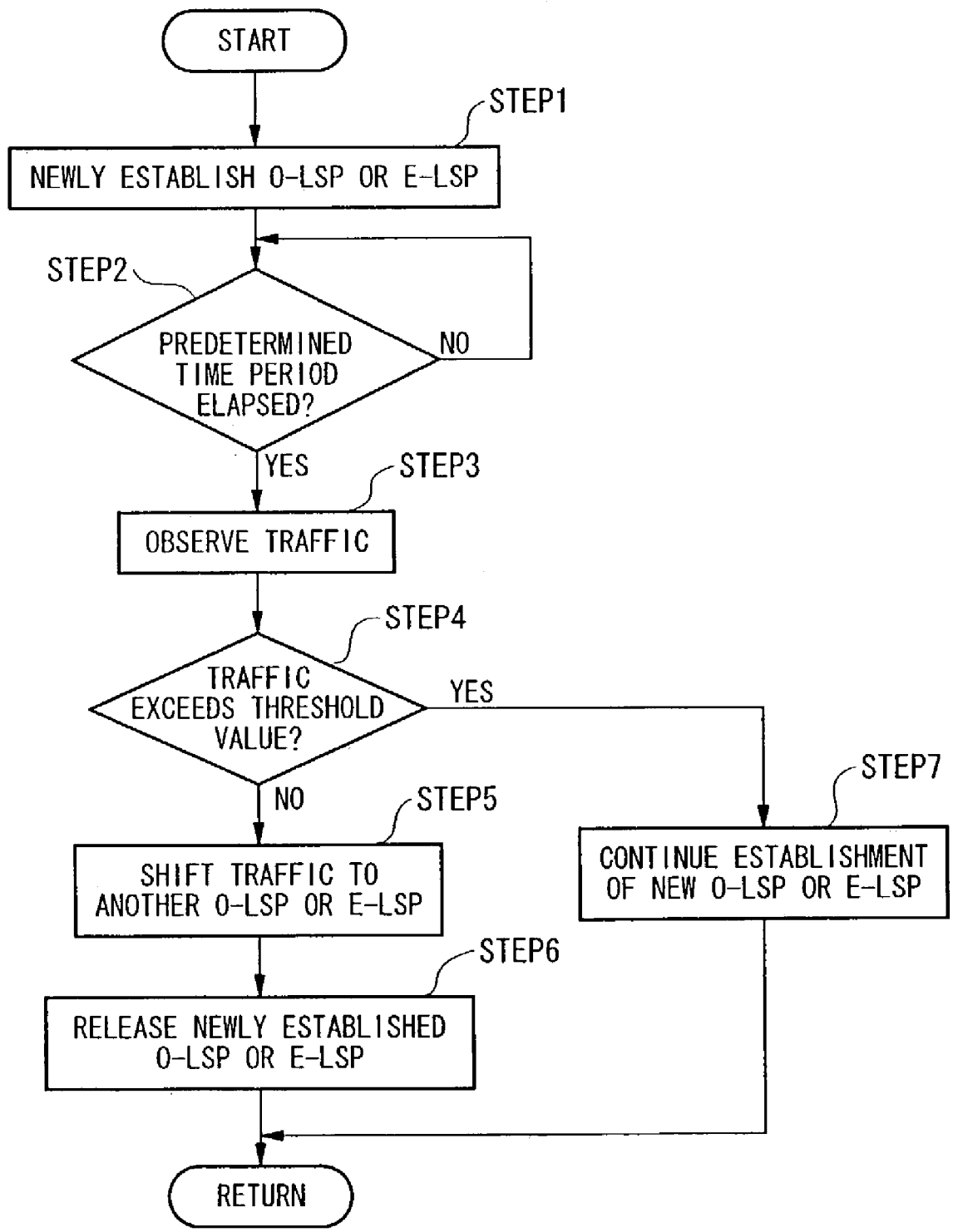
FIG. 8 is a flow chart showing an establishment procedure for an O-LSP or an E-LSP according to the seventh preferred embodiment of the present invention.

The establishment procedure for an O-LSP or an E-LSP of the seventh preferred embodiment of the present invention will now be explained with reference to FIG. 8. FIG. 8 is a flow chart showing the establishment procedure for an O-LSP or an E-LSP of this seventh preferred embodiment of the present invention.

In this seventh preferred embodiment, if after a predetermined time period has elapsed no traffic greater than a threshold value which is established in common for the entire network is present upon an O-LSP or an E-LSP which has been newly established, then the node 1A through 3A or the border router 4A through 7A shifts the traffic to a different O-LSP or E-LSP and releases the newly established O-LSP or E-LSP.

In other words, as shown in FIG. 8, the node 1A through 3A or the border router 4A through 7A newly establishes an O-LSP or an E-LSP (in the step 1), and after a predetermined time period has elapsed (in the step 2), observes the traffic (in the step 3). If the result of this observation is that the traffic is not greater than a threshold value (in the step 4), then the traffic upon the newly established O-LSP or E-LSP is shifted to a different O-LSP or E-LSP (in the step 5), and the newly established O-LSP or E-LSP is released (in the step 6). Furthermore, if the result of the observation in the step 3 is that the traffic is greater than the threshold value (in the step 4), then the establishment of the newly established O-LSP or E-LSP is continued (in the step 7).

In this seventh preferred embodiment of the present invention, the threshold value which is established in common for the entire network is established according to traffic conditions, but, since the traffic upon the newly established O-LSP or E-LSP is shifted to a different O-LSP or E-LSP if the threshold traffic value is not exceeded, accordingly this threshold value is selected so that the traffic quantity is one which can be easily shifted to another O-LSP or E-LSP at this time.

The Eighth Preferred Embodiment

Figure 9:
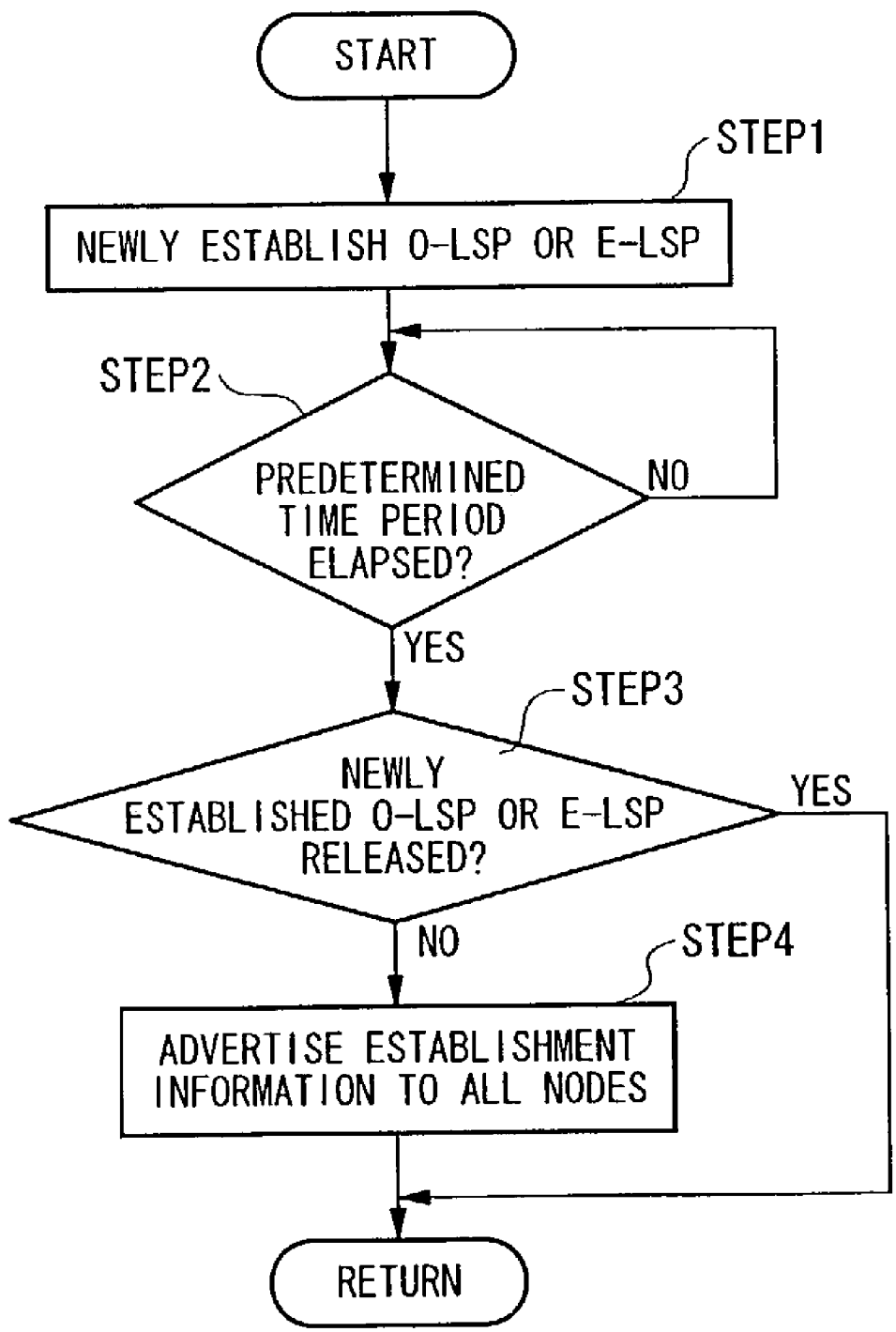
FIG. 9 is a flow chart showing an advertisement procedure according to the eighth preferred embodiment of the present invention.

The advertisement procedure of the eighth preferred embodiment of the present invention will now be explained with reference to FIG. 9. FIG. 9 is a flow chart showing the advertisement procedure of the eighth preferred embodiment of the present invention.

In the eighth preferred embodiment of the present invention, the specified condition is the condition that the O-LSP or the E-LSP which has been newly established by the node 1A through 3A or the border router 4A through 7A has not been released even after a predetermined time period has elapsed.

In other words, as shown in FIG. 9, the node 1A through 3A or the border router 4A through 7A newly establishes an O-LSP or an E-LSP (in the step 1), and after a predetermined time period has elapsed (in the step 2), if this O-LSP or E-LSP has not been released (in the step 3), the node 1A through 3A or border router 4A through 7A advertises the establishment information to all the nodes (in the step 4).

The Ninth Preferred Embodiment

Figure 10:
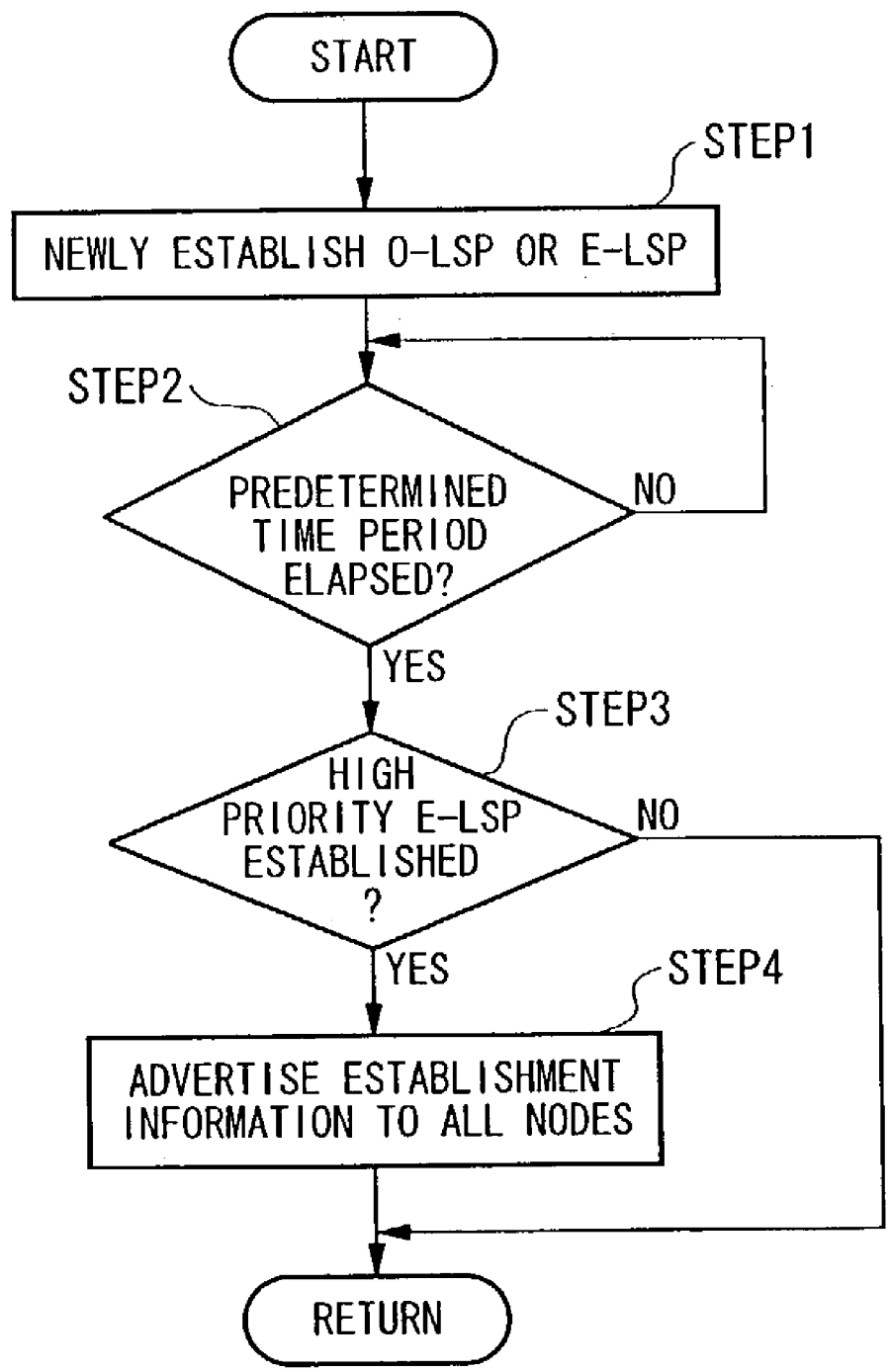
FIG. 10 is a flow chart showing an advertisement procedure according to the ninth preferred embodiment of the present invention.

The advertisement procedure of the ninth preferred embodiment of the present invention will be now explained with reference to FIG. 10. FIG. 10 is a flow chart showing the advertisement procedure of the ninth preferred embodiment of the present invention.

In this ninth preferred embodiment of the present invention, the specified condition is the condition that an E-LSP has been established whose priority exceeds a threshold value which determines the level of the priority within the priorities which are accorded when E-LSPs are being established, after a predetermined time period has elapsed from the fresh establishment of an O-LSP.

In other words, as shown in FIG. 10, the node 1A through 3A newly establishes an O-LSP (in the step 1), and after a predetermined time period has elapsed (in the step 2), if an E-LSP of high priority has been established by a border router 4A through 7A (in the step 3), it advertises the establishment information to all the nodes (in the step 4).

The Tenth Preferred Embodiment

Figure 11:
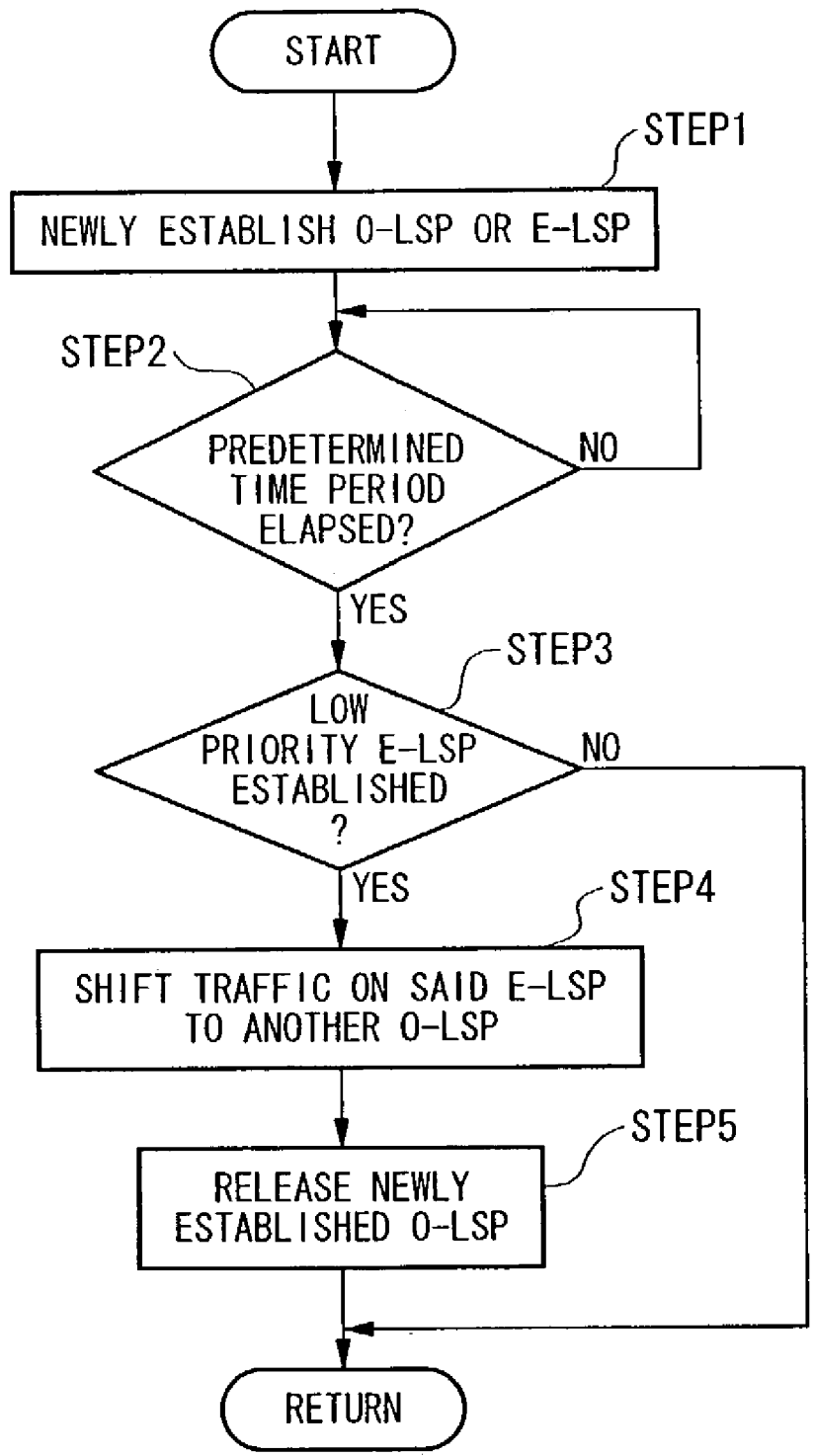
FIG. 11 is a flow chart showing a procedure for releasing an O-LSP according to the tenth preferred embodiment of the present invention.

The establishment procedure for an O-LSP of the tenth preferred embodiment of the present invention will now be explained with reference to FIG. 11. FIG. 11 is a flow chart showing the establishment procedure for an O-LSP of the tenth preferred embodiment of the present invention.

In this tenth preferred embodiment of the present invention, when an E-LSP has been established whose priority does not exceed a threshold value which determines the level of the priority within the priorities which are accorded when E-LSPs are being established after a predetermined time period has elapsed from the fresh establishment of an O-LSP, then the traffic upon the E-LSP is shifted to another O-LSP and the newly established O-LSP is released.

In other words, as shown in FIG. 11, a node 1A through 3A newly establishes an O-LSP (in the step 1), and after a predetermined time period has elapsed (in the step 2), if an E-LSP of low priority has been established (in the step 3), the traffic upon the E-LSP is shifted to another O-LSP (in the step 4), and the newly established O-LSP is released (in the step 5).

The Eleventh Preferred Embodiment

Figure 12:
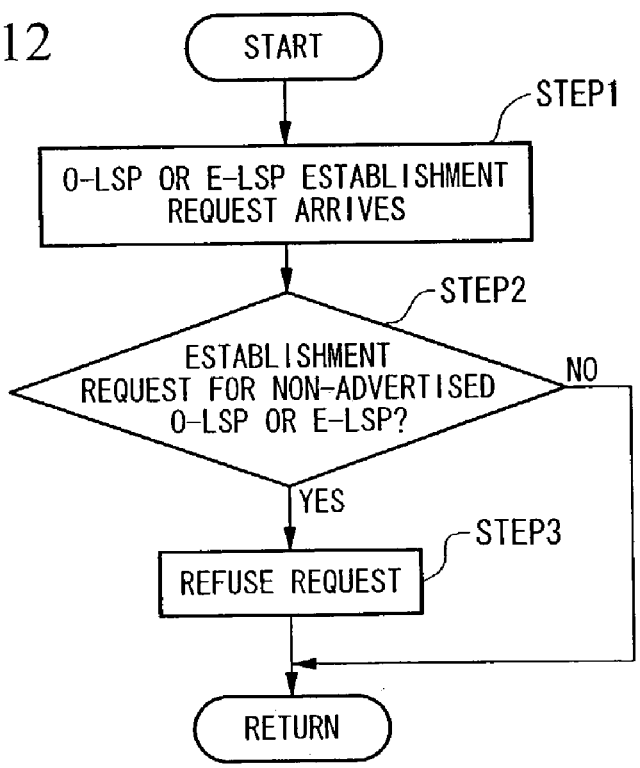
FIG. 12 is a flow chart showing a procedure for establishment request refusal according to the eleventh preferred embodiment of the present invention.

The establishment request refusal procedure of the eleventh preferred embodiment of the present invention will now be explained with reference to FIG. 12. FIG. 12 is a flow chart showing the establishment request refusal procedure of the eleventh preferred embodiment of the present invention.

In this eleventh preferred embodiment of the present invention, when, in relation to an O-LSP or E-LSP which has been newly established but has not been advertised by a node 1A through 3A or a border router 4A through 7A, there is an establishment request from another node to the node 1A through 3A or the border router 4A through 7A to duplicate the O-LSP or E-LSP, then the establishment request is refused.

In other words, as shown in FIG. 12, an establishment request for an O-LSP or E-LSP arrives (in the step 1), and if the O-LSP or E-LSP which is the object of this establishment request is an O-LSP or E-LSP which has been newly established but has not been advertised by a node 1A through 3A or a border router 4A through 7A (in the step 2), then this request is refused (in the step 3).

The Twelfth Preferred Embodiment

Figure 13:
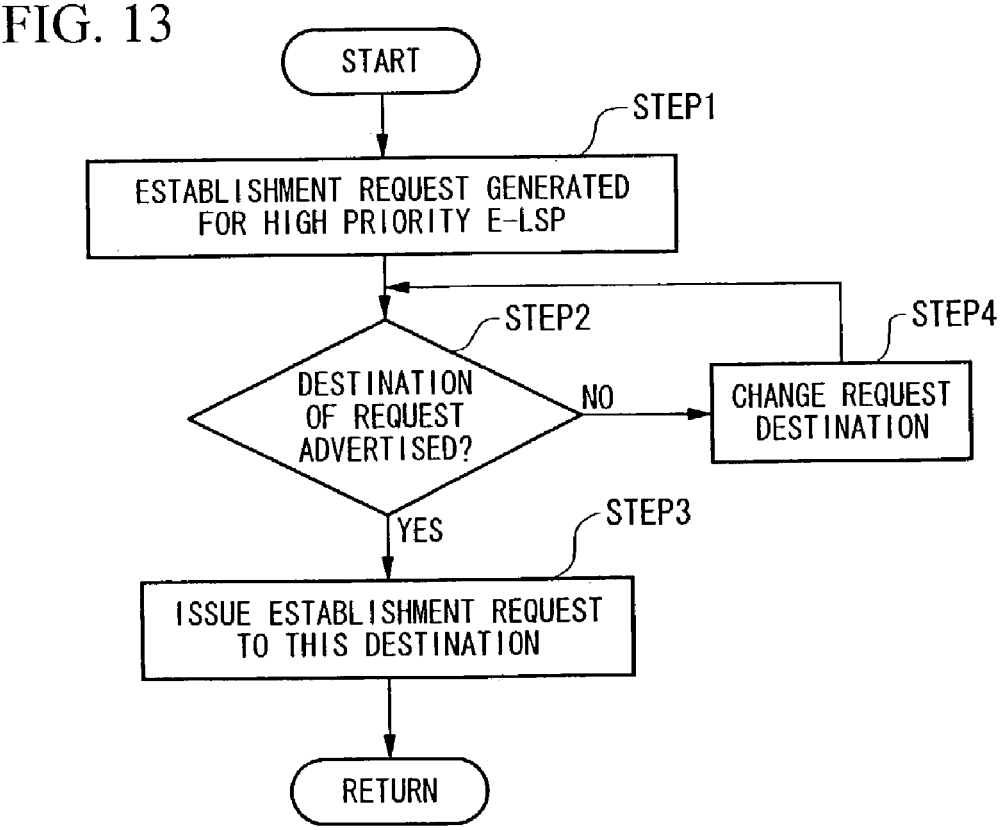
FIG. 13 is a flow chart showing an establishment procedure for an E-LSP according to the twelfth preferred embodiment of the present invention.

The establishment procedure for an E-LSP of the twelfth preferred embodiment of the present invention will now be explained with reference to FIG. 13. FIG. 13 is a flow chart showing the establishment procedure for an E-LSP of the twelfth preferred embodiment of the present invention.

In this twelfth preferred embodiment of the present invention, for an E-LSP of priority which exceeds a threshold value which determines the level of the priority which are accorded when E-LSPs are being established, its establishment over an O-LSP for which the establishment information has not been advertised to all the nodes is prohibited.

In other words, as shown in FIG. 13, when an establishment request has been generated for an E-LSP of high priority in a border router 4A through 7A (in the step 1), a decision is made as to whether or not the destination of this request is advertised (in the step 2), and if it is advertised then an establishment request is issued to this request destination (in the step 3). Furthermore, if it is not advertised (in the step 2), then the request destination is changed (in the step 4), and, finally, the establishment request is issued to the request destination (in the step 3).

The Thirteenth Preferred Embodiment

The function of controlling the nodes 1A through 3A and the border routers 4A through 7A of these preferred embodiments of the present invention can be implemented using a computer device, which is an information processing device. In detail, by installing upon a computer device a program which implements upon that computer device the function of controlling the nodes 1A through 3A or the border routers 4A through 7A which are utilized in the multi-layer photonic network of these preferred embodiments, by implementing a function of, when this itself is the node 1A through 3A or the border router 4A through 7A which is related to a newly established O-LSP or E-LSP, advertising to all the nodes the establishment information for the O-LSP or E-LSP which is kept by the node 1A through 3A or the border router 4A through 7A, provided that a specified condition is satisfied, and also a function of, if no traffic is present upon the newly established O-LSP or E-LSP after a predetermined time period has elapsed, or if, even after a predetermined time period has elapsed, although traffic is present, the traffic can be shifted to a different O-LSP or E-LSP, releasing the O-LSP or E-LSP, it is possible to implement the function of controlling the nodes 1A through 3A and the border routers 4A through 7A of the sixth preferred embodiment of the present invention upon that computer device.

Furthermore, by installing a program upon a computer device which implements a function of, if no traffic which exceeds a threshold value which is established for the network as a whole is present upon a newly established O-LSP or E-LSP after a predetermined time period has elapsed, shifting the traffic to another O-LSP or E-LSP and releasing the newly established O-LSP or E-LSP, it is possible to implement the function of controlling the nodes 1A through 3A and the border routers 4A through 7A of the seventh preferred embodiment of the present invention upon that computer device.

With the nodes 1A through 3A or the border routers 4A through 7A of the eighth preferred embodiment of the present invention, the specified condition is the condition that the newly established O-LSP or E-LSP is not released by the release function even after the predetermined time period has elapsed.

With the nodes 1A through 3A or the border routers 4A through 7A of the ninth preferred embodiment of the present invention, the specified condition is the condition that an E-LSP has been established of priority which exceeds a threshold value which determines the level of the priority within the priorities which are accorded when establishing E-LSPs after a predetermined time period has elapsed from a newly established O-LSP.

By installing a program upon a computer device which implements a function of, when an E-LSP has been established on a newly established O-LSP of priority which does not exceed a threshold value which determines the level of the priority among the priorities which are accorded when establishing E-LSPs after a predetermined time period has elapsed, shifting the E-LSP to another O-LSP and releasing the newly established O-LSP, it is possible to implement the function of controlling the nodes 1A through 3A or the border routers 4A through 7A of the tenth preferred embodiment of the present invention upon that computer device.

By installing a program upon a computer device which implements a function of, when it itself is a node related to a newly established O-LSP or E-LSP for which advertisement has not been performed by the advertising function, and when an establishment request for a new O-LSP or E-LSP arrives from another node, refusing the establishment request, it is possible to implement the function of controlling the nodes 1A through 3A or the border routers 4A through 7A of the eleventh preferred embodiment of the present invention upon that computer device.

By installing a program upon a computer device which implements a function of, for an E-LSP of priority which determines the level of the priority within the priorities which are accorded when E-LSPs are being established which exceeds a threshold value, prohibiting its establishment over an O-LSP for which the establishment information has not been advertised to all the nodes, it is possible to implement the function of controlling the border routers 4A through 7A of the twelfth preferred embodiment of the present invention upon that computer device.

By recording the program of these preferred embodiments upon the recording medium of these preferred embodiments, it is possible to install the program of these preferred embodiments upon a computer device by using this recording medium. Or, it is possible to install the program of these preferred embodiments directly upon a computer device via a network from a server upon which the program of these preferred embodiments is stored.

By doing this, using a computer device, it is possible to implement a multi-layer photonic network and a node with which it is possible to anticipate efficient operation by keeping the advertisement of establishment information for the optical paths and the electrical paths to the minimum necessary level.

Summary of the Sixth Through Twelfth Preferred Embodiments

The overall operation using the nodes 1A through 3A and the border routers 4A through 7A which were explained with reference to the sixth through the twelfth preferred embodiments of the present invention will now be explained. If, now, the traffic upon the electrical path EP2 increases, so that it has become impossible for the communication capacity of the optical path OP1 to deal with the increased traffic, then the node 1A newly establishes the optical path OP3, establishes the electrical path EP3 which uses the optical path OP3, and shifts the increased traffic to the electrical path EP3. However, the node 1A and the node 3A do not advertise the establishment information for the optical path OP3 and the electrical path EP3 to the other nodes, since, if the increased traffic is temporary, the optical path OP3 and the electrical path EP3 may well be released immediately, and the traffic between the border router 6A and the border router 7A may well return to the original electrical path EP2.

After a fixed period from when the optical path OP3 has been newly established, the traffic upon the electrical path EP3 is measured, and, if this traffic has already ceased, the node 1A directly releases the electrical path EP3 and the optical path OP3. If this traffic is still present, it is investigated as to whether or not the quantity of this traffic is such as to be able to be shifted to the original electrical path EP2, and if it is of such a quantity as can be shifted, then this traffic is shifted to the electrical path EP2, and the electrical path EP3 and the optical path OP3 are released. However if when this traffic was shifted to the electrical path EP2, the communication capacity of the optical path OP2 would be strained or exceeded (i.e., if it is detected that such shifting is not possible) then the optical path OP3 and the electrical path EP3 are taken to be paths which are to be continued over a long time period, and their establishment information is advertised to all the nodes.

Furthermore, a threshold value is set for the traffic quantity upon the newly established optical path OP3 and the electrical path EP3, and the traffic is measured after a fixed time period; and if this traffic is equal to or less than the threshold value, then the traffic is returned to the original electrical path EP2, and the electrical path EP3 and the optical path OP3 are released; whereas, if this traffic is equal to or greater than the threshold value, then the optical path OP3 and the electrical path EP3 are taken as paths which are to be continued over a long time period, and their establishment information is advertised to all the nodes.

Yet further, a priority is provided for the E-LSPs, and, if the priority of the E-LSP which uses the electrical path EP3 is low, then the traffic quantity is measured after a fixed time period and a decision is made as to whether or not it can be shifted to the original electrical path EP2. However, if the priority of the E-LSP which uses the electrical path EP3 is high, then the optical path OP3 and the electrical path EP3 are taken as paths which are to be continued over a long time period, and their establishment information is advertised to all the nodes.

Furthermore when, although the optical path OP3 and the electrical path EP3 are established, they are not advertised-to all the nodes, if the node 1A has requested from the node 3A the establishment of a new E-LSP of high priority using the optical path OP3, new E-LSP establishment requests are refused. The reason is that, when the advertisement for the optical path OP3 and the electrical path EP3 is withheld since they are temporary ones, if establishing a new E-LSP, it becomes impossible to release the optical path OP3 even if the traffic upon the original electrical path EP3 ceases.

In other words, if the optical path OP3 is a temporary one and accordingly its advertisement has been withheld, then, when establishing a new E-LSP which is to continue for a long time period, a requirement arises to re-advertise the existence of the optical path OP3. However since in this preferred embodiment this type of re-advertisement procedure is not assumed, and since furthermore the procedures would be made more troublesome by additionally providing the function of performing this type of re-advertisement procedure, accordingly in this preferred embodiment it is arranged to refuse establishment requests for new E-LSPs of high priority to the optical path OP3 for which advertisement has not been performed.

Furthermore, even when there is an establishment request from another node or border router to the O-LSP or E-LSP for which advertisement has not been performed for duplication of the O-LSP or E-LSP, then the establishment request is refused.

Figure 14:
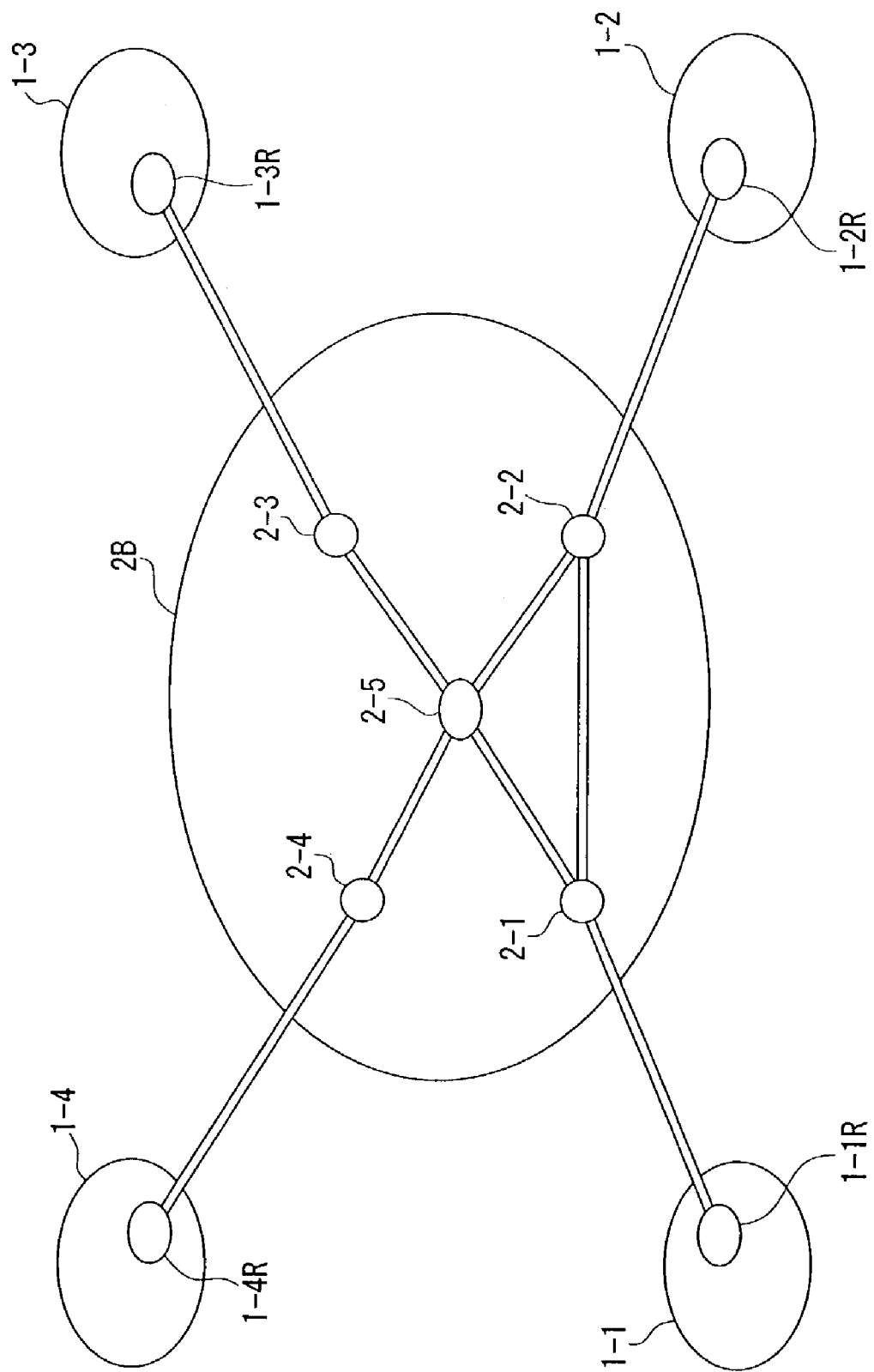
FIG. 14 is a drawing showing an example of a physical network structure with physical optical transmission lines and nodes.
Figure 15:
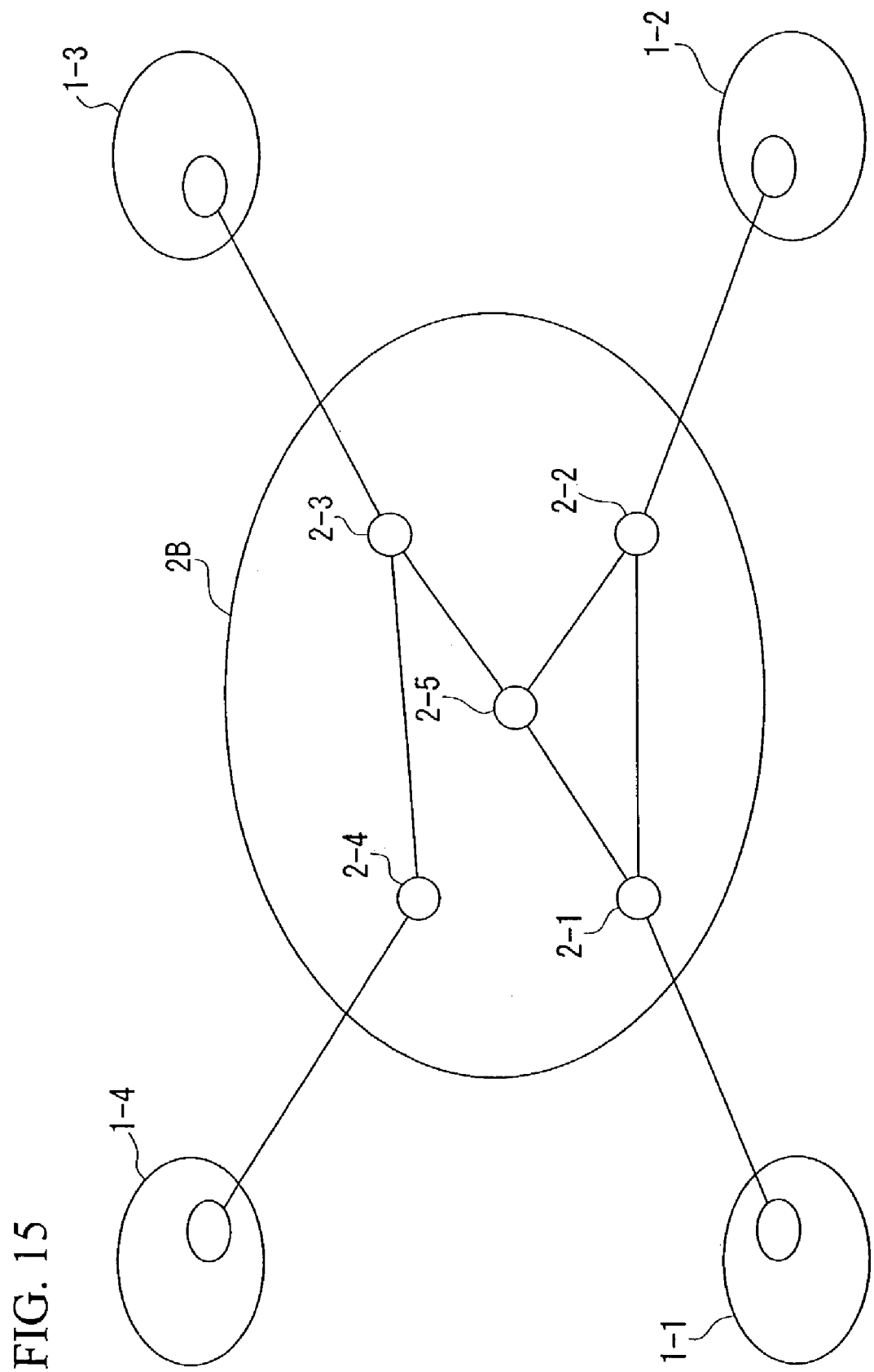
FIG. 15 is a drawing showing an example of a theoretical optical wavelength network structure which utilizes the physical structure of FIG. 14.
Figure 16:
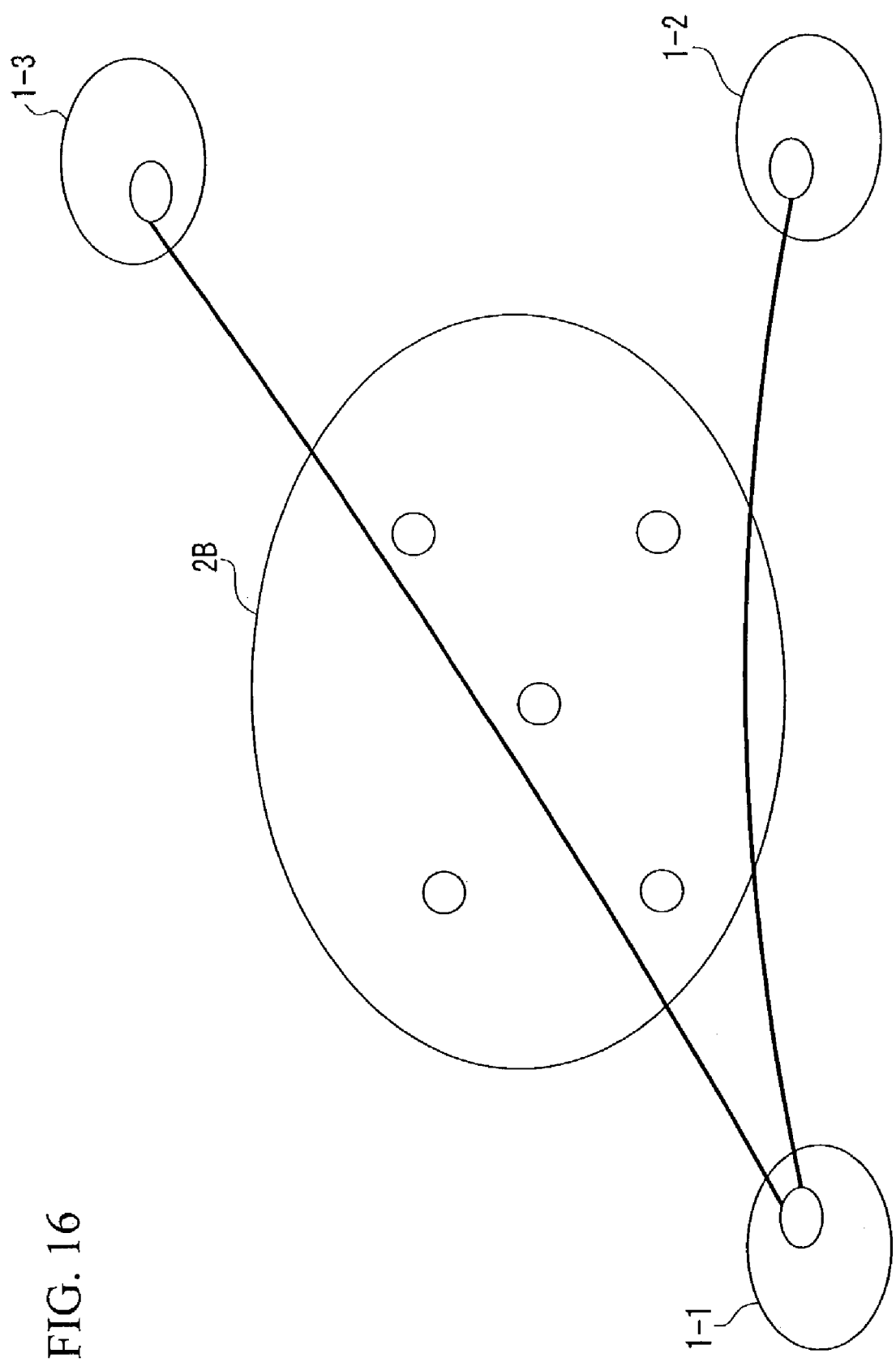
FIG. 16 is a drawing showing an example of the structure of an O-LSP.
Figure 17:
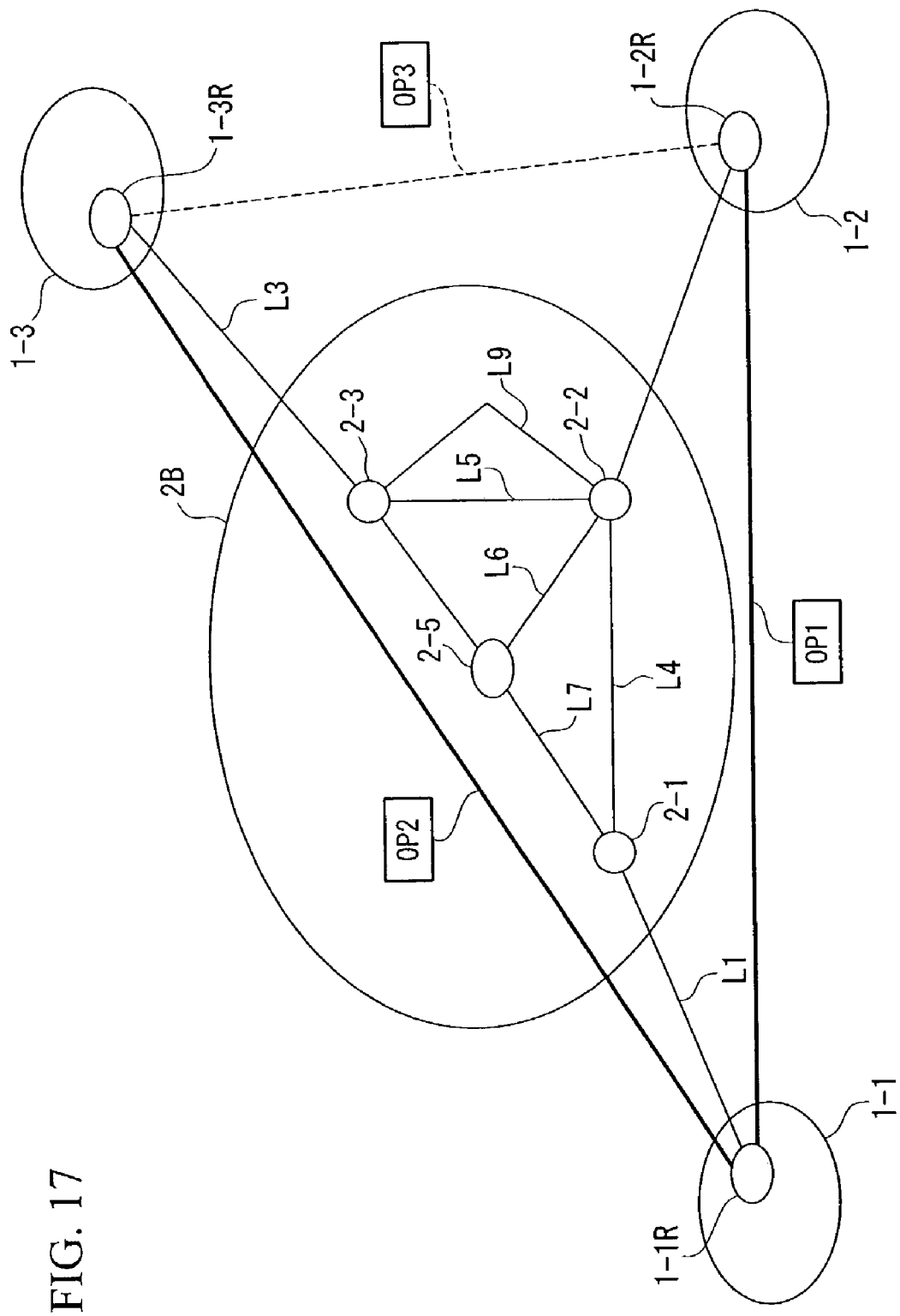
FIG. 17 is a drawing showing an example of a photonic network structure for explanation of a preferred embodiment of O-LSP path calculation.
Figure 18:
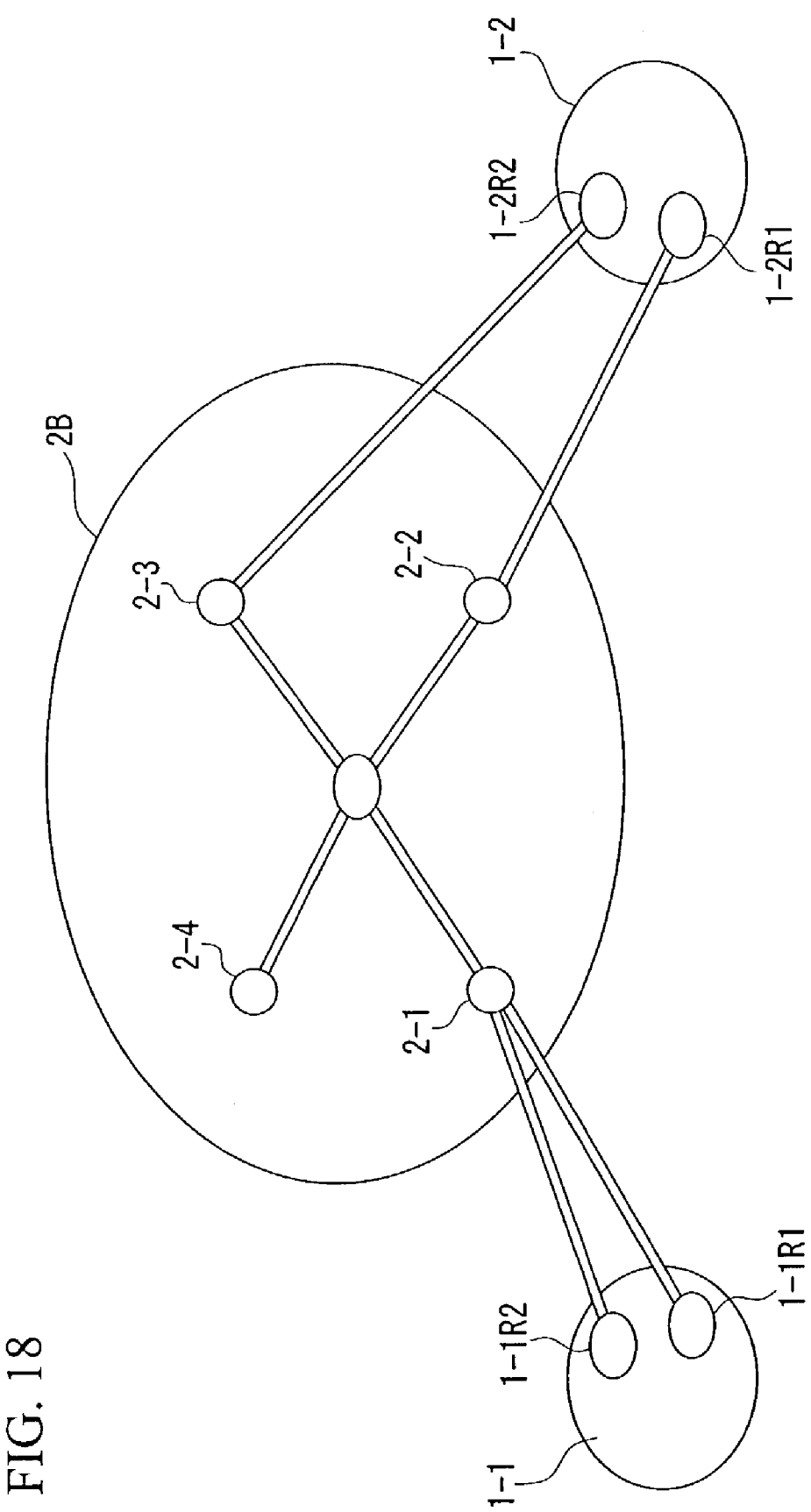
FIG. 18 is a drawing showing an example of a plurality of connection structures of sub-networks and a photonic network.
Figure 19:
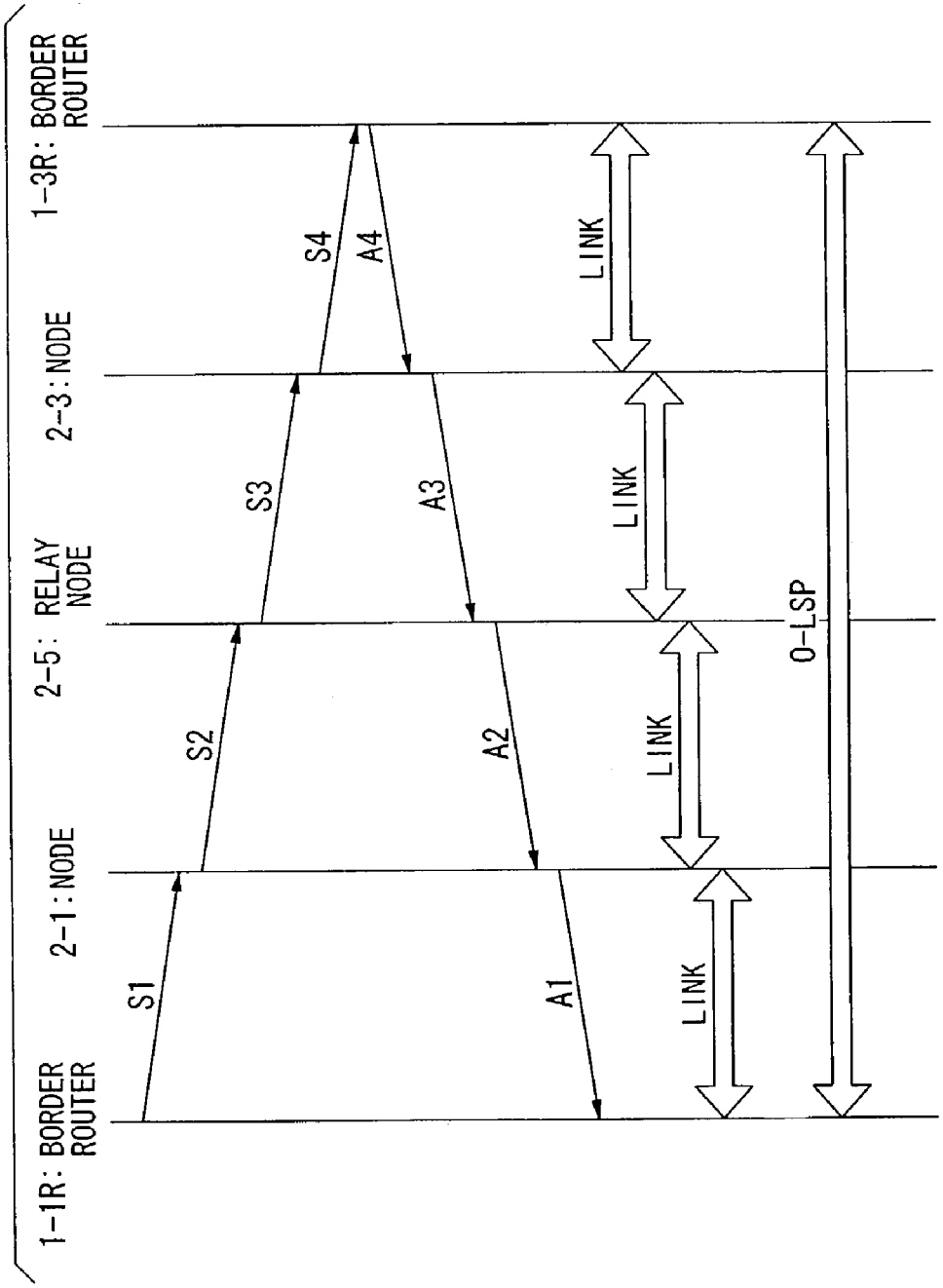
FIG. 19 is a drawing showing an example of a signal sequence when establishing an O-LSP between nodes.
Figure 20:
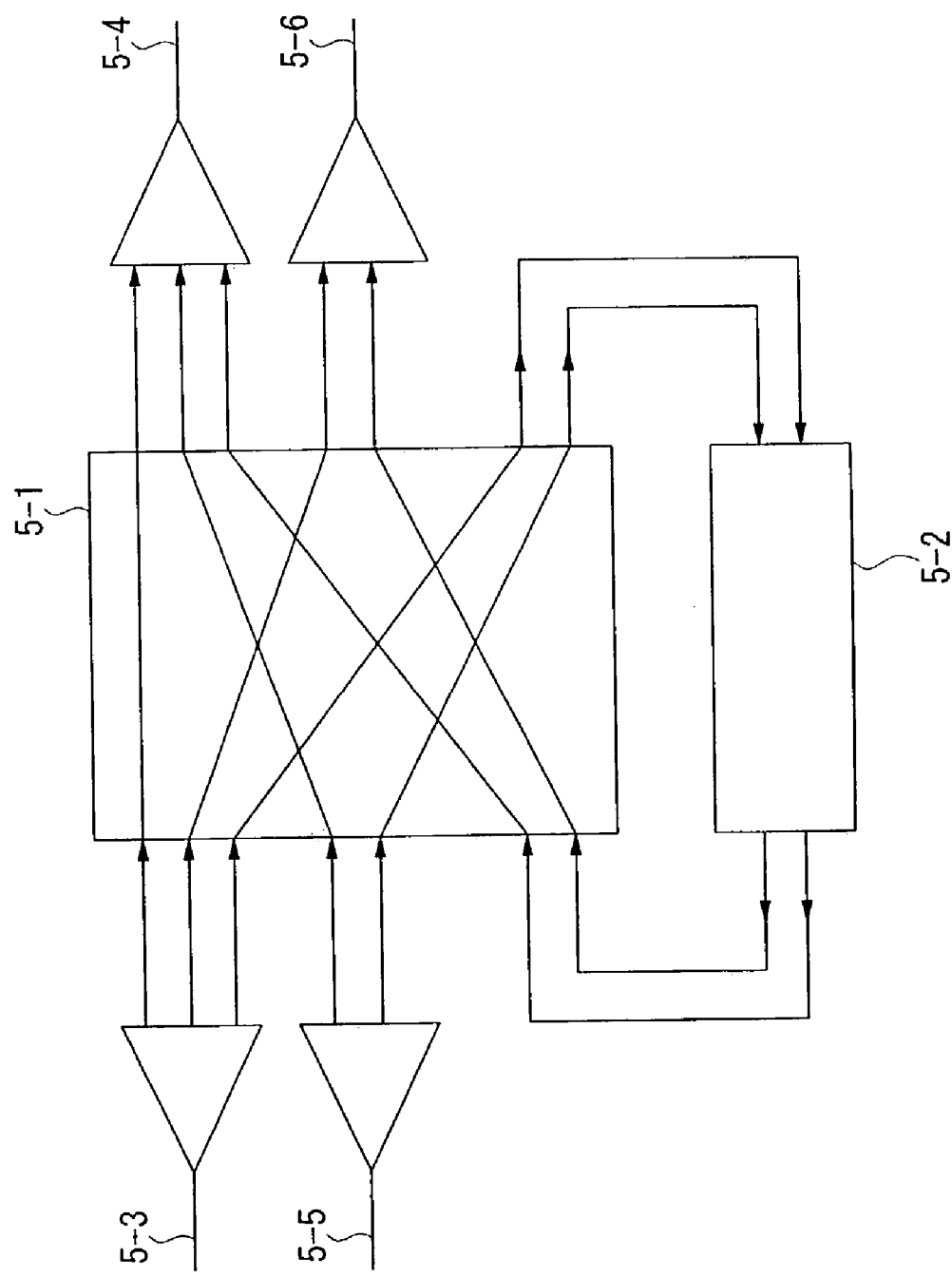
FIG. 20 is a drawing showing an example of a structure of a relay node according to the present invention.
Figure 21:
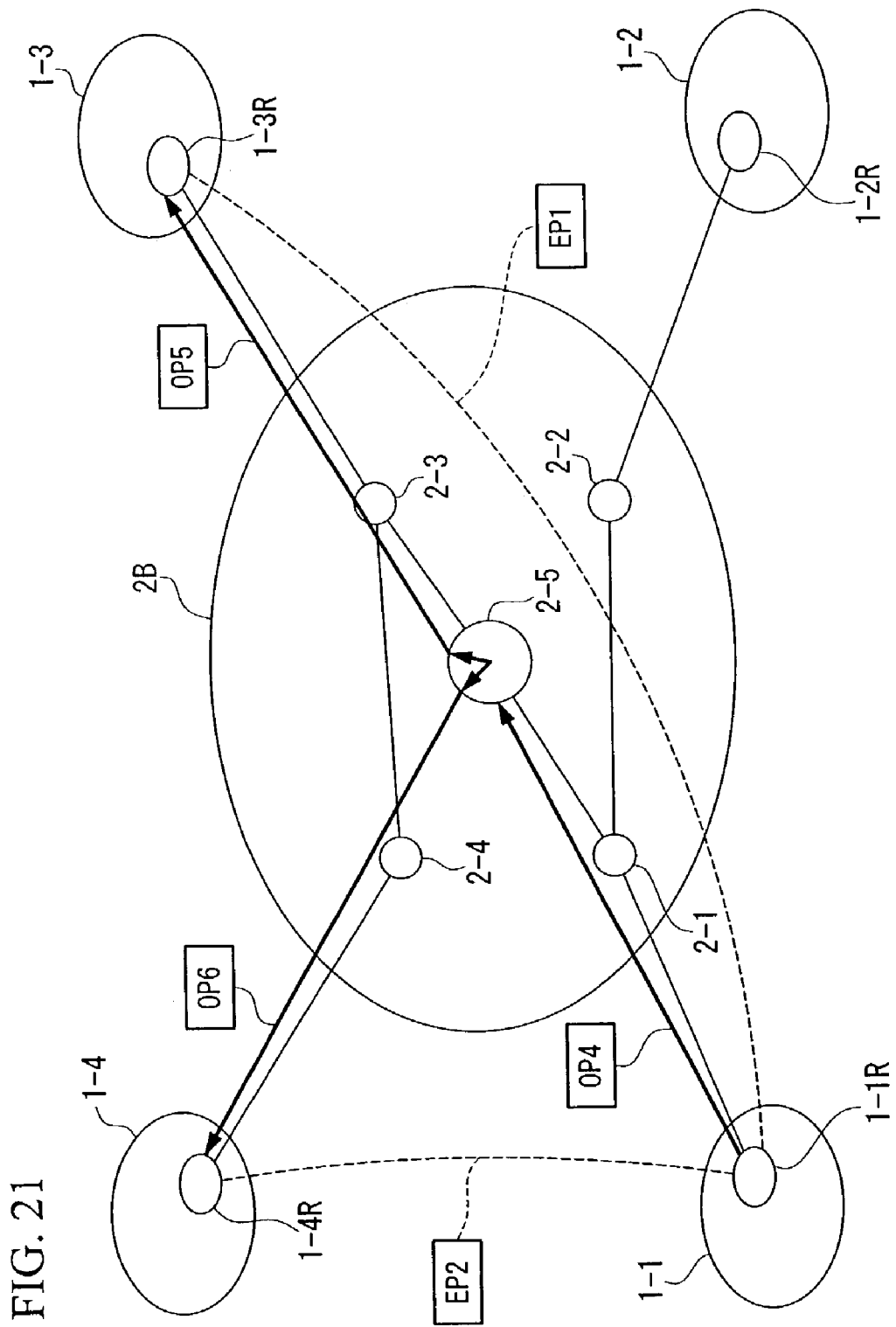
FIG. 21 is a drawing showing examples of structures of an O-LSP and an E-LSP, when a relay router is used.

The fourteenth through the eighteenth preferred embodiments of the multi-layer photonic network of the present invention will now be explained with reference to FIGS. 14 through 21. FIG. 14 is a diagram showing an example of a physical network structure which consists of physical optical transmission lines and nodes. FIG. 15 is a diagram showing an example of a theoretical optical wavelength network structure which utilizes the physical structure of FIG. 14. FIG. 16 is a diagram showing an example of the structure of an O-LSP. FIG. 17 is a diagram showing an example of a photonic network structure for explanation of a preferred embodiment of O-LSP path calculation. FIG. 18 is a diagram showing an example of a plurality of connection structures between sub-networks and a photonic network. FIG. 19 is a diagram showing an example of a signal sequence when establishing an O-LSP between nodes. FIG. 20 is a diagram showing an example of a structure of a relay node of the present invention. And FIG. 21 is a diagram showing examples of structures of an O-LSP and an E-LSP, when a relay router is used.

As shown in FIG. 14, the multi-layer photonic network of these fourteenth through eighteenth preferred embodiments of the present invention comprises a plurality of sub-networks 1-1 through 1-4 which perform switching and transfer in units of packets, and a photonic network 2B which is connected in common to this plurality of sub-networks 1-1 through 1-4, and is made up by optical transmission lines, nodes 2-1 through 2-4 which terminate these optical transmission lines, and an optical relay router 2-5; and the multi-layer photonic network is characterized in that LSC for performing switching in units of optical wavelengths or PSC for performing switching in units of packets are provided at the end points of optical wavelength links which mutually connect between the nodes 2-1 through 2-4 and the optical relay router 2-5, and between the nodes 2-1 through 2-4 and border routers 1-1R through 1-4R in the sub-networks 1-1 through 1-4, and by comprising optical paths both ends of which, as shown in FIG. 16, are connected to PSCs, and electrical paths which, as shown in FIG. 15, are made using one or a plurality of these optical paths, and both ends of which are connected to PSCs. It should be understood that each of the nodes 2-1 through 2-4, the optical relay router 2-5, and the border routers 1-1R through 1-4R is endowed with both LSC and PSC.

Furthermore, there are comprised calculating devices which calculate the optical paths as objects of optical wavelength links to which LSC is provided at least at their one ends, and devices which calculate the electrical paths based upon the optical paths which have been calculated by the above calculating devices; however, these devices are omitted from the drawing. These devices may be provided to each of the nodes 2-1 through 2-4, the optical relay router 2-5, and the border routers 1-1R through 1-4R; or, alternatively, a single one thereof may be provided for the entire network.

Furthermore, there is comprised an advertising device which, when establishment of the optical paths or the electrical paths has been performed based upon the results of calculation by the calculation devices, advertises the establishment information therefor to the nodes 2-1 through 2-4, the optical relay router 2-5, and the border routers 1-1R through 1-4R. It would be acceptable to make this advertising device and the calculation devices as a single device.

Furthermore, as shown in FIG. 18, a plurality of border routers 1-1R1, 1-1R2, 1-2R1, and 1-2R2 which connect to the photonic network 2B are provided within a single one of the sub-networks 1-1 or 1-2, and it is also possible to have a plurality of connection paths between a single one of the sub-networks 1-1 or 1-2 and the photonic network 2B.

Furthermore, the nodes 2-1 through 2-4, the optical relay router 2-5, and the border routers 1-1R through 1-4R comprise devices which change and release the establishment of the optical paths or the electrical paths in an autonomous and distributed manner based upon a policy which includes hop number, traffic conditions, and network cost. These devices which change and release such establishment may be structured as the same devices as the calculation devices or the advertising devices.

Furthermore, as shown in FIG. 20, there is provided an optical relay router 2-5 which comprises a router 5-1 which is a PSC and a photonic cross connect 5-2 which is an LSC, and, in this optical relay router 2-5, one portion of the input and output ports of the photonic cross connect 5-2 is connected to the router 5-1.

The device of these preferred embodiments can be implemented using a computer device, which is an information processing device. In more detail, by installing upon a computer device a program which implements, as a function which corresponds to a device which is applied to the multi-layer photonic network of these preferred embodiments, a function of calculating a path of the optical path, taking as object an optical wavelength link which is provided with LSC at least at one of its ends, and a function of calculating a path of the electrical path based upon the optical path which has been calculated by this calculation function, it is possible to make this computer device serve as a device which corresponds to the calculation device of these preferred embodiments.

Furthermore, by installing upon a computer device a program which implements a function of, when the optical path or the electrical path has been established based upon the result of calculation by the calculation function, advertising this establishment information to the nodes 2-1 through 2-4, to the relay router 2-5, and to the border routers 1-1R through 1-4R, it is possible to make this computer device serve as a device which corresponds to the advertisement device of these preferred embodiments.

Furthermore, by installing upon a computer device a program which implements a function of the nodes 2-1 through 2-4, the optical relay router 2-5, and the border routers 1-1R through 1-4R changing and releasing the establishment of the optical path and the electrical path in an autonomous and distributed manner, based upon a policy which includes hop number, traffic conditions, or network cost, it is possible to make this computer device serve as a device which corresponds to the establishment change and release device of these preferred embodiments.

By recording the program of these preferred embodiments upon a recording medium of these fourteenth through the eighteenth preferred embodiments, it is possible to install the program of these preferred embodiments upon a computer device by using this recording medium. Or, it is possible to install the program of these preferred embodiments directly upon an information processing device via a network from a server upon which the program of these preferred embodiments is stored.

By doing this, it is possible to implement a multi-layer photonic network which is capable of autonomously establishing, changing, and releasing optical paths according to demand upon electrical paths, using a computer device.

In the following, these preferred embodiments will be explained in greater detail.

The Fourteenth Preferred Embodiment

The fourteenth preferred embodiment of the present invention will now be explained with reference to FIGS. 14 through 16. The reference symbols 1-1, 1-2, 1-3, and 1-4 denote sub-network groups, while 1-1R, 1-2R, 1-3R, and 1-4R denote border routers within the sub-networks which are points where these sub-networks are connected to the photonic network. And the reference symbol 2B denotes the photonic network, while 2-1, 2-2, 2-3, 2-4, and 2-5 are nodes which are capable of exchange by units of optical wavelengths.

The connection points with the photonic network 2B at the border routers of the sub-network are defined as PSCs which are capable of exchange by units of packets, while the connection points between the nodes in the photonic network are defined as LSPs which are capable of exchange by units of optical wavelengths. When calculating paths, although paths which are LSC at least at their one ends, but, for the O-LSPs are selected as the O-LSPs which are optical wavelength links, it is necessary for both their ends to be PSC. Furthermore, although it is possible for the E-LSPs which are electrical paths to be made up via a plurality of O-LSPs, it is necessary for both their ends to be PSC.

First, in the photonic network 2B, all of the nodes in the photonic network 2B are connected with some other node using a physical optical transmission line, and moreover optical wavelength links are established so that all of the nodes can be connected together. Furthermore, optical wavelength links are established so that all of the sub-networks are connected to the photonic network.

Next, O-LSPs are established so that the sub-networks are connected in the order from the highest traffic between the sub-networks. For example, if traffic is present between the sub-network 1-1 and the sub-network 1-2, the border router 1-1R of the sub-network 1-1 requests to the node 2-1 of the photonic network the establishment of an O-LSP between the sub-network 1-1 and the sub-network 1-2. The node 2-1 calculates the route for which the number of hops is the least, and establishes an O-LSP between the sub-network 1-1 and the sub-network 1-2 using an optical wavelength link up to the node 2-2.

In other words, although connection from the node 2-1 to the node 2-2 via the node 2-5 might also be considered as a candidate, the route of direct connection from the node 2-1 to the node 2-2 is selected in the calculation, because it requires only one hop.

Furthermore, if traffic is present between the sub-network 1-1 and the sub-network 1-3, in the same manner, the establishment of an O-LSP with the sub-network 1-3 is requested to the node 2-1. Since it has no direct optical wavelength link with the node 2-3 which is connected to the sub-network 1-3, the node 2-1 uses an optical wavelength link with the relay node 2-5, and also the relay node 2-5 uses an optical wavelength link with the node 2-3, and the node 2-3 uses an optical wavelength link with the sub-network 1-3, and thereby the O-LSP between the sub-network 1-1 and the sub-network 1-3 is established.

If the sub-network side requires the establishment of an E-LSP due to traffic on the sub-network side with a cooperating sub-network, its establishment is requested to the photonic network, and the photonic network diverts an already existing O-LSP or newly establishes an O-LSP, thus satisfying the E-LSP establishment request from the sub-network, and moreover calculates the path over the photonic network for which the efficiency is the highest.

FIG. 16 shows an example of the structure of an O-LSP which has been set up in this manner. Although the E-LSP is made using these O-LSPs, no change is made for the E-LSP, even if for convenience there is some change in the path of the O-LSPs due to the occurrence of congestion or trouble upon the photonic network. In other words, it is possible to consider the E-LSP as a single link which is directly connected between the border routers in the sub-network, without any relation to the path of the O-LSPs.

The establishment information for the above described O-LSP is made known to all the nodes upon the photonic network, and each of the nodes maintains all the link information for the photonic network. When establishing a new O-LSP or E-LSP, the information for the O-LSPs and E-LSPs which already exist is referred to. In other words, with this preferred embodiment of the present invention, there is the beneficial point that it is always possible to set up the O-LSPs upon the photonic network in the most efficient manner.

The Fifteenth Preferred Embodiment

The fifteenth preferred embodiment of the present invention will now be explained with reference to FIG. 17. The reference symbols L1 through L8 denote O-LSPs which are connected between the nodes, while OP1 and OP2 respectively connect together the sub-network 1-1 and the sub-network 1-2, and the sub-network 1-1 and the sub-network 1-3. Now, if an establishment request has been made to the node 2-2 for an O-LSP between the sub-network 1-2 and the sub-network 1-3, the node 2-2 extracts from a link establishment data base which is maintained by this node the establishment information for the O-LSP and a point at which PSC is available, and calculates the most efficient path from the border router 1-2R to the border router 1-3R. For example, the calculation is performed for the cases of establishing the path L2-L5-L3, or the path L2-L6-L8-L3, or the path L2-L4-L7-L8-L3, or a direct O-LSP between the nodes 2-2 and 2-3, or the like, in consideration of factors such as the number of hops, the traffic conditions, the network cost, and the like. Which factor is regarded as of what importance is decided according to the policy of the network. The node 2-2 makes up the optical path OP3 from the paths which, from the result of this calculation, it has decided have the greatest efficiency, and requests its establishment to the relevant nodes. The link establishment information related to the optical path OP3 is advertised to all the nodes upon the photonic network 2B.

The Sixteenth Preferred Embodiment

The sixteenth preferred embodiment of the present invention will now be explained with reference to FIG. 18. The sub-network 1-1 comprises the border routers 1-1R1 and 1-1R2, each of which is connected to the node 2-1 of the photonic network. Furthermore, the sub-network 1-2 comprises the border routers 1-2R1 and 1-2R2, which are connected to the nodes 2-2 and 2-3 of the photonic network respectively.

Now if, with the sub-network 1-1 using only the border router 1-1R1 for traffic with the photonic network 2B, congestion should occur in communication with some other sub-network, then it is possible to mitigate the congestion by bypassing a portion of the traffic to the border router 1-1R2. Furthermore, by having a plurality of border routers for a single sub-network, it is possible to contemplate distributing the load within the sub-network. Yet further, with the sub-network 1-2, since two border routers are connected to two of the nodes, even if congestion has occurred at the node 2-2, it is possible to contemplate sharing the load with the node 2-3. By thus having a plurality of points of connection between a sub-network and the photonic network, it is possible to anticipate load distribution, and this is a significant advantage from the point of view of congestion; moreover, there is also the beneficial aspect that the reliability is enhanced by providing a plurality of border routers.

The Seventeenth Preferred Embodiment

The seventeenth preferred embodiment of the present invention will now be explained with reference to FIG. 19. The border router 1-1R requests (S1) the node 2-1 to establish an O-LSP having a bandwidth of 10M bits/sec with the border router 1-3R. The node 2-1 calculates the route for this O-LSP for which the efficiency is the highest, and ensures (S2) a bandwidth of 10M bits/sec by performing negotiation with the relay node 2-5 and establishing or using an optical wavelength link with that node 2-5. Next, the relay node 2-5 ensures a bandwidth of 10M bits/sec (S3) by establishing or using an optical wavelength link with the node 2-3. The node 2-3 then ensures (S4) a bandwidth of 10M bits/sec with the border router 1-3R. When it has been possible to ensure a bandwidth of 10M bits/sec over the entire route, then the O-LSP of 10M bits/sec between the border router 1-1R and the border router 2-3R is completed. If partway through it has not been possible to ensure the 10M bits/sec which has been requested, then the route for the O-LSP is calculated again, and another route is sought for.

Further, the node 2-1 which has received an request from the border router 1-1R for the establishment of an O-LSP could also designate the entire O-LSP route up to the destination sub-network and could request the establishment of an optical wavelength link to the next node; or, without designating the O-LSP route as far as the destination sub-network, it could entrust this task to the next node or to a subsequent node. If, in heavy traffic conditions, it is desired to specify exactly which route is to be taken over the photonic network, or if it is desired to practice a method of use such as a conventional common carrier leased line or the like, then the O-LSP is established according to the former request. In this type of case, change of the O-LSP due to traffic fluctuations is not frequently accomplished.

On the other hand, if the O-LSP is established without designating its route, then it is possible to use the most efficient O-LSP route for the convenience of the photonic network, and it is also possible to change the route of the O-LSP with traffic fluctuations or the like. The price of utilization which users of the sub-network must pay to the administrator of the photonic network, naturally, is relatively higher for the former, and is cheaper for the latter.

Autonomous and distributed control is provided by each node performing establishment of O-LSPs and negotiation of their use with subsequent nodes. Furthermore, in addition to performing the establishment or the use of an O-LSP with the next node upon a request from another node, in a case such as, for example, when the usage ratio upon some route becomes high and congestion occurs, or if it is not possible to perform communication due to malfunction of the transmission line or the like, the provision of an E-LSP is ensured by establishing or using an O-LSP upon another route, according to a decision made by the node itself.

In other words, since the nodes upon the photonic network set up the most suitable O-LSPs by making decisions autonomously, there is the beneficial aspect that human intervention by the maintenance personnel or the like is not required. Furthermore, there is the beneficial point that is possible to reduce the downtime for communication due to malfunctions or the like, since, even if it is not possible to operate a portion of the photonic network due to a malfunction, a bypass route is automatically set up.

The Eighteenth Preferred Embodiment

The eighteenth preferred embodiment of the present invention will now be explained with reference to FIGS. 20 and 21. The reference symbol 5-1 denotes a photonic cross connect which switches in units of optical wavelengths, while the reference symbol 5-2 is a packet router which performs exchange in units of packets, and the reference symbols 5-3 and 5-4 are input ports connected to other nodes, at which a plurality of optical wavelengths are bundled. Moreover, in the same manner, the reference symbols 5-5 and 5-6 are output ports connected to other nodes, at which the plurality of optical wavelengths are re-bundled. The bundled optical wavelength input is decomposed into each wavelength, enters into the photonic cross connect, and is converted into the optical wavelengths for and is outputted at the output ports which are set up for each optical wavelength. Furthermore, since a portion the outputs of the photonic cross connect 5-1 is connected to the packet router 5-2, it is possible to change its destination by packet units in the packet router 5-2. In other words, the relay node according to the present invention is not only endowed with an LSP function, but also is endowed with a PSC function; and, while packets are transmitted from another node to this relay node by using a single O-LSP, they can be temporarily decomposed into packet units in this relay node, can be routed to the destination of each packet, and then can be again put onto their respective O-LSPs and transmitted.

FIG. 21 shows an example of a structure for O-LSPs and E-LSPs when the relay router of this preferred embodiment is utilized. The reference symbols OP4, OP5, and OP6 denote O-LSPs, while EP1 and EP2 are E-LSPs. OP4 is set up from the border router 1-1R to the relay node 2-5, while OP5 is set up from the relay node 2-5 to the border router 1-3R, and OP6 is set up from the relay node 2-5 to the border router 1-4R; and EP1 is set up between the border router 1-1R and the border router 1-3R using OP4 and OP5, and EP2 is set up between the border router 1-1R and the border router 1-4R using OP4 and OP6. By the router in the relay node 2-5 routing the destinations for each packet, it becomes possible to manage with only a single O-LSP between the border router 1-1R and the relay node 2-5.

In this manner, with the photonic network according to this preferred embodiment, the O-LSP of the highest efficiency is always set up, and there is the beneficial point that it is possible to maintain the E-LSP structure which is requested by the user. Furthermore, by having a plurality of connection points between the sub-networks and the photonic network, there is the beneficial aspect that it is possible easily to respond to congestion, and furthermore, by providing a plurality of border routers, there is the beneficial point that the reliability is enhanced. Moreover, there is the beneficial aspect that it is not necessary for the network maintenance personnel or the like to perform manual intervention, since the most suitable O-LSPs are set up by the nodes within the photonic network making decisions autonomously. Yet further, there is the beneficial point that it is possible to reduce the downtime in communication due to malfunctions or the like, since, even if a portion of the photonic network cannot be operated due to a malfunction, a bypass route is automatically set up. Even further, there is the beneficial aspect that it is possible to utilize the photonic network at high efficiency, since the relay node is capable of functioning, not only as an O-LSP relay, but also as an E-LSP relay.

Figure 22:
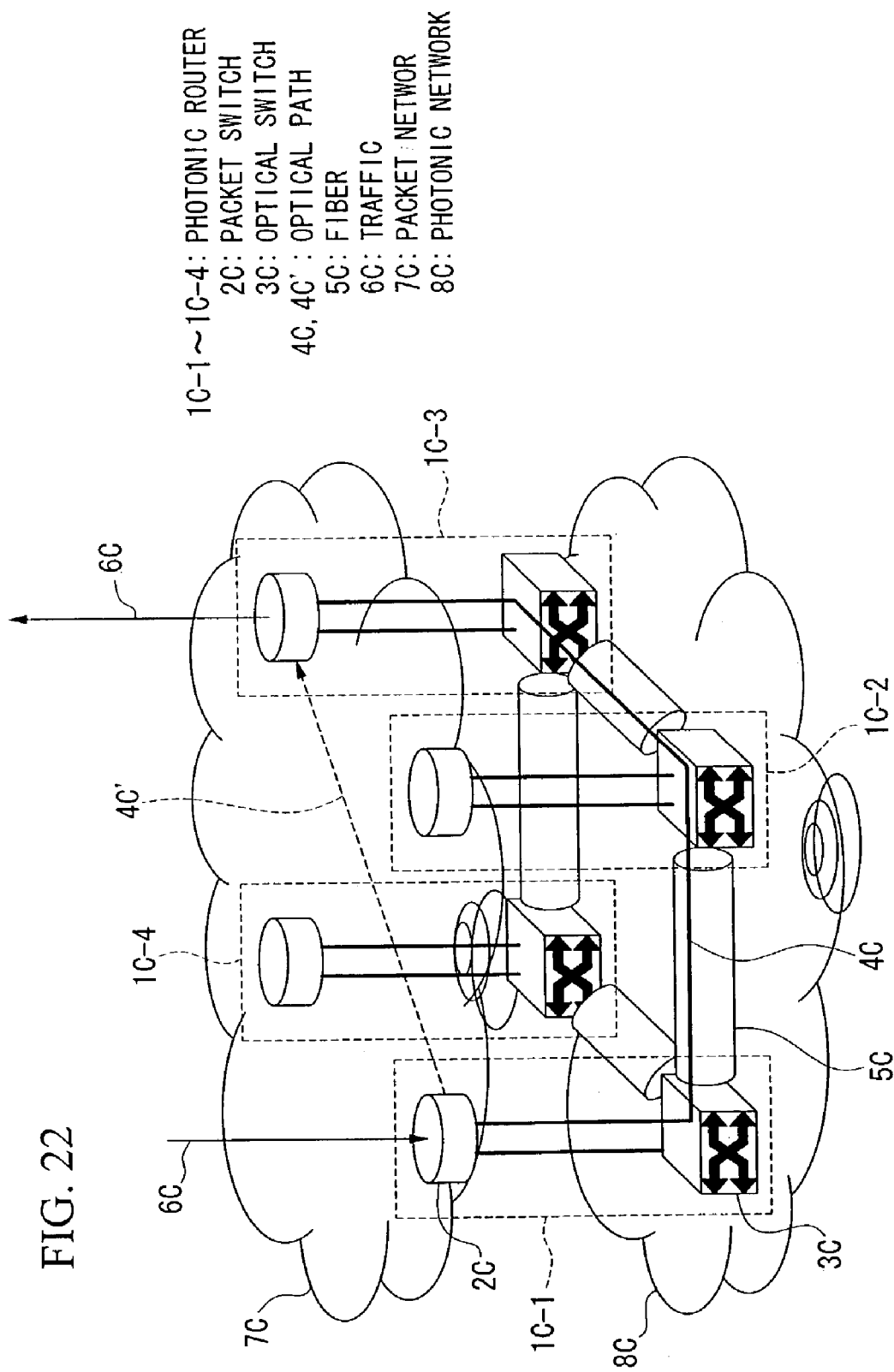
FIG. 22 is a drawing showing an example of a structure of a network system according to the nineteenth through twenty-third preferred embodiments of the present invention.

FIG. 22 shows an example of the structure of a network system according to the nineteenth through the twenty-third preferred embodiments of the present invention. These nineteenth through twenty-third preferred embodiments premise a multi-layer network which comprises a packet network 7C (packet link: E-LSP) which is made up from optical path links by packet switches 2C (packet switching capability: PSC) and optical paths 4C (4C'), and a photonic network 8C (optical wavelength link: O-LSP) which comprises optical switches 3C (optical wavelength switching capability: LSC) and fiber links by fibers 5C.

It should be understood that the packet network 7C is a packet cell switching network, and in the case of the Internet is an IP network. The reference symbol 4C in the drawing denotes an optical path (link) which is a path along which signals are actually transferred, while the symbol 4C' denotes a conceptual link which is an optical path as seen from the point of view of the packet network. The reference symbol 6C denotes traffic.

This type of multi-layer network can be made with photonic routers 1C (1C-1 through 1C-4) which are implemented in an integrated manner from the packet switches 2C and the optical switches 3C.

Figure 23:
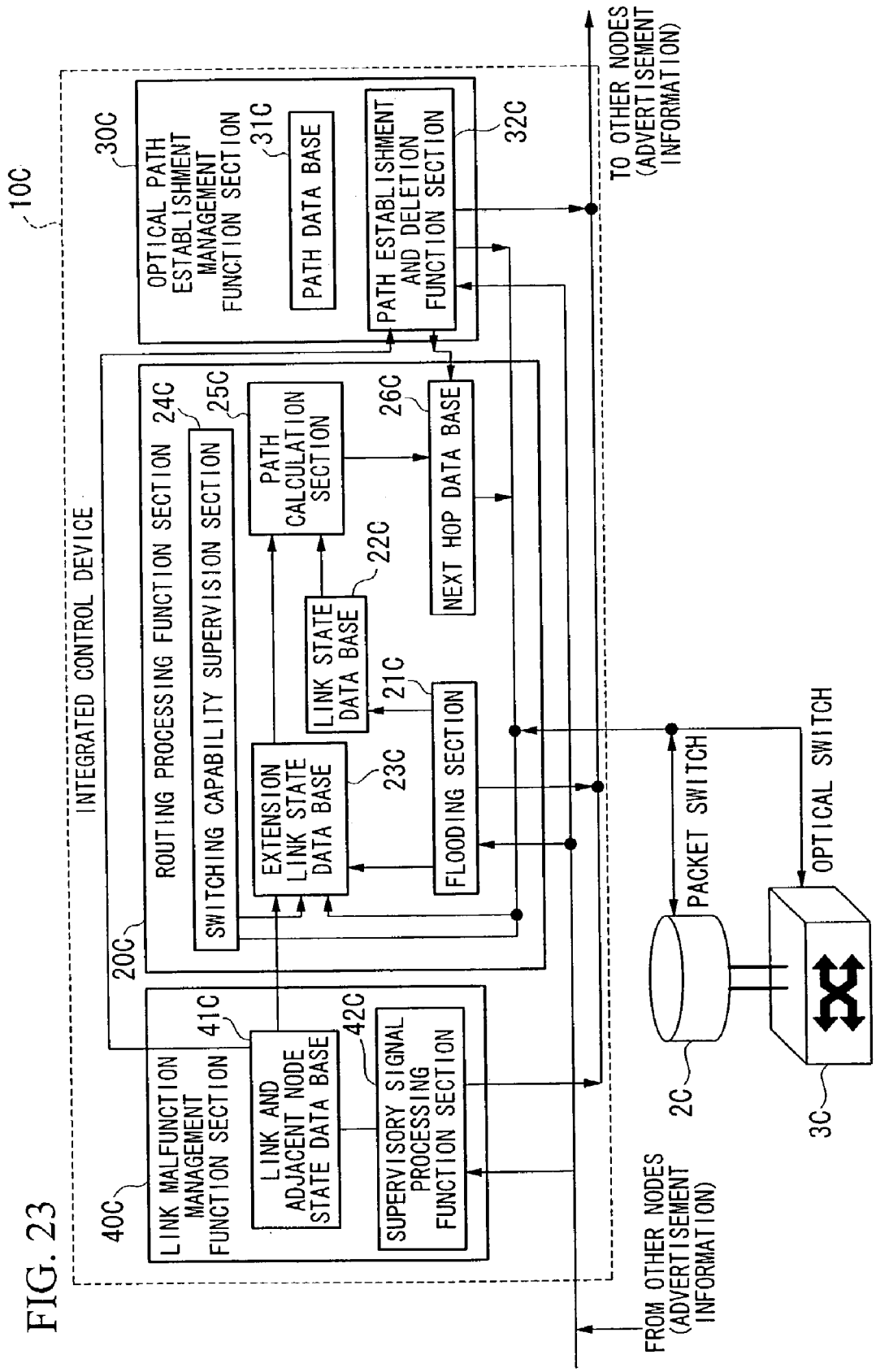
FIG. 23 is a drawing showing an example of a photonic router which is used in the nineteenth through twenty-third preferred embodiments.

This photonic router 1C, as shown in FIG. 23, comprises a packet switch 2C, an optical switch 3C, and an integrated control device (a GMPLS controller) 10C which manages them in an integrated manner. Control signals are mutually exchanged between the integrated control devices 10C for the various photonic routers 1C via control signal lines.

128×128 switching is used in the optical switch 3C, and it has a capability of inputting and outputting four fiber links upon which the optical path is 32 wavelength multiplexed.

The transmission rate of each of the optical paths is 2.5 G bits/sec, and they are terminated by SONET OC-48 interfaces.

The control signal lines have a transmission rate of 155M bits/sec, and are made with SONET OC-3 lines; and the control signals which are propagated over them may, for example, be OSPF/IS-IS protocol packets for acquiring the network topology of the photonic router network, or may be RSVP-TE/CR-LDP protocol packets for establishing and releasing the optical paths which are to be established between packet switching devices; or they may be LMP (Link Management Protocol) packets which perform malfunction supervision for the fiber links.

Accordingly, the integrated control device 10C for each of the photonic routers IC implements function sections for processing these control signal protocols, and comprises a routing processing function (OSPF/IS-IS protocol processing function) section 20C, an optical path establishment processing function (RSPV-TE/CR-LDP protocol processing function) section 30C, and a malfunction management function (LMP protocol processing function) section 40C for the optical fibers and the links to the adjacent nodes.

The routing processing function section 20C comprises a flooding section 21C, a link state data base (DB) 22C, an extension link state data base (DB) 23C, a switching capability supervision section 24C, a path calculation section 25C, and a next hop data base (DB) 26C.

The flooding section 21C is a function section which communicates to the adjacent nodes the link state information which it has collected from its own node and from other nodes. The link state data base 22C and the extension link state data base 23C are data bases which retain the link information which has been collected from other nodes, and the optical path link state information is stored in the link state data base 22C, while the fiber link state information is stored in the extension link state data base 23C.

Here the optical path link state information which is stored in the link state data base 22C is, in concrete terms, vacancy information and cost information for the optical path links which are connected to two packet switches and which are also accommodated to fiber links. Furthermore, the fiber link state information which is stored in the extension link state data base 23C is, in concrete terms, vacancy information and cost information for the fiber links which are connected to two optical switches.

The switching capability supervision section 24C is a function section which supervises the switching state of its own node. For example if in the switching of its own node, not only is there a function of establishing an optical path into the optical switch 3C, but also a capacity is present to accommodate an optical path into the packet switch 2C, then it advertises to the other nodes the fact that a switching capability for packet switching/optical switching is available.

The path calculation section 25C performs calculation for optical paths (O-LSPs) established from the link state data base 22C, and for theoretical paths (LSPs) or packet transfer paths which are switched by the packet switch 2C.

The next hop data base 26C is a data base in which the results of path calculation are stored, and it temporarily stores information as to which interface the packets which arrive at each node should be used to transfer the packets.

The optical path establishment management function section 30C comprises a path data base (DB) 31C in which optical path information is stored, and a path establishment and deletion function section 32C which performs establishment and deletion of optical paths.

Furthermore, the link malfunction management function section 40C comprises a link and adjacent node state data base (DB) 41C which maintains state information for the optical fibers and the adjacent nodes, and a supervisory signal processing function section 42C which performs supervision of the advertisement information from the other nodes and detection of link malfunctions and the like.

For each layer of the network, the respective link cost is defined by the previously described routing processing function section 20C. In other words, the routing processing function section 20C defines both costs for the fiber links which connect two of the optical switches, and also costs for the optical path links which connect two of the packet switches and which are moreover accommodated in the fiber links. The costs of the optical paths which are accommodated in the fiber links, and the transfer cost of the packet traffic which is accommodated in the optical path links, are calculated from these costs in accordance with a Dijkstra algorithm, and the packet traffic is subjected to transfer processing by the routes for which the totals of the costs between the start points and the end points of the traffic are minimum, while the optical paths are established upon the routes for which the costs over the intervals between the start points and the end points which are established are minimum.

Here, the cost of the fiber links may be allocated using values such as the lengths of the various fiber intervals, the reciprocals of the capacities of the fiber links (the reciprocals of the numbers of optical paths which can be accommodated in them), or the expenditure which was actually required for their construction. By contrast, the cost of the optical path links which are established between two packet switches may be allocated using values such as the reciprocal of the transmission rate of each optical path, or the sum of the fiber link costs which are accommodated in the optical paths multiplied by some constant value. In this manner, it is usual for the costs of the fiber links and of the optical path links upon the same path to be defined as having different values.

The Nineteenth Preferred Embodiment

With this preferred embodiment of the present invention, when, in a network such as that shown in FIG. 22, an accommodation request arises for packet traffic between specified grounds, first a search is made for the shortest path as seen from the packet network 7C (i.e., the path with the minimum optical path link cost). If it is possible to arrive at the destination by an optical path which is already established, then the packet traffic is accommodated in this path, while if it is not possible, then an optical path is newly established.

Figure 24:
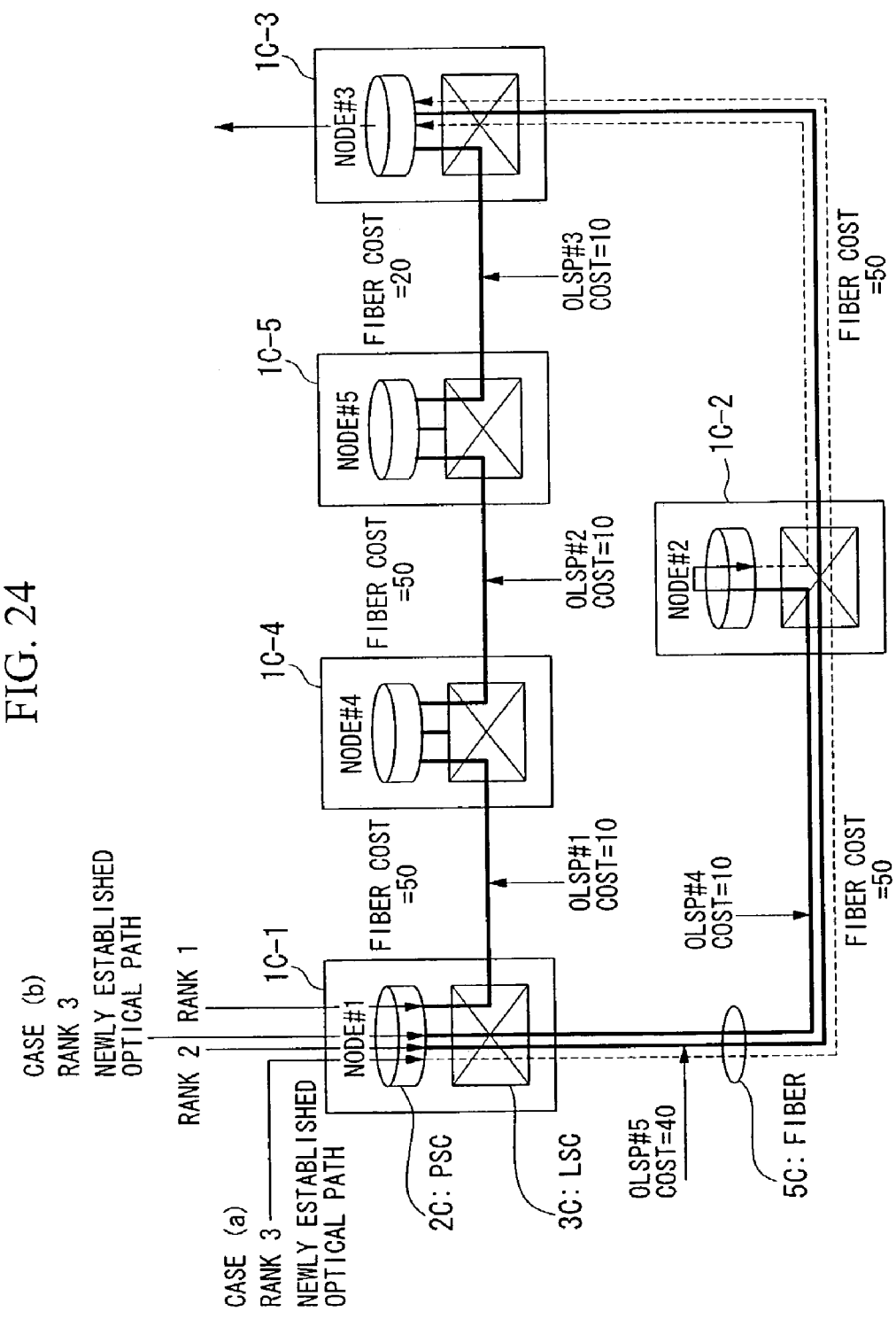
FIG. 24 is a drawing for explanation of the nineteenth preferred embodiment of the present invention.
Figure 25:
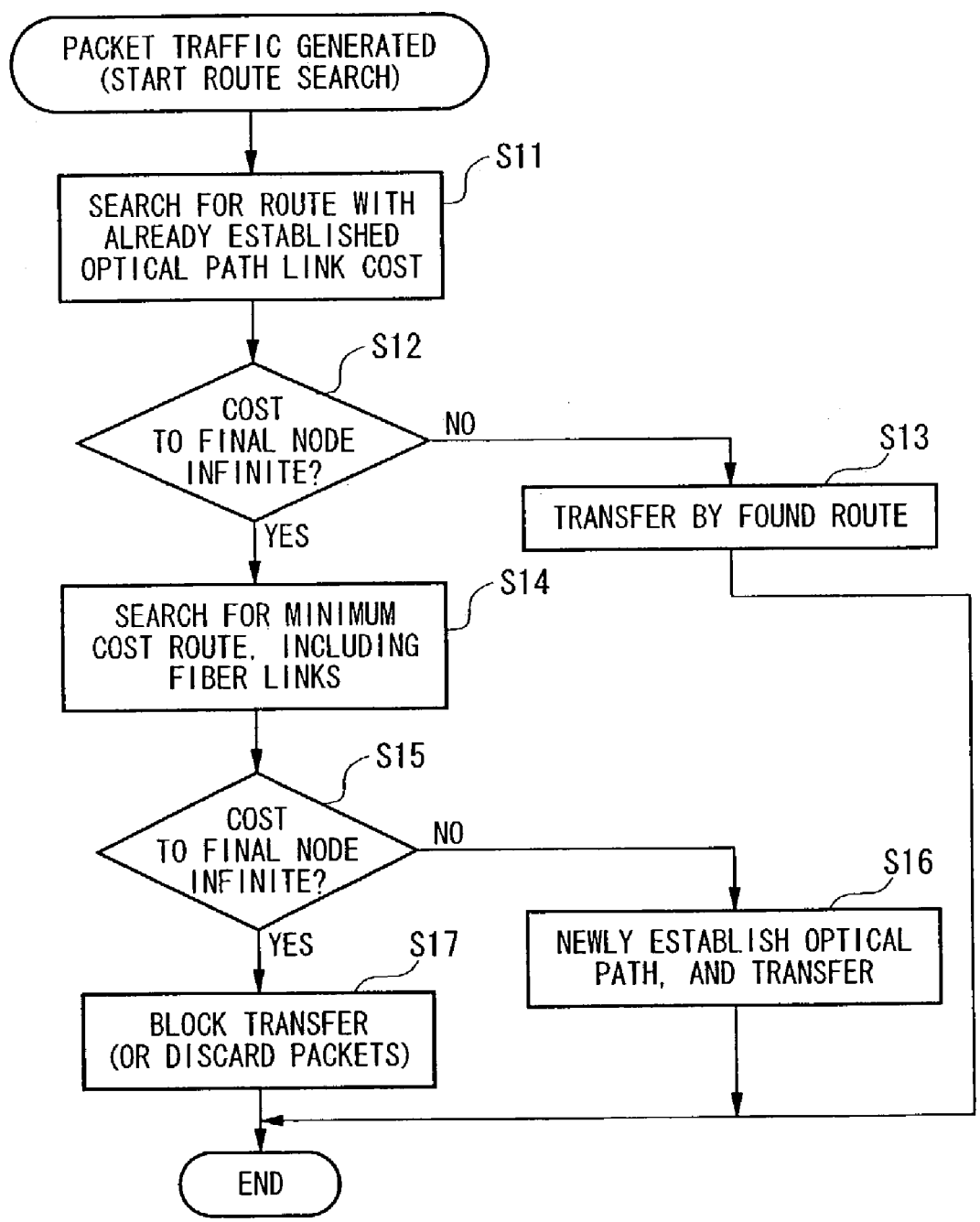
FIG. 25 is a flow chart showing the flow of this nineteenth preferred embodiment of the present invention.

FIG. 24 is a diagram for explanation of this nineteenth preferred embodiment of the present invention, and FIG. 25 is a flow chart for this nineteenth preferred embodiment.

In FIG. 24, the photonic routers 1C-1 through 1C-5 will be referred to as node #1 through node #5. This will also be done in other related preferred embodiments to be explained hereinafter. OLSP #1 is an optical path which connects together node #1 and node #4; OLSP #2 is an optical path which connects together node #4 and node #5; OLSP #3 is an optical path which connects together node #5 and node #3; OLSP #4 is an optical path which connects together node #1 and node #2; and OLSP #5 is an optical path which connects together node #1 and node #3.

The costs of these optical path links are "10" for OLSP #1 through OLSP #4, and "40" for OLSP #5.

Furthermore, the costs of the fiber links between node #1 and node #2, between node #2 and node #3, between node #1 and node #4, and between node #4 and node #5 are each "50", while the cost of the fiber link between node #5 and node #3 is "20".

For example, when a request occurs for accommodation of packet traffic between node #1 and node #3, the route is searched out for which the optical path link cost of the already established optical paths which connect between node #1 and node #3 is the smallest (in the step S11). If there is no route to the final point node (node #3) by an already established optical path, in other words if the cost up to the end point node is infinitely great, then the flow of control is transferred to the step S14. If a route does exist, then the packet traffic is accommodated in the optical path upon this searched out route, and packet transfer is performed (in the step S13).

If there was no optical path which arrives at node #3, then the route from node #1 to node #3 for which the cost is minimum, including the fiber links, is searched for (in the step S14). If a route is found (in the step S15), then an optical path is newly established for this route, and the packet traffic is accommodated in this newly established path and packet transfer is performed (in the step S16).

If there is no route to the final point node (node #3) even including fiber links, in other words if the cost up to the end point is infinitely great, then the transfer of the packets is blocked, or the packets are discarded (in the step S17).

By the above procedure shown in FIG. 25, in the example shown in FIG. 24, the packet traffic is accommodated in the priority ranking shown in the drawing.

In other words, as an optical path link from node #1 to node #3, there are the routes node #1-node #4-node #5-node #3 and node 1-node #3 (via node #2); and, since the optical path link cost of the former is "30" (the sum of the costs of the OLSPs #1, #2, and #3) while the optical path link cost of the latter is "40" (the cost of the OLSP #5), accordingly the packet traffic is accommodated in the optical paths in the order rank 1 (the route nodes #1-#4-#5-#3) and rank 2 (the route node #1-node #3 (via node #2)), and a new optical path is established when the vacant capacity of these optical paths has become insufficient.

When newly establishing an optical path, it is possible to distinguish the following two cases:

Case (a): Newly establishing an optical path over an interval which coincides with an interval between grounds for which packet traffic is accommodated.

Case (b): Newly establishing an optical path over the interval for which the cost of a newly established optical path will be the minimum, and accommodating the packet traffic in a route which uses the optical path.

In (a) of FIG. 24, an occurrence of the above described Case (a) is shown: an optical path is newly established over the route node #1-node #3 (via node #2).

On the other hand, in (b) of FIG. 24, an occurrence of the above described Case (b) is shown: an optical path is newly established between node #2-node #3, and the packet traffic is accommodated in a route which uses this optical path. In other words, this route becomes the route node #1-node #2-node #3.

By this method, dynamic new establishment of optical paths according to requests for accommodation of packet traffic becomes possible, and, even if sufficient traffic is not present between specified grounds, it is possible to prevent the new establishment of an optical path between the grounds autonomously, so that it is possible to reduce the fiber link and optical switching capacity which are required for the network as a whole.

The Twentieth Preferred Embodiment

Figure 26:
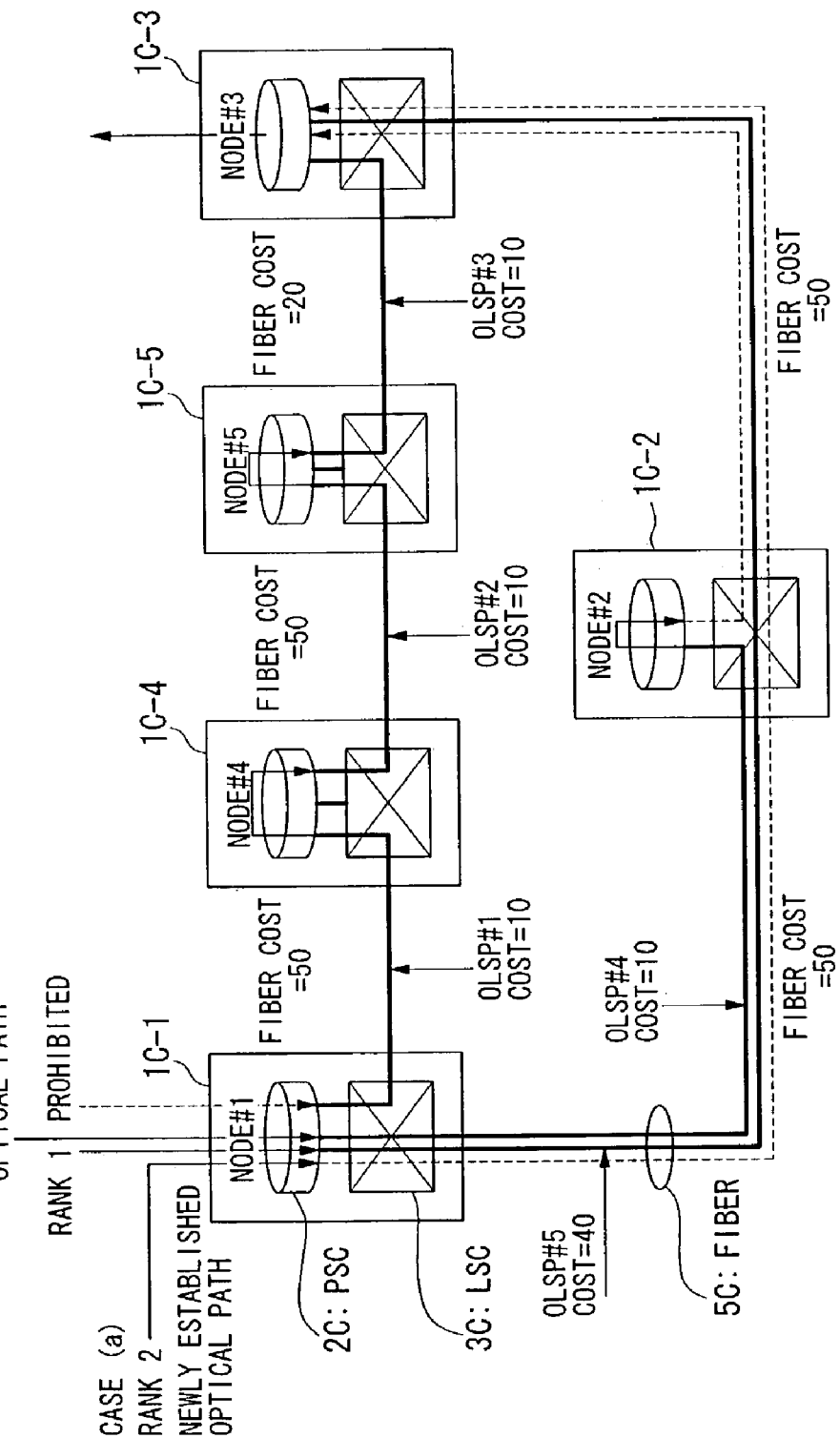
FIG. 26 is a drawing for explanation of the twentieth preferred embodiment of the present invention.
Figure 27:
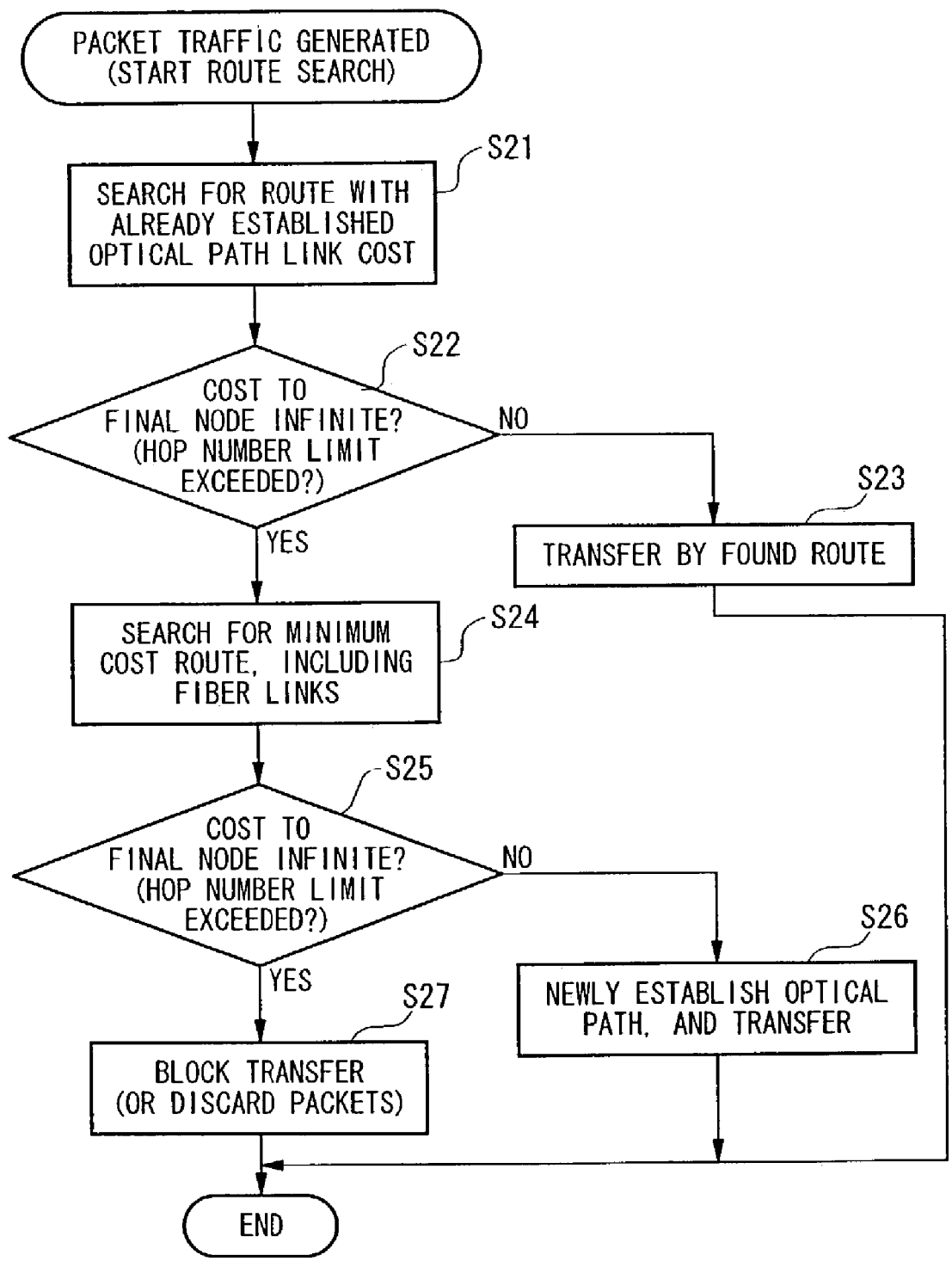
FIG. 27 is a flow chart showing the flow of this twentieth preferred embodiment of the present invention.

FIG. 26 is a diagram for explanation of this twentieth preferred embodiment of the present invention and FIG. 27 is a flow chart for this twentieth preferred embodiment.

In this twentieth preferred embodiment of the present invention, the route search is performed with consideration being given to a limit upon the number of O-LSP hops. Here, when a request occurs for the accommodation of packet traffic between specified grounds, first the shortest path from the point of view of the packet network 7 (the path for which the optical path link cost is the minimum) is searched out. If it is possible to arrive at the destination by an optical path which is already established and for which the number of hops is within the specified limit number, then the packet traffic is accommodated in this path, while if it is not possible, then an optical path is newly established.

In the example of FIG. 26, although, in the same way as with the nineteenth preferred embodiment, the optical path link path of the minimum cost from node #1 to node #3 is searched out, since the route node #1-node #4-node #5-node #3 exceeds the specified limit number of O-LSP hops, the accommodation of packet traffic therein is forbidden, and the route node #1-node #3 (via node #2) acquires rank 1.

The packet traffic is accordingly accommodated in the optical path of this rank 1 route, and a new optical path is established when the vacant capacity of this optical path has become insufficient.

The flow chart for this twentieth preferred embodiment of the present invention shown in FIG. 27 (the steps S21 through S27) is almost the same as the flow chart for the nineteenth preferred embodiment shown in FIG. 25 (the steps S11 through S17), except for the point that it differs from the nineteenth preferred embodiment in that, in the decisions made in the steps S22 and the steps S25 relating to the result of route searching, if the number of O-LSP hops in the searched out route exceeds the specified limit number, this case is handled as though it was impossible to reach the destination with an already established optical path.

In this twentieth preferred embodiment of the present invention, by comparison to the nineteenth preferred embodiment, it becomes possible to reduce the number of relay optical paths (in other words, the number of relay packet switching nodes), so that it becomes possible to alleviate the transfer processing load upon the packet switching nodes.

When newly establishing an optical path, as in the cases (a) and (b) shown in FIG. 26, it is possible to distinguish the following two cases:

Case (a): Newly establishing an optical path over an interval which coincides with an interval between grounds for which packet traffic is accommodated.

Case (b): Newly establishing an optical path over the interval for which the cost of a newly established optical path will be the minimum, within the range which satisfies the condition relating to the specified number of relay optical paths (in other words, the condition relating to the specified number of relay packet switching nodes), and accommodating the packet traffic in a route which uses the optical path.

The Twenty-First Preferred Embodiment

Figure 28:
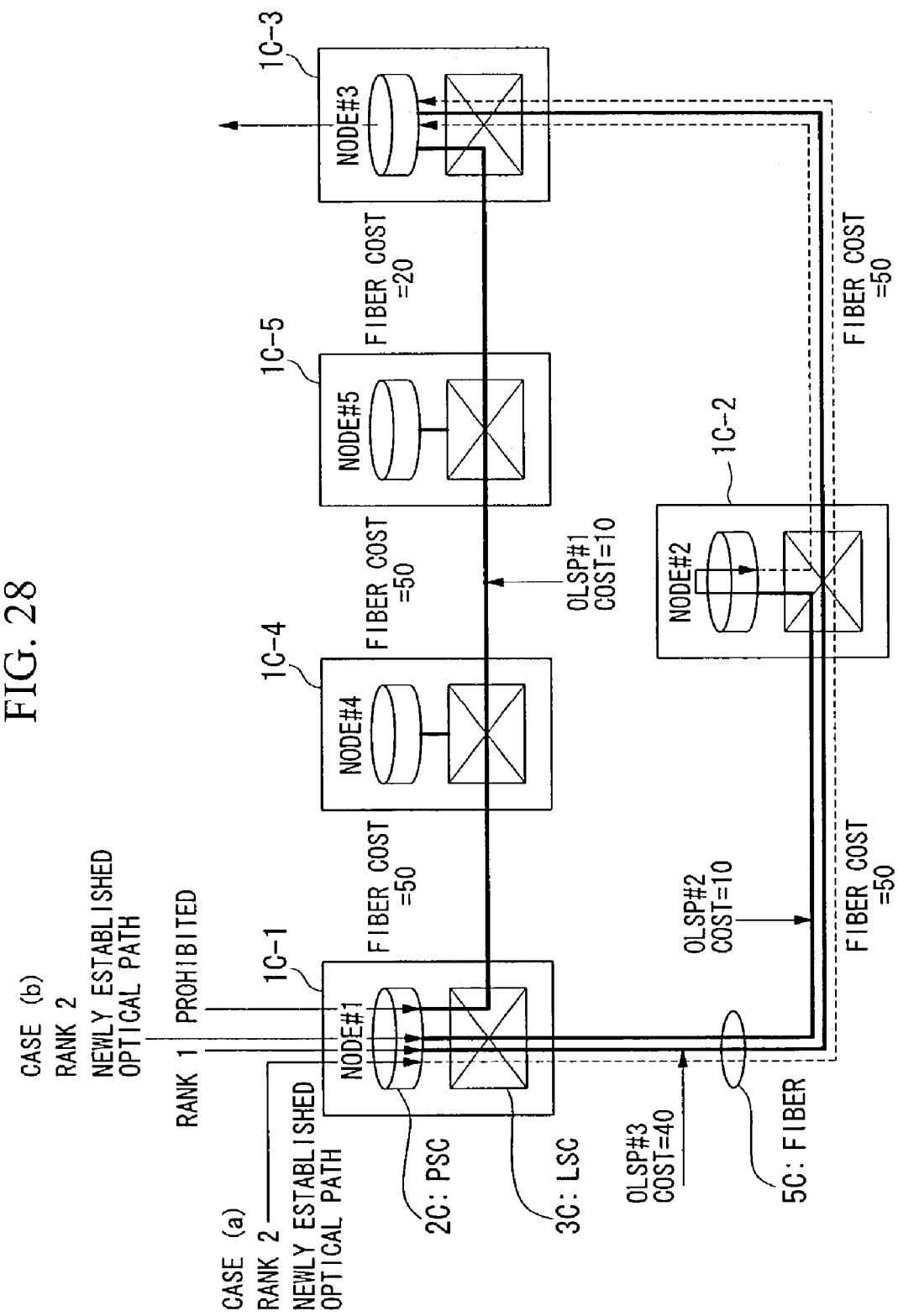
FIG. 28 is a drawing for explanation of the twenty-first preferred embodiment of the present invention.
Figure 29:
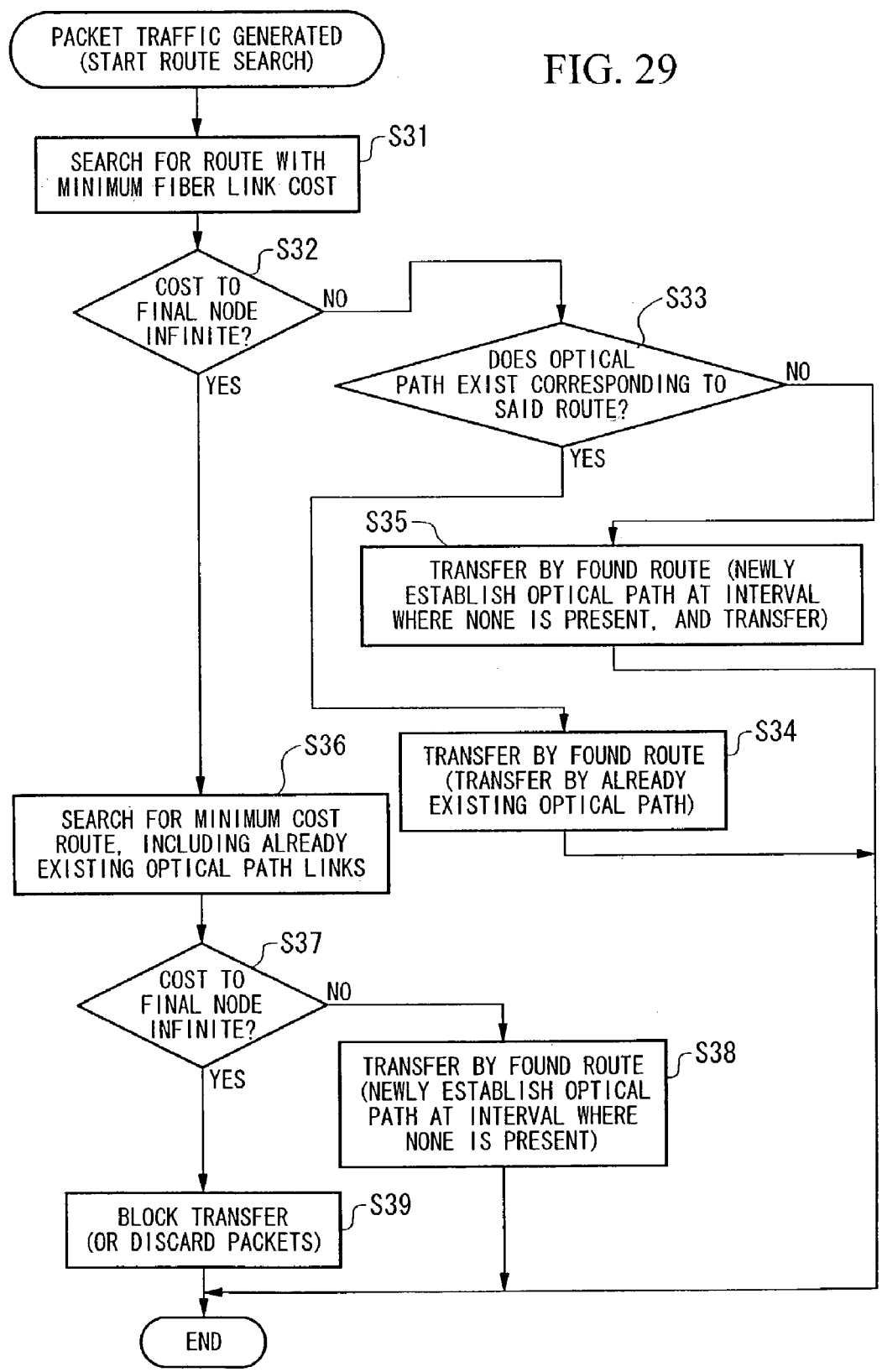
FIG. 29 is a flow chart showing the flow of this twenty-first preferred embodiment of the present invention.

FIG. 28 is a drawing for explanation of this twenty-first preferred embodiment of the present invention, and FIG. 29 is a flow chart for this twenty-first preferred embodiment.

In this twenty-first preferred embodiment of the present invention, when a request occurs for the accommodation of packet traffic between specified grounds, first the shortest path from the point of view of the photonic network 8C (the path for which the fiber link cost is the minimum) is searched out. This point differs from the case of the nineteenth preferred embodiment, in which it was from the point of view of the packet network 7C that the shortest path (the minimum optical path link cost path) was searched out. If it is not possible to arrive at the destination by an optical path which is already established upon this path, then for the first time an optical path is newly established.

The explanation will follow the flow chart shown in FIG. 29. For example, when a request occurs for accommodation of packet traffic between node #1 and node #3, the route is searched out for which the fiber link cost of the already established optical paths which connect between node #1 and node #3 is the smallest (in the step S31). If there is no route to the final point node (node #3) by an already established fiber, in other words if the fiber link cost up to the end point node is infinitely great, then the flow of control is transferred to the step S36.

If a route does exist, then a decision is made (in the step S33) as to whether or not there is an already established optical path which corresponds to this route which has been found, and, if such an optical path does exist, then the packet traffic is accommodated in this optical path, and packet transfer is performed by the searched out route (in the step S34). If there is no already established optical path which corresponds to this route which has been found, then, at the interval where there is insufficient optical path, if necessary, an optical paths including a cut through pass is newly established, and the packet traffic is accommodated upon this optical path, and packet transfer is performed (in the step S35).

If there is no fiber link which is capable of arriving at the final node, then a route is searched for including also the already established optical path links (in the step S36). If the result is that it is not possible to arrive at the final node (the step S37), then the flow of control is transferred to the step S39. If a route does exist which is capable of arriving at the final node, then packet transfer is performed upon this searched out route (in the step S38). When doing this, if there is an interval upon the searched out route in which there is insufficient optical path, then an optical path is newly established for this interval. If it is not possible to arrive at the final point by any route, then the transfer of the packets is blocked or the packets are discarded (in the step S39).

By the above procedure shown in FIG. 29, the packet traffic comes to be accommodated in the priority ranking shown in FIG. 28.

With this twenty-first preferred embodiment of the present invention, it becomes possible to reduce useless utilization of photonic network resources, by comparison to the nineteenth and the twentieth preferred embodiments, since the route (the path) in which the packet traffic is accommodated comes to agree with the minimum fiber link cost path.

When newly establishing an optical path, as in the cases (a) and (b) shown in FIG. 28, it is possible to distinguish the following two cases:

Case (a): Newly establishing an optical path over an interval which coincides with an interval between grounds for which packet traffic is accommodated.

Case (b): Newly establishing an optical path over the interval for which the cost of a newly established optical path will be the minimum, and accommodating the packet traffic in a route which uses the optical path.

The Twenty-Second Preferred Embodiment

Figure 30:
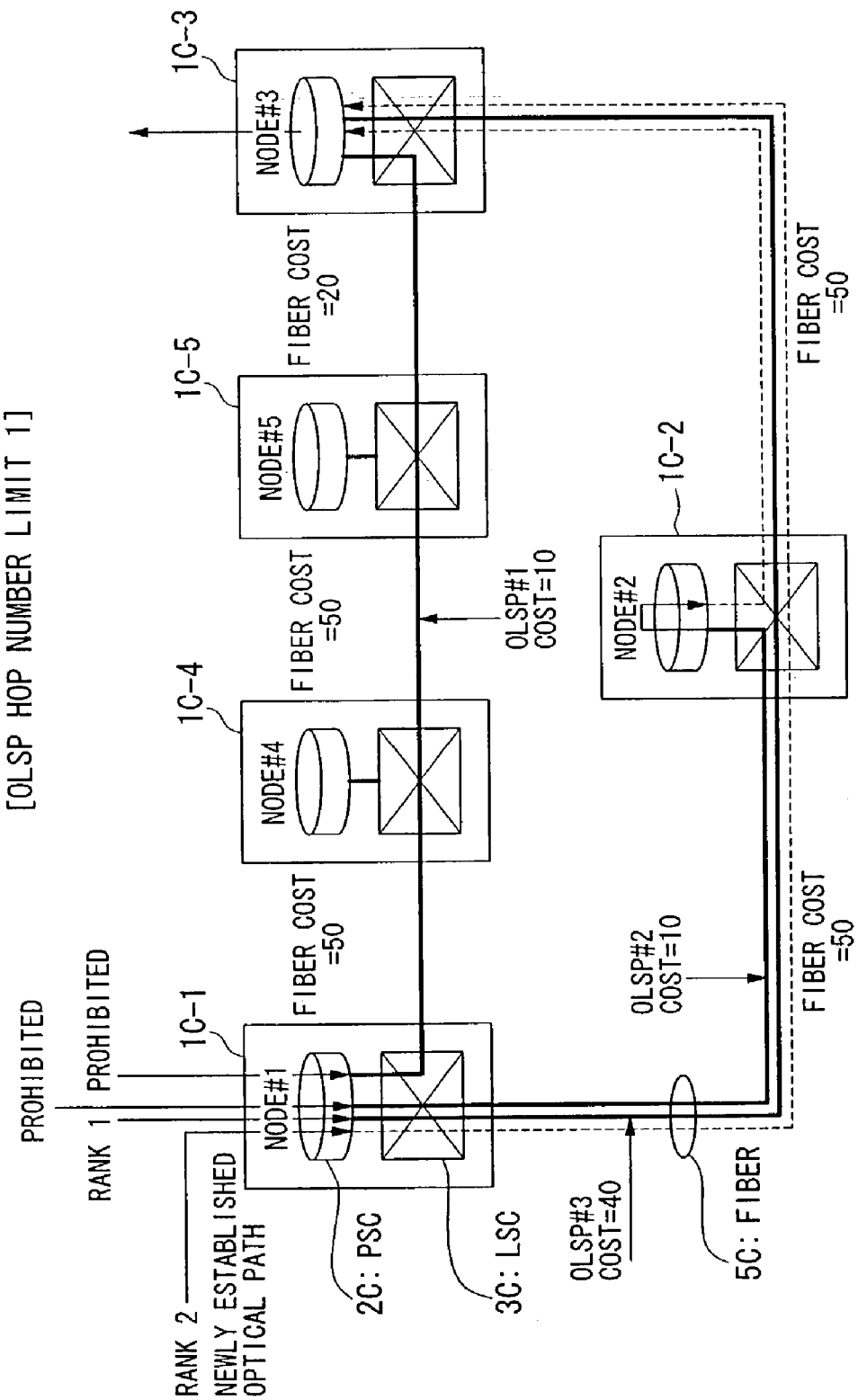
FIG. 30 is a drawing for explanation of the twenty-second preferred embodiment of the present invention.
Figure 31:
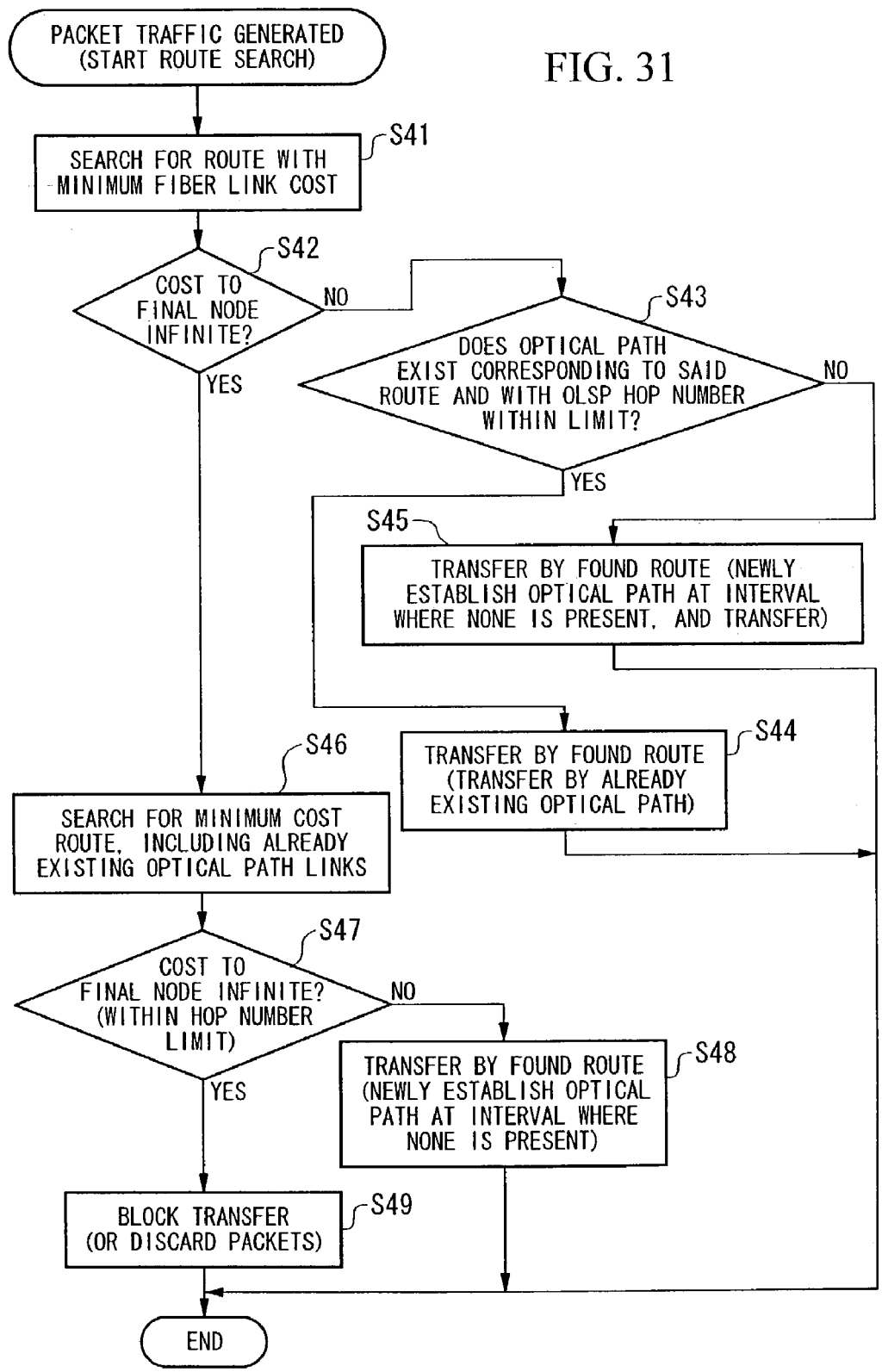
FIG. 31 is a flow chart showing the flow of this twenty-second preferred embodiment of the present invention.

FIG. 30 is a diagram for explanation of this twenty-second preferred embodiment of the present invention, and FIG. 31 is a flow chart for this twenty-second preferred embodiment.

In this twenty-second preferred embodiment of the present invention, when a request occurs for the accommodation of packet traffic between specified grounds, first the shortest path from the point of view of the photonic network 8C (the path for which the fiber link cost is the minimum) is searched out. If it is possible to reach the destination upon an optical path which is already established and for which the number of hops is within a specified limit value, then the packet traffic is accommodated in this already established optical path upon this path, while if it is not possible, then an optical path is newly established.

The flow chart for this twenty-second preferred embodiment of the present invention shown in FIG. 31 (the steps S41 through S49) is almost the same as the flow chart for the twenty-first preferred embodiment shown in FIG. 29 (the steps S31 through S39), except for the point that it differs from the twenty-first preferred embodiment in that, in the decision made in the step S43 as to whether or not an optical path exists which corresponds to the searched out route, consideration is given to a limit upon the number of O-LSP hops. Furthermore there is the point of difference that, in the decision made in the step S47, if the route which was found in the step S46 has a number of O-LSP hops which exceeds the limit value, then it is determined that there is no route in which the packet traffic can be accommodated.

In this twenty-second preferred embodiment of the present invention, by comparison to the twenty-first preferred embodiment, it becomes possible to reduce the number of relay optical paths (in other words, the number of relay packet switching nodes), so that it becomes possible to alleviate the transfer processing load upon the packet switching nodes.

When newly establishing an optical path, it is possible to distinguish the following two cases:

Case (a): Newly establishing an optical path over an interval which coincides with an interval between grounds for which packet traffic is accommodated.

Case (b): Newly establishing an optical path over the interval for which the cost of a newly established optical path will be the minimum, within the range which satisfies the condition relating to the specified number of relay optical paths (in other words, the condition relating to the specified number of relay packet switching nodes), and accommodating the packet traffic in a route which uses the optical path.

The Twenty-Third Preferred Embodiment

Figure 32:
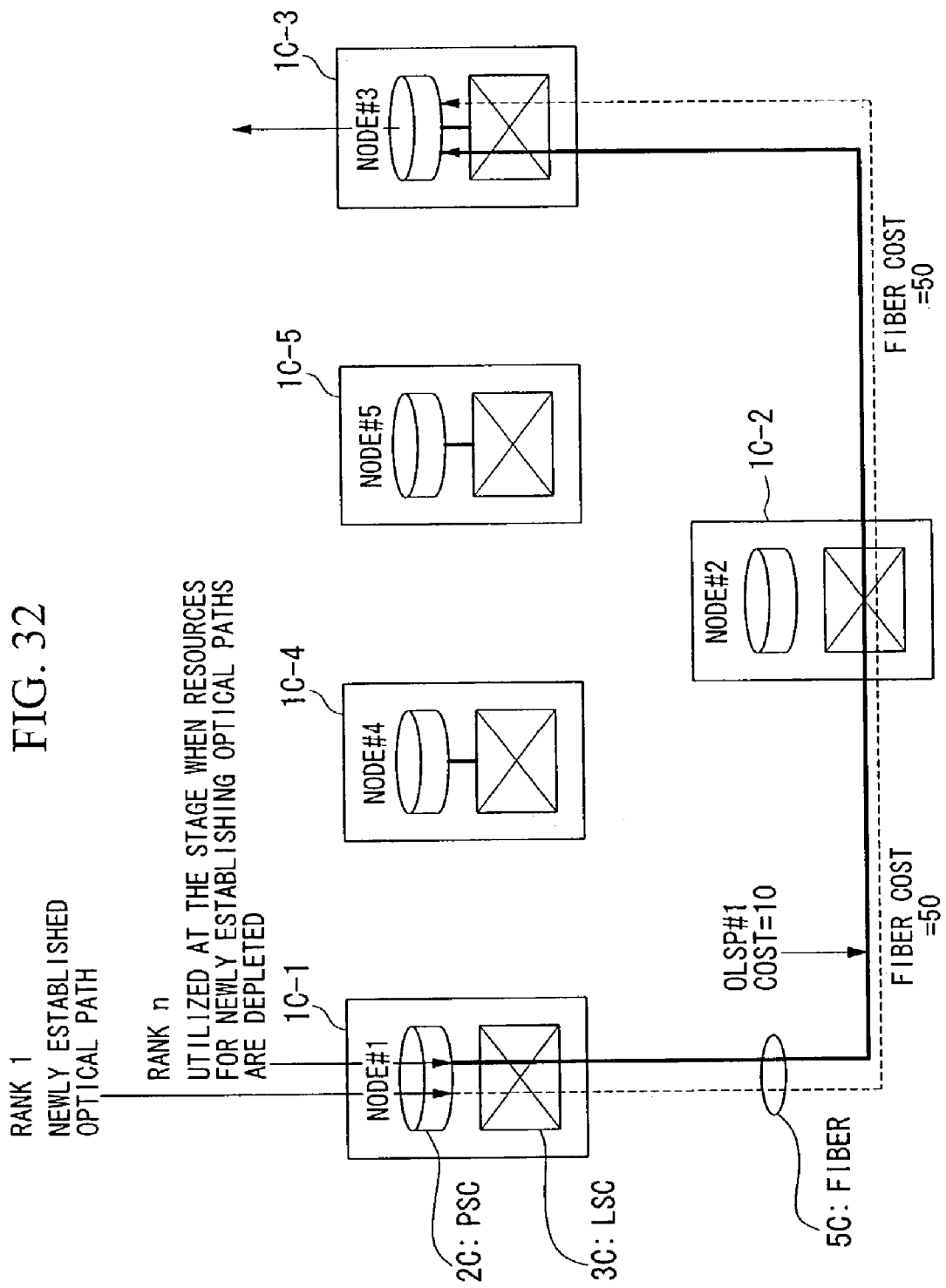
FIG. 32 is a drawing for explanation of the twenty-third preferred embodiment of the present invention.
Figure 33:
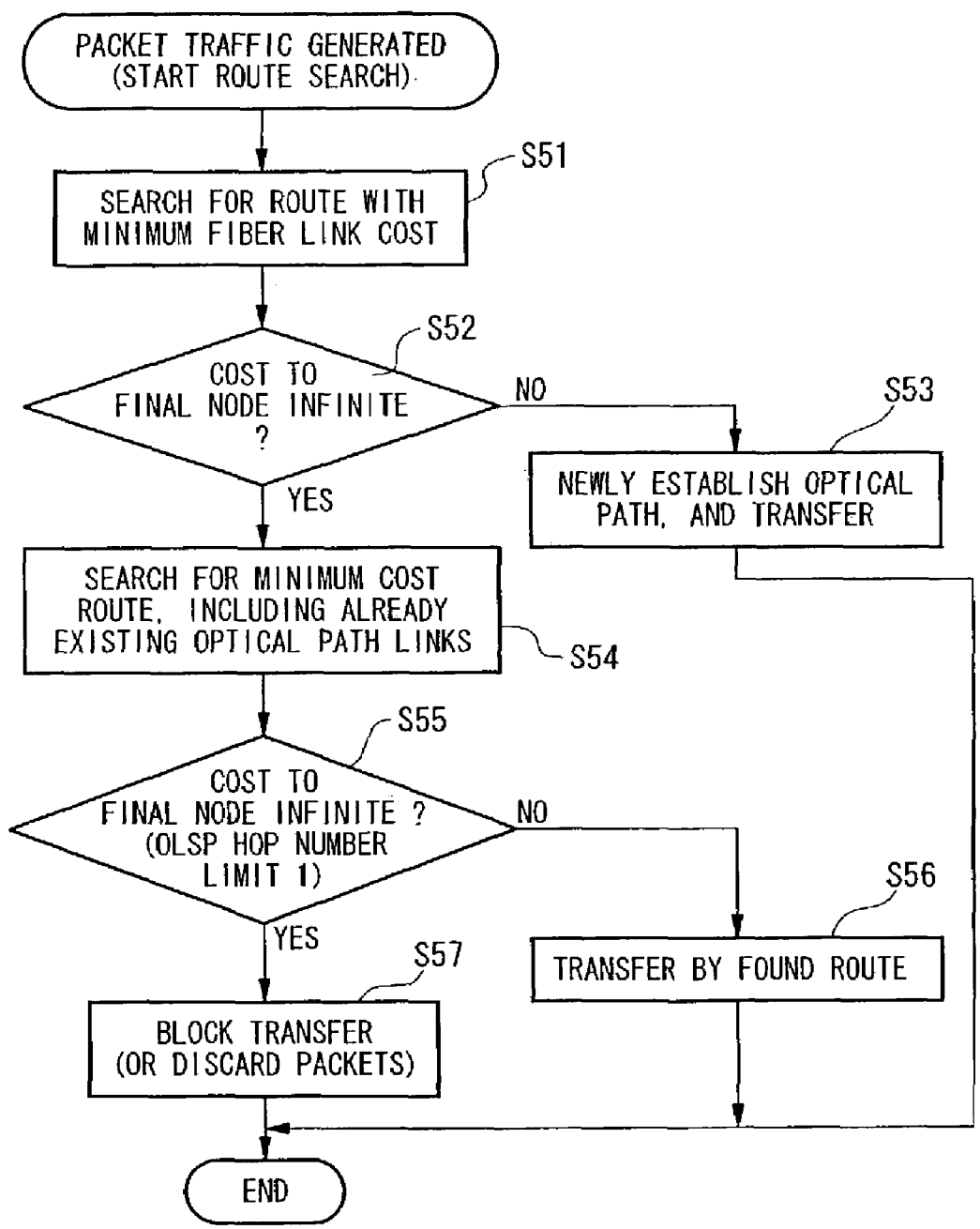
FIG. 33 is a flow chart showing the flow of this twenty-third preferred embodiment of the present invention.

FIG. 32 is a diagram for explanation of this twenty-third preferred embodiment of the present invention, and FIG. 33 is a flow chart for this twenty-third preferred embodiment.

In this twenty-third preferred embodiment of the present invention, when a request occurs for accommodating packet traffic between specified grounds, an optical path is newly established which coincides with the grounds for the traffic.

This will be explained using FIG. 32 and FIG. 33.

For example, referring to FIG. 32, when a request occurs for accommodating packet traffic between node #1 and node #3, a route which links node #1 and node #3 is searched out, including a cut through for node #2, for which the fiber link cost is minimum (in the step S51).

If there is no route to the final node (node #3) by a fiber-link, in other words if the cost to the final node is infinitely great (the step S52), then the flow of control is transferred to the step S54. If a route does exist, then an optical path is newly established in the fiber link of this found route (rank 1 of FIG. 32), and the packet traffic is accommodated therein and packets are transferred (in the step S53).

If there is no fiber link which arrives at node #3, then a route from node #1 to node #3 is searched out for which the cost should be minimum, including already established optical path links (in the step S54). During this search, consideration is given to a limit value upon the number of O-LSP hops, if necessary. If a route which arrives at node #3 is found (the step S55), then packets are transferred upon this route (the step S56) (at this time, node #2 is cut through). If no route is found which arrives at the final point node (node #3), even including already established optical path links, then the transfer of packets is blocked or the packets are discarded (in the step S57).

In this twenty-third preferred embodiment of the present invention, the difference from the nineteenth through the twenty-second preferred embodiments described above is that the probability is high that the path in which the packet traffic is accommodated coincides with the shortest path upon the fiber links.

Furthermore, it becomes possible greatly to alleviate the transfer processing load, since the packet switches only have to handle the traffic which is terminated at their own nodes.

Furthermore, in addition to the variations in this twenty-third preferred embodiment of the present invention, the case is also permitted in which the limit value upon the O-LSP hop number which is imposed in the step S55 becomes other than unity. By doing this, it becomes possible to guarantee accommodation of traffic, and to obtain an increased revenue factor for the communication provider, even if the network becomes congested, and it becomes impossible to newly establish optical paths and to transfer packet traffic in single O-LSP hops.

It should be understood that various combinations of these nineteenth through twenty-third preferred embodiments of the present invention may be employed, according to the state of the network, and according to the service class of the packet traffic which is to be accommodated.

For example, as a combined embodiment, the combination could be applied of using the twenty-third preferred embodiment of the present invention for high priority class traffic, while using the nineteenth preferred embodiment for low priority class traffic.

Figure 34:
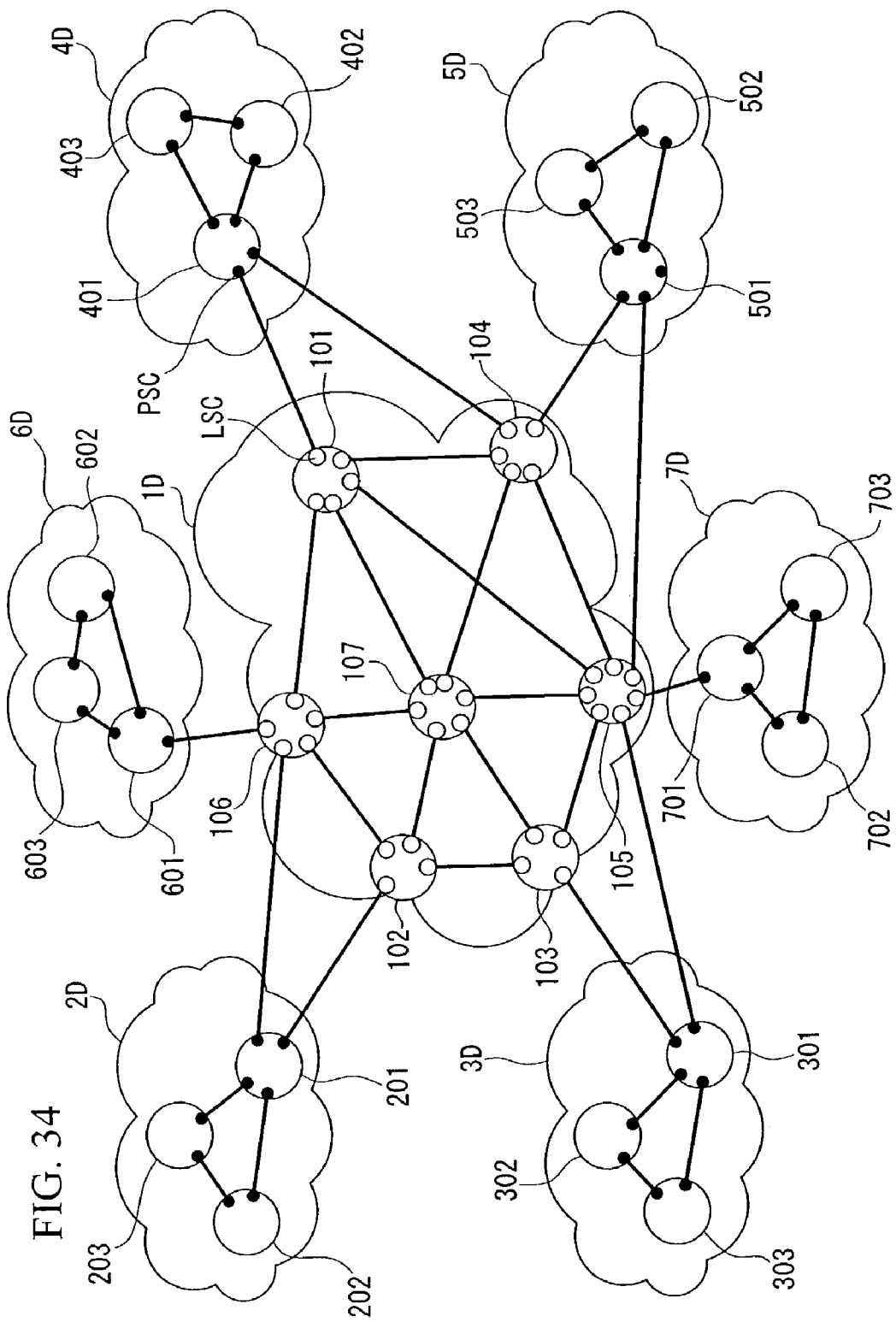
FIG. 34 is an overall structural view showing a multi-layer photonic network according to the twenty-fourth preferred embodiment of the present invention.

The multi-layer photonic network according to the twenty-fourth preferred embodiment of the present invention will now be explained with reference to FIG. 34. FIG. 34 is a diagram showing the overall structure of the multi-layer photonic network according to this twenty-fourth preferred embodiment.

This twenty-fourth preferred embodiment, as shown in FIG. 34, is a multi-layer photonic network ID having a two layer construction, consisting of O-LSPs which are provided with LSP at both their ends, and E-LSPs which are provided with PSC at both their ends and include these O-LSPs, and it comprises a plurality of electrical packet switching sub-networks 2 through 7 (hereinafter these will simply be termed "sub-networks") which perform switching and transfer by packet units, O-LSPs which are connected to these sub-networks 2D through 7D, and packet routers 101 through 107 and border routers 201, 301, 401, 501, 601, and 701 which are nodes which terminate these O-LSPs; and LSC which are capable of switching in units of optical wavelengths and PSC which are capable of switching in units of packets are respectively provided at both ends of the optical wavelength links which are made up from the O-LSPs and the packet routers 101 through 107 and the border routers 201, 301, 401, 501, 601, and 701.

Figure 38:
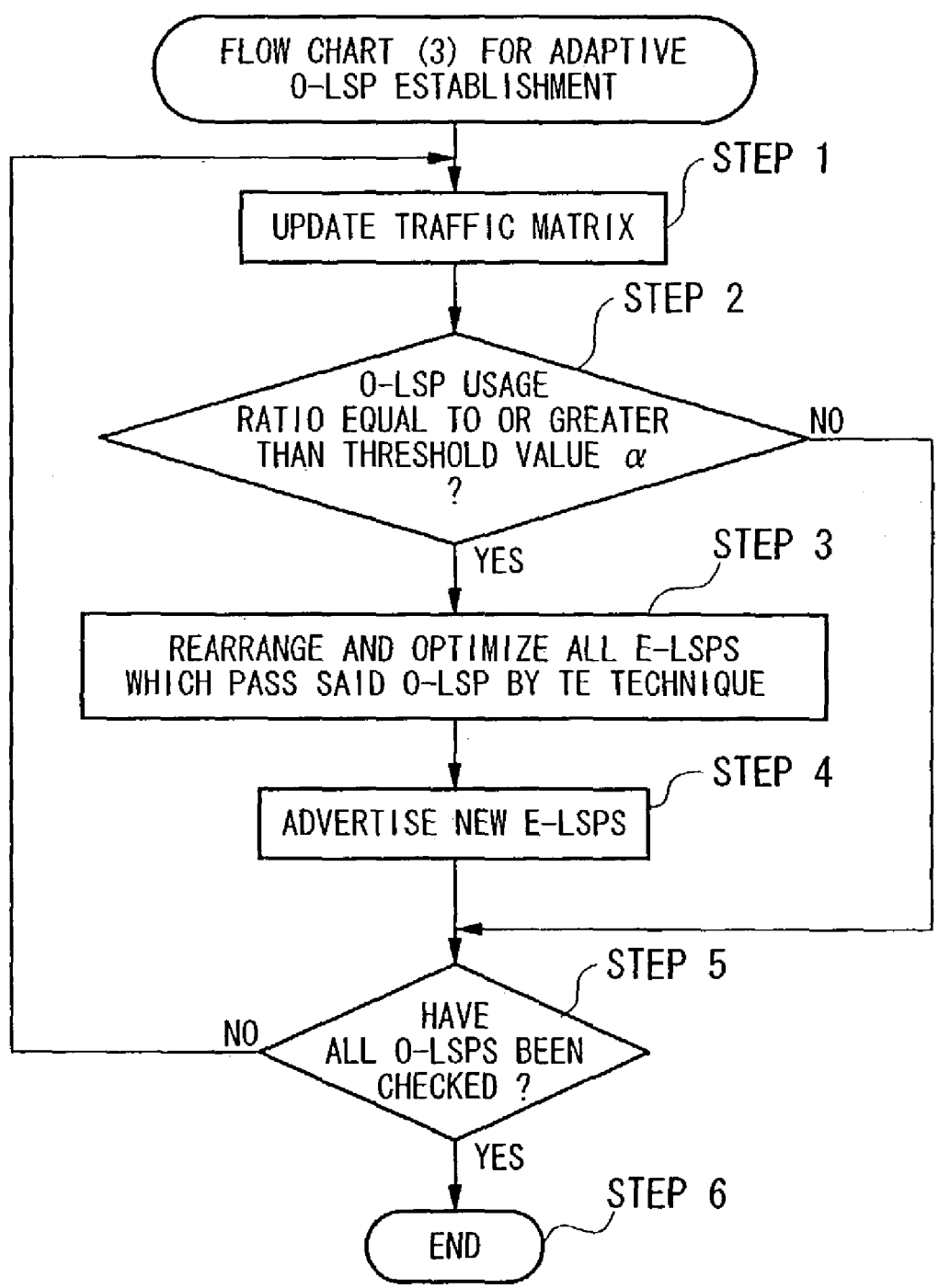
FIG. 38 is a third flow chart (3) showing an establishment for an adaptable O-LSP according to this twenty-fourth preferred embodiment.

Here, the particular characteristic of this twenty-fourth preferred embodiment of the present invention lies in the fact that the packet routers 101 through 107, as shown in FIG. 38, perform rearrangement of all the E-LSPs in response to detection of congestion upon any of the O-LSPs.

Figure 36:
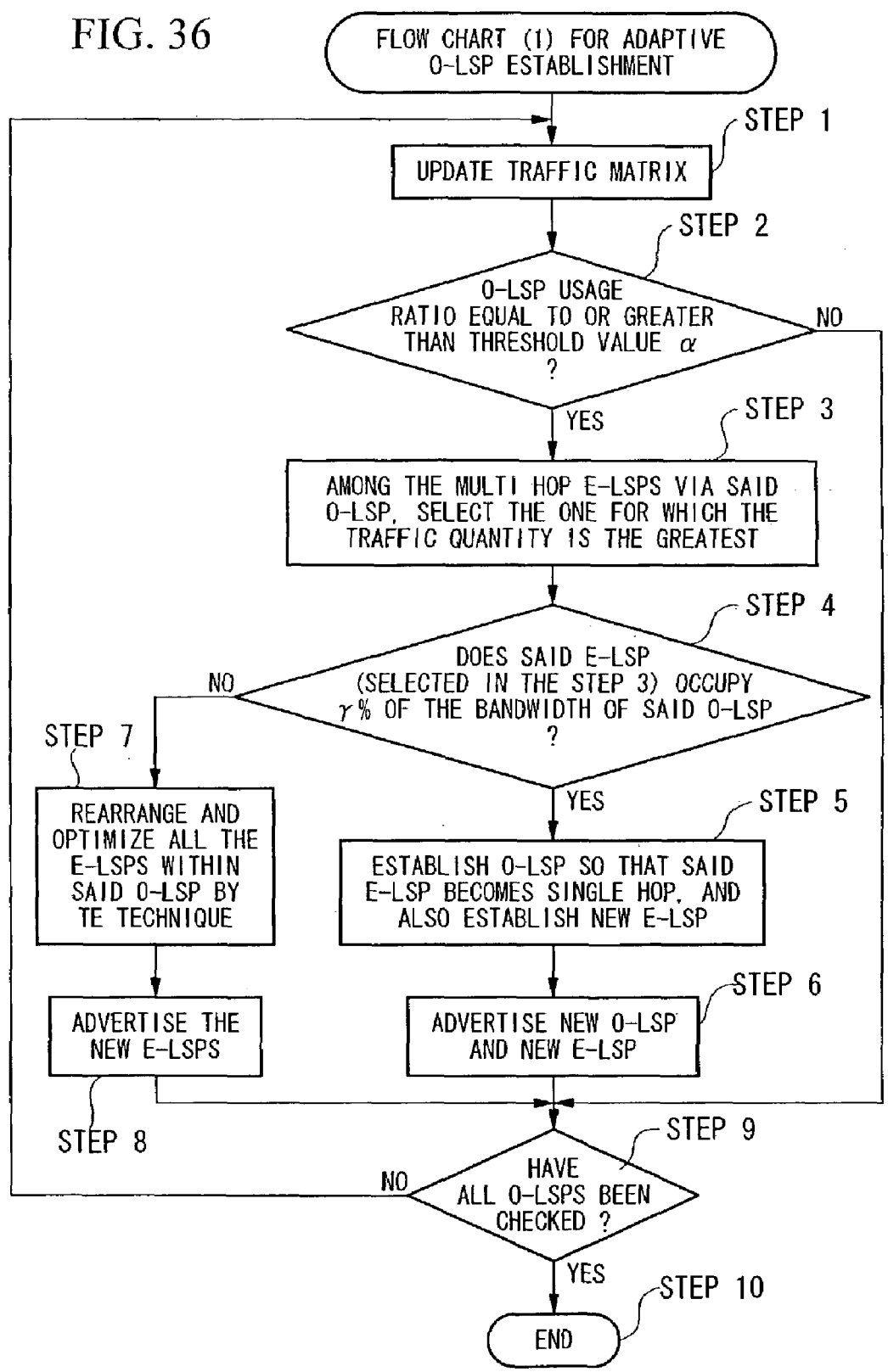
FIG. 36 is a first flow chart (1) showing an establishment procedure for an adaptable O-LSP according to this twenty-fourth preferred embodiment.
Figure 37:
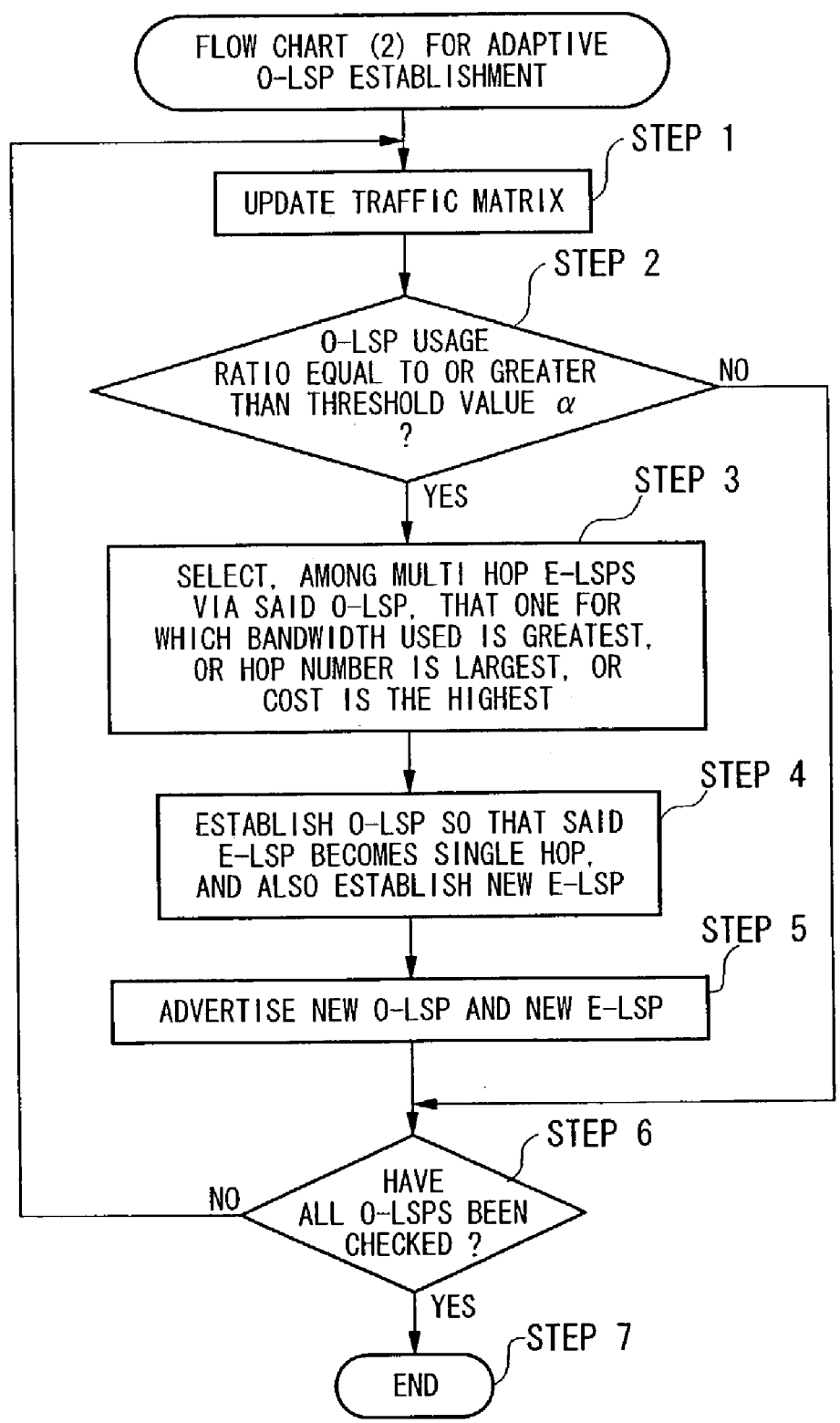
FIG. 37 is a second flow chart (2) showing an establishment procedure for an adaptable O-LSP according to this twenty-fourth preferred embodiment.

Furthermore, the packet routers 101 through 107 also conjointly perform rearrangement of the O-LSPs along with the rearrangement of all the E-LSPs. At this time, as shown in FIG. 36 and FIG. 37, the packet routers 101 through 107 decide whether or not it is possible to newly structure by a single hop the O-LSP with which the E-LSP for which the bandwidth used is the widest, or the number of hops is the greatest or the path cost is the highest, is made, and if such new structuring is possible, they newly structure the O-LSP.

Figure 39:
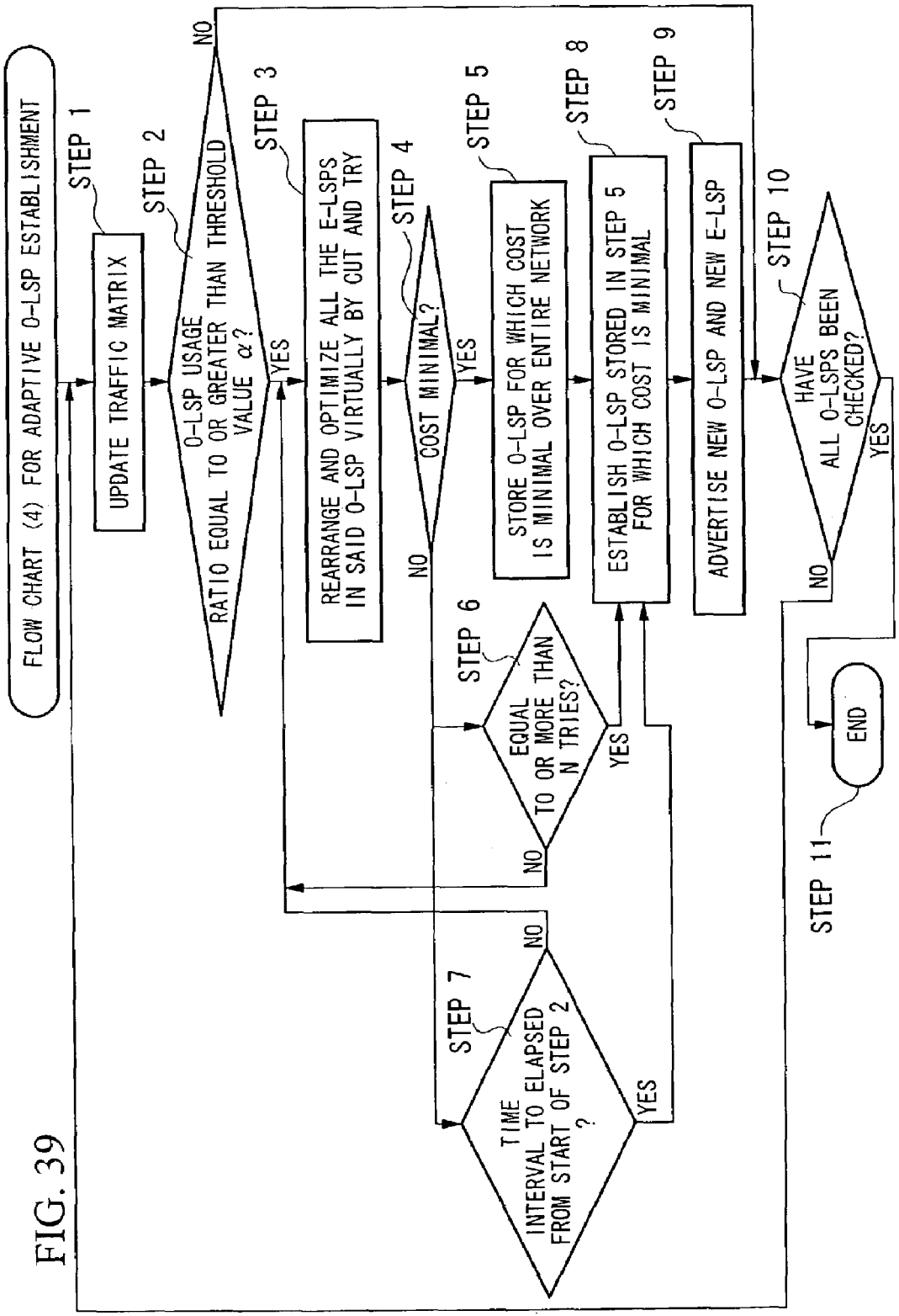
FIG. 39 is a fourth flow chart (4) showing an establishment procedure for an adaptable O-LSP according to this twenty-fourth preferred embodiment.

Or, as shown in FIG. 39, the packet routers 101 through 107 may perform rearrangement of the O-LSPs a plurality of times virtually, and may then actually execute the rearrangement of the O-LSPs for which, from among these results of rearrangement a plurality of times, the path cost is the minimum. Furthermore, as shown in FIG. 39, it is possible to limit the number of times or the time period that this virtual rearrangement of the O-LSPs is performed. Yet further, as shown in FIG. 39, the packet routers 101 through 107 may perform rearrangement of the O-LSPs virtually by cut and try, and then may actually rearrange the O-LSPs according to the order of the cut and try which was performed virtually.

Figure 40:
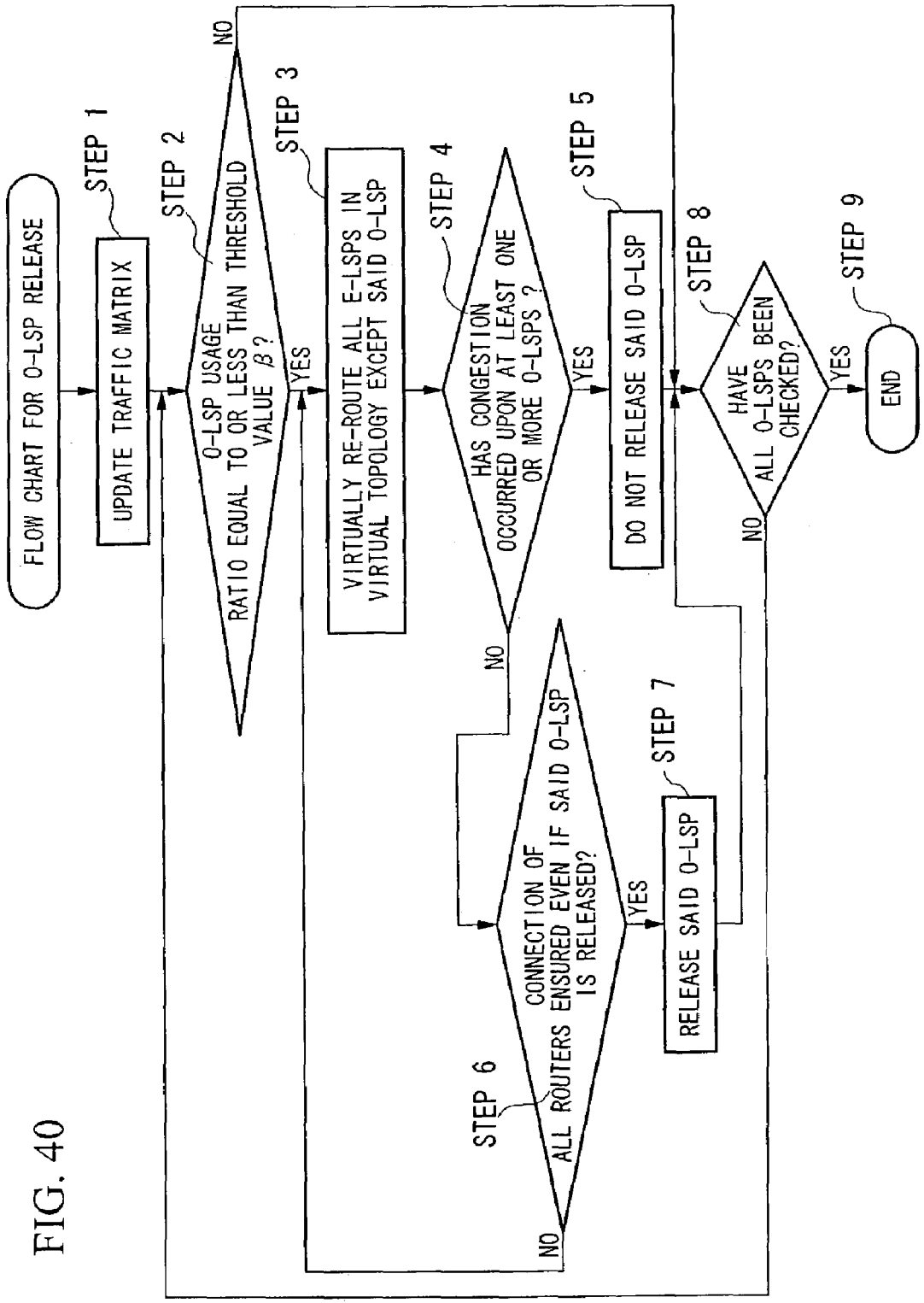
FIG. 40 is a flow chart showing a release procedure for an O-LSP according to this twenty-fourth preferred embodiment.

Furthermore, as shown in FIG. 40, with regard to an O-LSP for which the usage ratio is equal to or below the threshold value, release of the O-LSP is executed, provided that it has been confirmed that the change over to another O-LSP of the E-LSP accommodated in the O-LSP is included is already completed, that the connection of all the routers is ensured even if the O-LSP is released, and that congestion upon another O-LSP will not occur even if the O-LSP is released.

Figure 52:
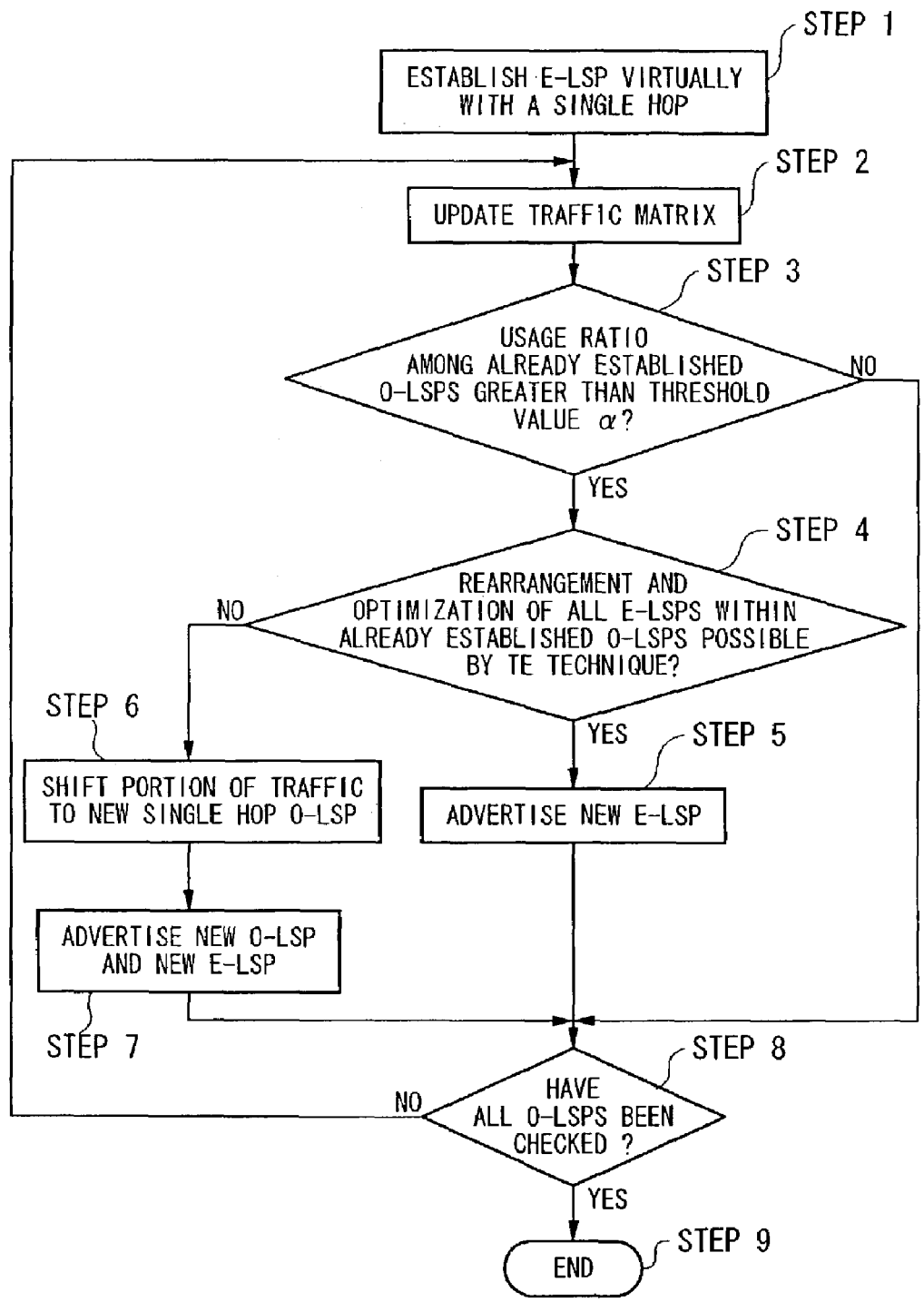
FIG. 52 is a flow chart corresponding to a new E-LSP request, according to this twenty-fourth preferred embodiment.
Figure 55B:
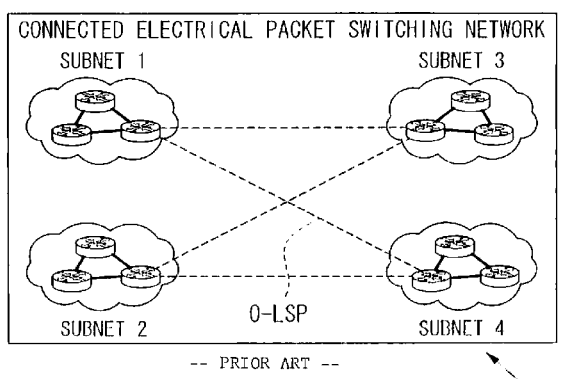
FIGS. 55A through 55C are drawings showing a connected electrical packet switching network and a non-connected electrical packet switching network.
Figure 55C:
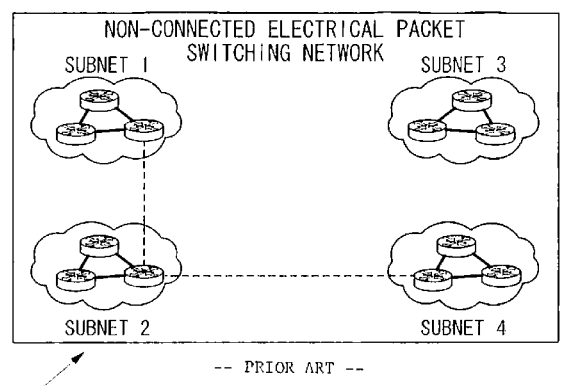
Figure 55A:
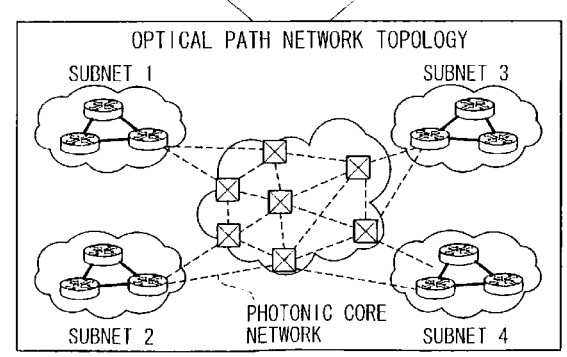
Figure 56:
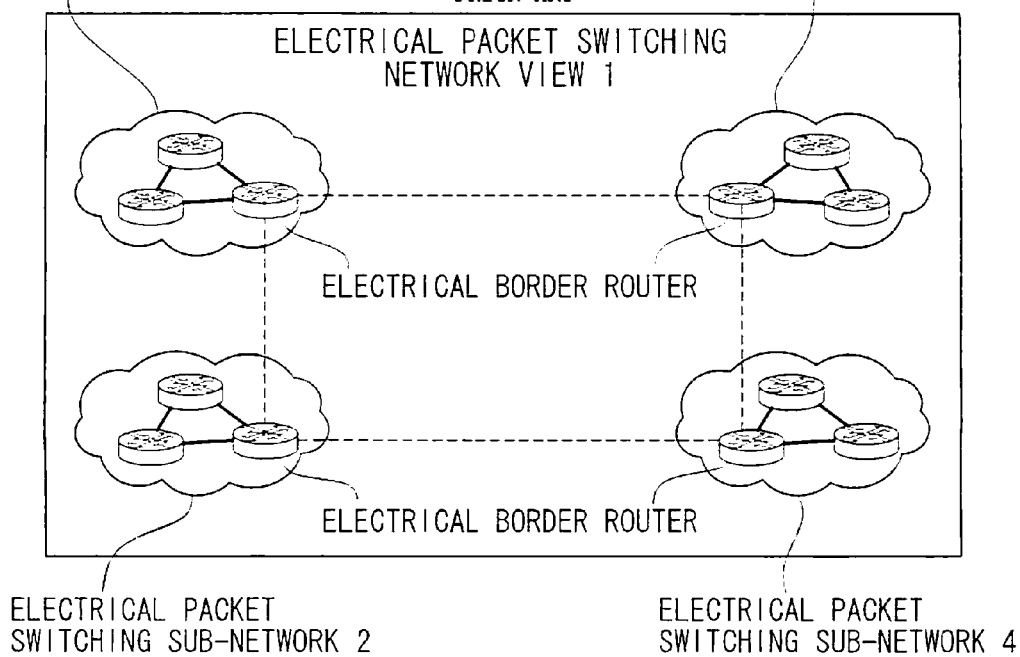
FIG. 56 is a drawing showing a first connection pattern #1 for an electrical packet switching sub-network.
Figure 57:
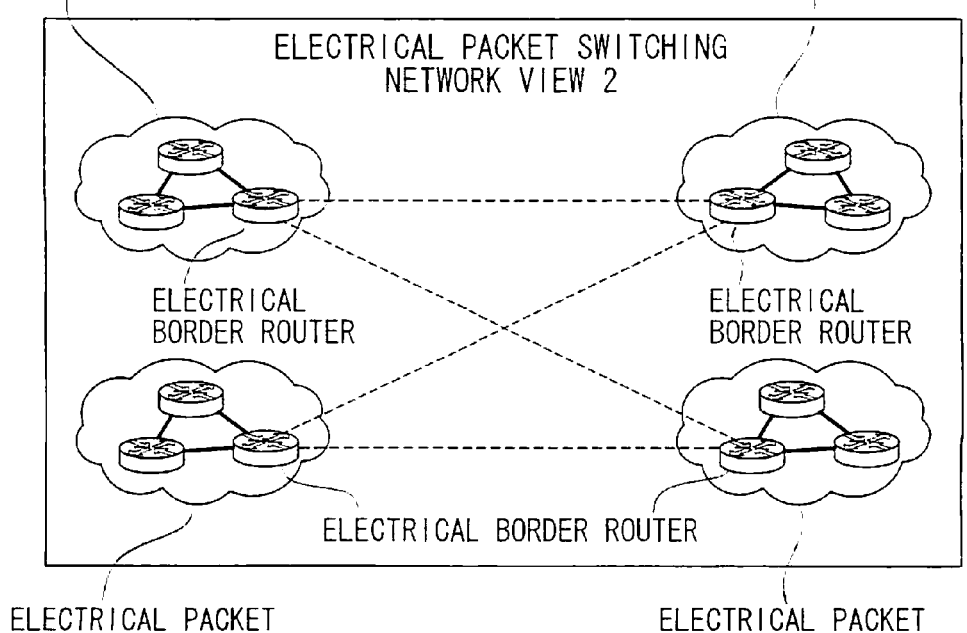
FIG. 57 is a drawing showing a second connection pattern #2 for an electrical packet switching sub-network.

Furthermore, as shown in FIG. 52, with regard to a request for making a new E-LSP, a new O-LSP is made only provided that it is not possible to make it in an already established O-LSP.

Figure 41:
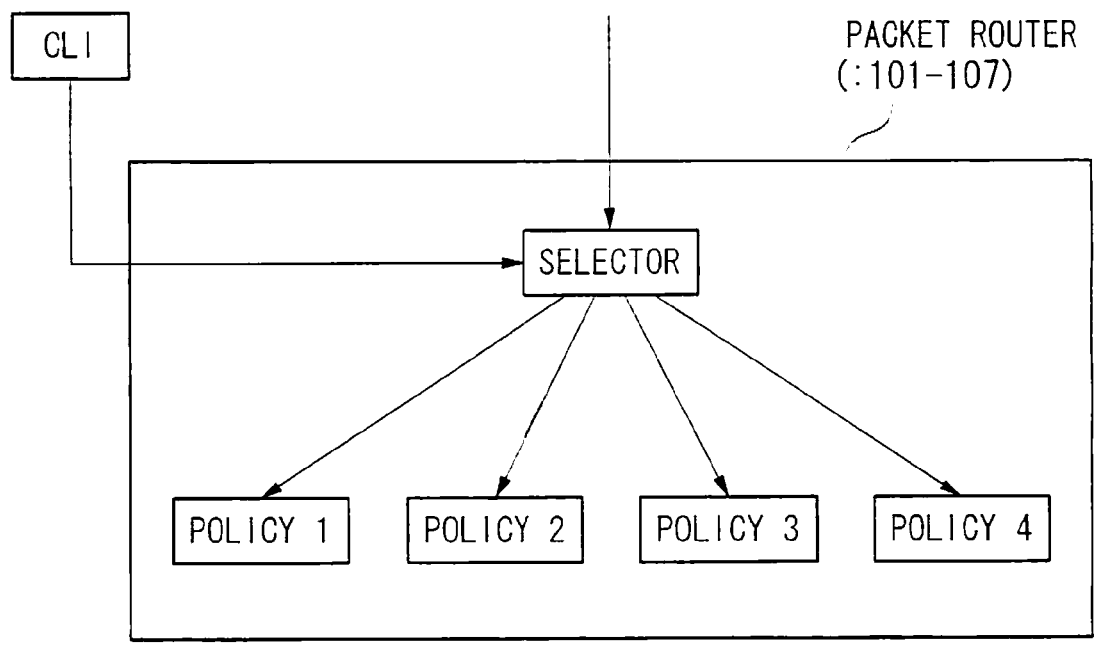
FIG. 41 is a functional diagram of a policy selector of this twenty-fourth preferred embodiment.
Figure 58:
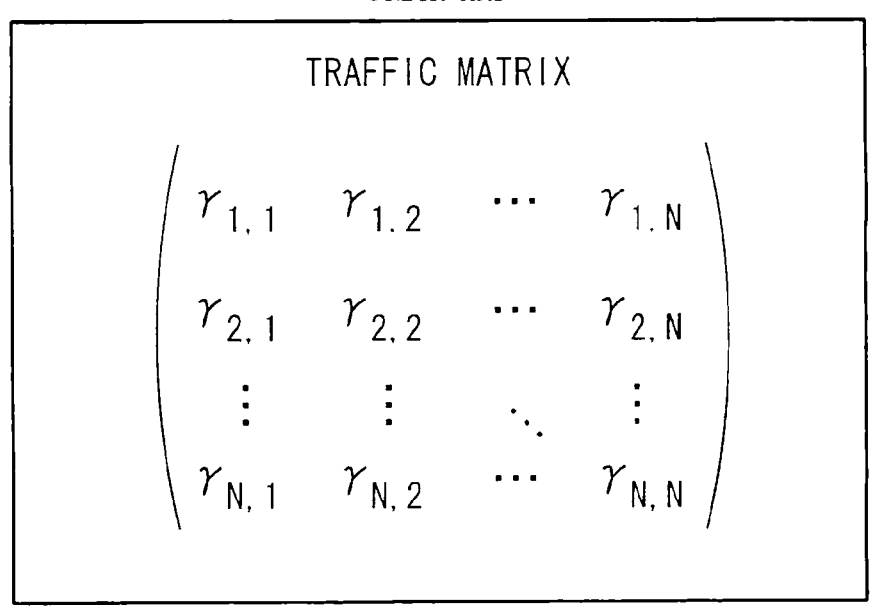
FIG. 58 is a drawing showing a traffic matrix.

Alternatively, as shown in FIG. 41, with regard to a request for making a new E-LSP, an E-LSP and an O-LSP may be newly established or may be rearranged, according to a predetermined policy which is designated by a policy selector.

Figure 42:
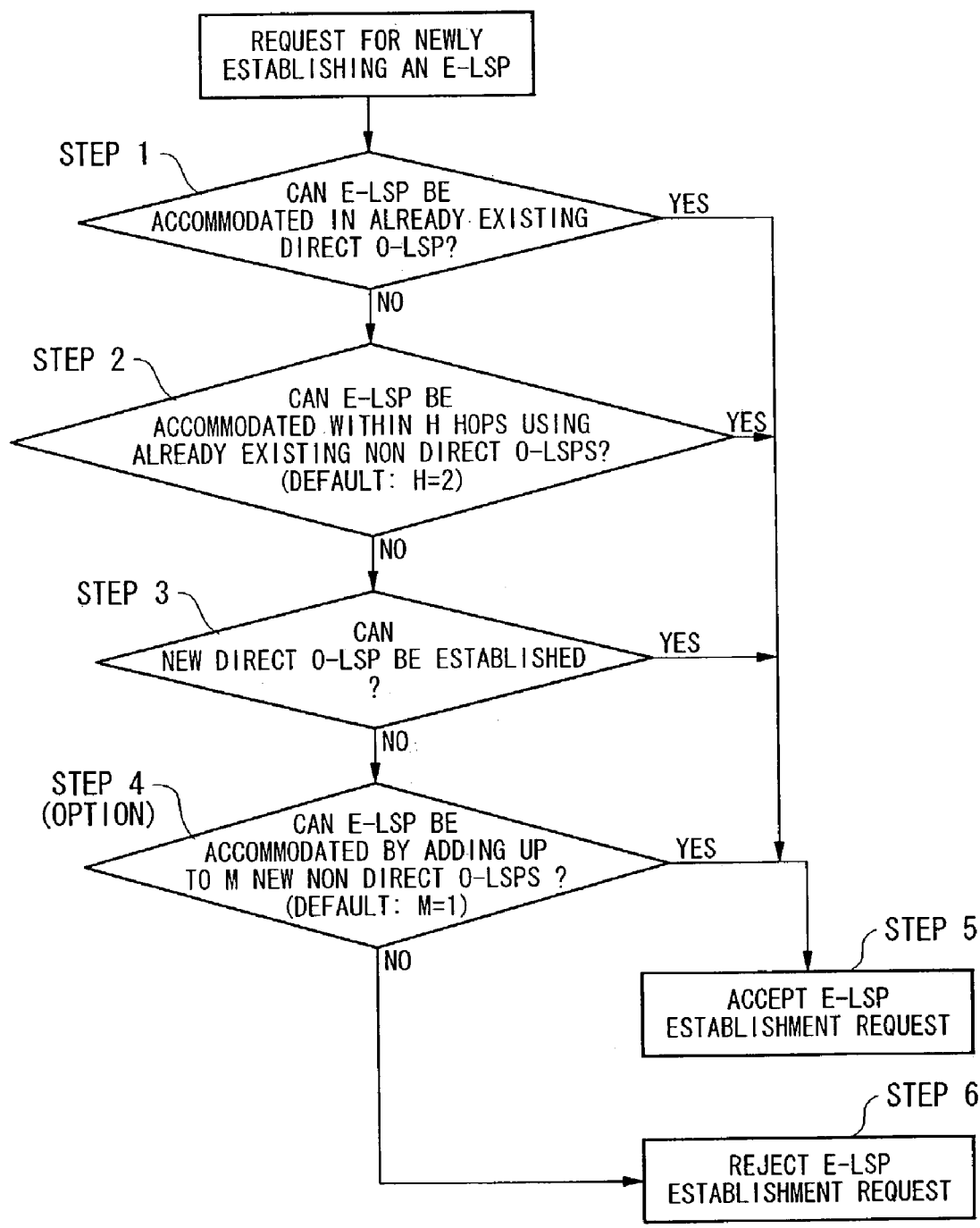
FIG. 42 is a flow chart of a policy #1 of this twenty-fourth preferred embodiment.

As shown in FIG. 42, the policies may include a policy #1, with regard to a request for making a new E-LSP, of: making a decision whether or not it is possible to accommodate the E-LSP in an already established O-LSP of a single hop; if it can be thus accommodated, thus accommodating it; if it cannot be thus accommodated in the already established O-LSP of a single hop, making a decision whether or not it is possible to accommodate the E-LSP in an already established O-LSP of a number of hops less than or equal to a predetermined hop number; if it can be thus accommodated, thus accommodating it; if it cannot be thus accommodated in the already established O-LSP of a number of hops less than or equal to a predetermined hop number, making a decision as to whether or not it is possible to make a newly established O-LSP of a single hop; and, if one can be thus made, accommodating the E-LSP in the newly established O-LSP.

Figure 43:
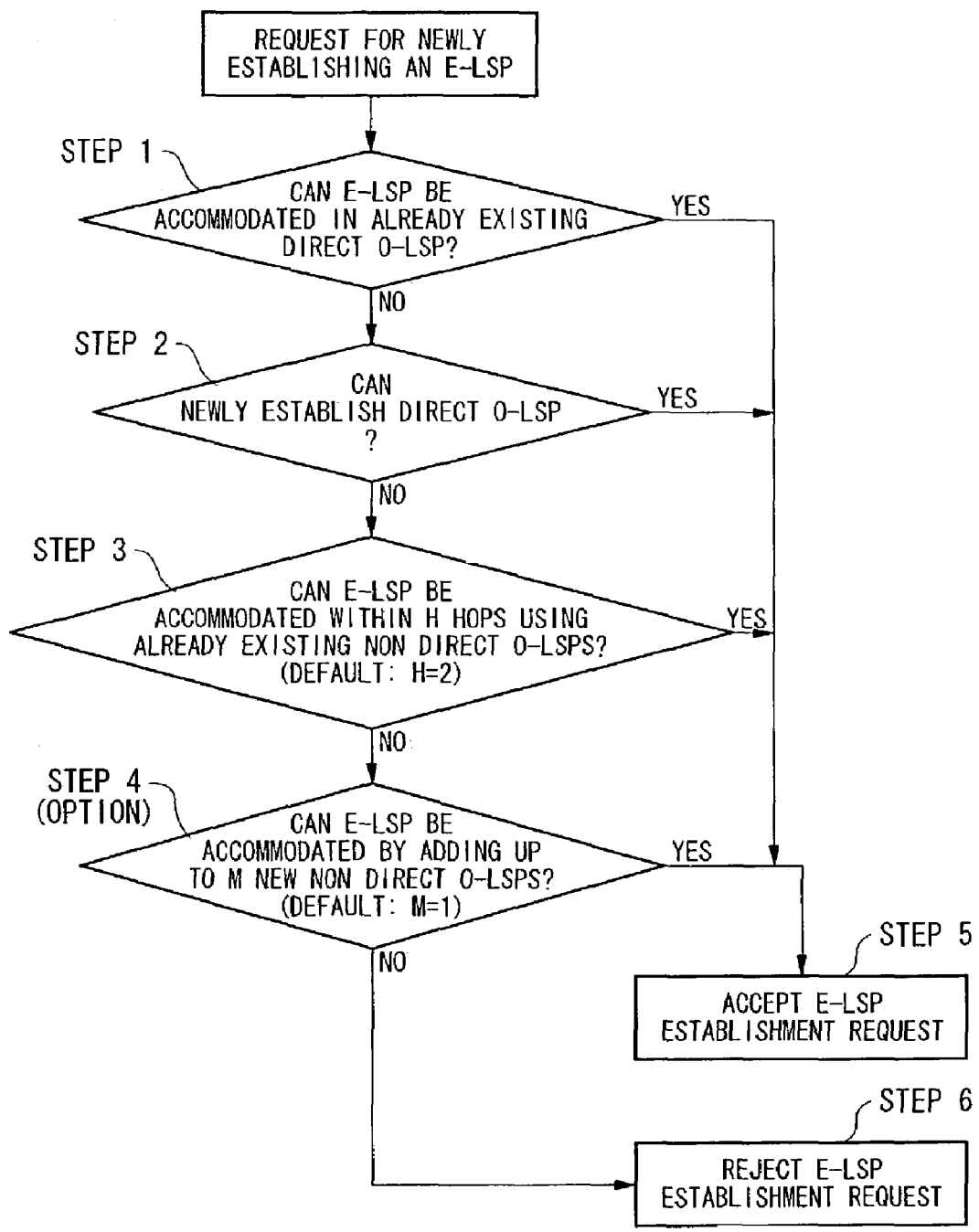
FIG. 43 is a flow chart of a policy #2 of this twenty-fourth preferred embodiment.

Or, as shown in FIG. 43, the policies may include a policy #2, with regard to a request for making a new E-LSP, of: making a decision whether or not it is possible to accommodate the E-LSP in an already established O-LSP of a single hop; if it can be thus accommodated, thus accommodating it; if it cannot be thus accommodated in the already established O-LSP of a single hop, making a decision as to whether or not it is possible to make a newly established O-LSP of a single hop; if one can be thus made, accommodating the E-LSP in the newly established O-LSP; if the newly established O-LSP cannot be made, making a decision as to whether or not it is possible to accommodate the E-LSP in an already established O-LSP of a number of hops less than or equal to a predetermined hop number; and, if it can be thus accommodated, thus accommodating it.

Figure 44:
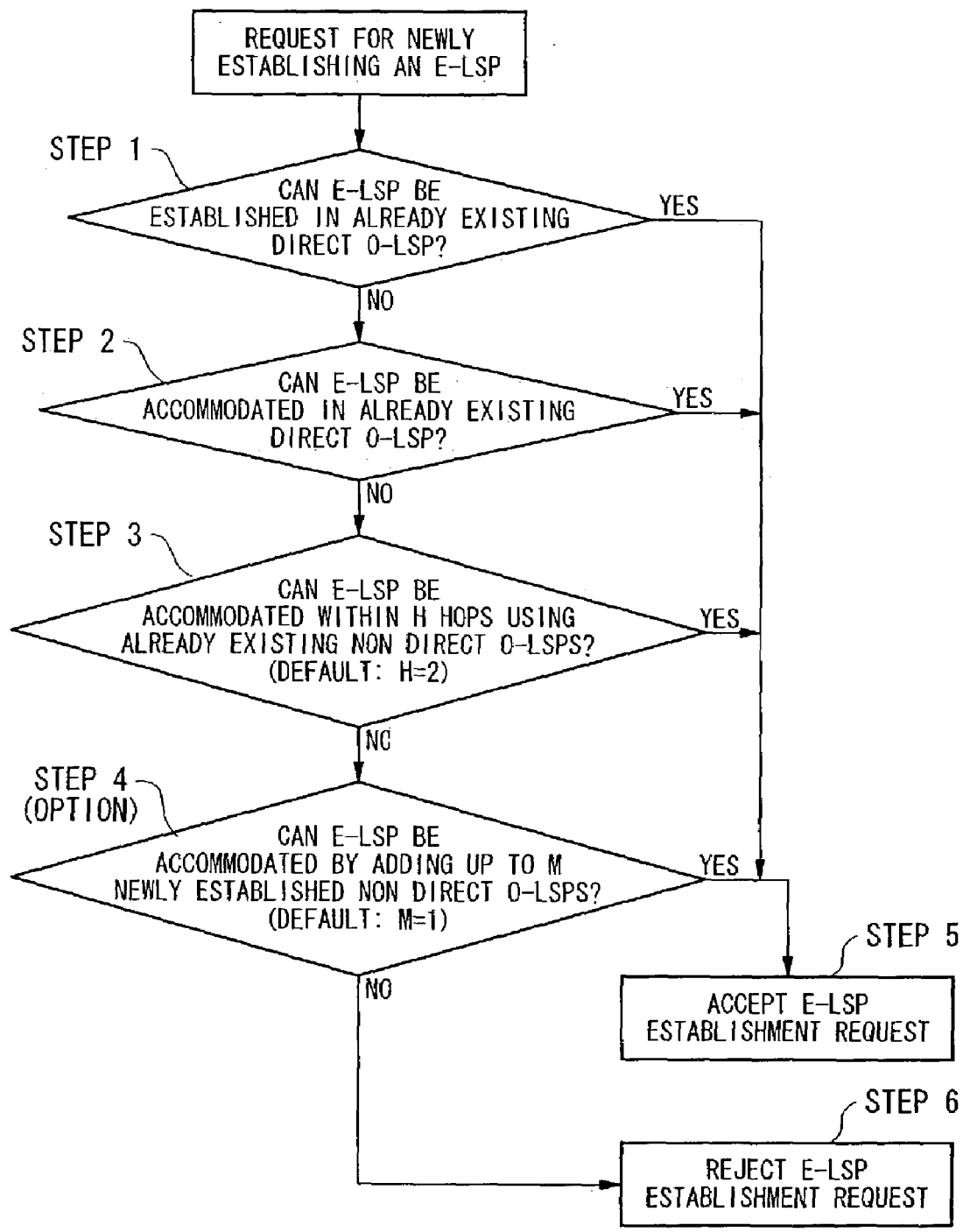
FIG. 44 is a flow chart of a policy #3 of this twenty-fourth preferred embodiment.

Or, as shown in FIG. 44, the policies may include a policy #3, with regard to a request for making a new E-LSP, of: making a decision whether or not it is possible to make a newly established O-LSP which accommodates the E-LSP with a single hop; if it is possible to make one, newly establishing the O-LSP and accommodating it therein; if it is not possible to make one, making a decision as to whether or not it is possible to accommodate the E-LSP in an already established O-LSP of a single hop; if it can be thus accommodated, accommodating the E-LSP in the already established O-LSP; if it cannot be accommodated in the already established O-LSP, making a decision as to whether or not it is possible to accommodate the E-LSP in an already established O-LSP of a number of hops less than or equal to a predetermined hop number; and, if it can be thus accommodated, thus accommodating it.

Or the policies may include a policy #4, with regard to a request for making a new E-LSP, of: making a decision as to whether or not the E-LSP can be accommodated by making a single newly established O-LSP of a number of hops less than or equal to a predetermined hop number; if it can thus be accommodated, accommodating the E-LSP in the newly established O-LSP; if, at this time, a plurality of candidates for the newly established O-LSP are available, selecting from among the candidates the one whose path cost is the minimum after accommodation of the E-LSP; if it is not possible to accommodate the E-LSP in a single newly established O-LSP, making a decision as to whether or not it is possible to make a number M of newly established O-LSPs of a number of hops less than or equal to a predetermined hop number; and, if they can be made, accommodating the E-LSP by distributing it among the number M of newly established O-LSPs.

Furthermore, the packet routers 101 through 107 may perform rearrangement with the exception of E-LSPs of the already established bandwidth reservation type.

The multi-layer photonic network of this twenty-fourth preferred embodiment can be implemented by the use of a computer device, which is an information processing device. That is to say, by installing upon a computer device a program which implements, on this computer device, functions which correspond to the packet routers 101 through 107 which are used in the multi-layer photonic network of this preferred embodiment, and by installing upon the computer device a program which implements a function of performing rearrangement of all the E-LSPs in response to detection of congestion upon any one of the O-LSPs, it is possible to make this computer device serve as a device which corresponds to the packet routers 101 through 107 of this preferred embodiment.

The program of this twenty-fourth preferred embodiment may implement, as the function of performing rearrangement, a function of conjointly performing rearrangement of the O-LSPs along with the rearrangement of all the E-LSPs.

Furthermore there may be implemented, as the conjointly performing function, a function of making a decision as to whether or not it is possible newly to make an O-LSP in a single hop with which the E-LSP for which the bandwidth used is the widest, or the number of hops is the greatest, or the path cost is the highest, is made; and if one can be thus made, newly making the O-LSP.

Or there may be implemented, as the conjointly performing function, a rearrangement simulation function of performing rearrangement of the O-LSPs a plurality of times virtually, and a function of actually executing the rearrangement of the O-LSPs for which, from among these results of rearrangement by this rearrangement simulation function a plurality of times, the path cost is the minimum.

Or there may be implemented, as the rearrangement simulation function, a function of limiting the number of times or the time period that this virtual rearrangement of the O-LSPs is performed.

Or there may be implemented, as the rearrangement simulation function, a function of performing rearrangement of the O-LSPs virtually by cut and try, and, as the function of actual execution, a function of actually rearranging the O-LSPs according to the order of the cut and try which was virtually performed.

Or, with regard to an O-LSP for which the usage ratio is equal to or below the threshold value, there may be implemented a function of executing release of the O-LSP, provided that it has been confirmed that the change over to another O-LSP of the E-LSP in which the O-LSP is included is already completed, that the connection of all the routers is ensured even if the O-LSP is released, and that congestion upon another O-LSP will not occur even if the O-LSP is released.

Or, with regard to a request for making a new E-LSP, a function may be implemented of making a new O-LSP, only provided that it is not possible to make it in already established O-LSP.

Or, with regard to a request for making a new E-LSP, a function may be implemented of newly establishing or rearranging an E-LSP or an O-LSP, according to a predetermined policy.

The policy may include a policy #1, with regard to a request for making a new E-LSP, of: making a decision whether or not it is possible to accommodate the E-LSP in an already established O-LSP of a single hop; if it can be thus accommodated, thus accommodating it; if it cannot be thus accommodated in the already established O-LSP of a single hop, making a decision whether or not it is possible to accommodate the E-LSP in an already established O-LSP of a number of hops less than or equal to a predetermined hop number; if it can be thus accommodated, thus accommodating it; if it cannot be thus accommodated in the already established O-LSP of a number of hops less than or equal to a predetermined hop number, making a decision as to whether or not it is possible to make a newly established O-LSP of a single hop; and, if one can be thus made, accommodating the E-LSP in the newly established O-LSP.

Or the policy may include a policy #2, with regard to a request for making a new E-LSP, of: making a decision whether or not it is possible to accommodate the E-LSP in an already established O-LSP of a single hop; if it can be thus accommodated, thus accommodating it; if it cannot be thus accommodated in the already established O-LSP of a single hop, making a decision as to whether or not it is possible to make a newly established O-LSP of a single hop; if one can be thus made, accommodating the E-LSP in the newly established O-LSP; if the newly established O-LSP cannot be made, making a decision as to whether or not it is possible to accommodate the E-LSP in an already established O-LSP of a number of hops less than or equal to a predetermined hop number; and, if it can be thus accommodated, thus accommodating it.

Or the policy may include a policy #3, with regard to a request for making a new E-LSP, of: making a decision whether or not it is possible to make a newly established O-LSP which accommodates the E-LSP with a single hop; if it is possible to make one, newly establishing the O-LSP and accommodating it therein; if it is not possible to make one, making a decision as to whether or not it is possible to accommodate the E-LSP in an already established O-LSP of a single hop; if it can be thus accommodated, accommodating the E-LSP in the already established O-LSP; if it cannot be accommodated in the already established O-LSP, making a decision as to whether or not it is possible to accommodate the E-LSP in an already established O-LSP of a number of hops less than or equal to a predetermined hop number; and, if it can be thus accommodated, thus accommodating it.

Or the policy may include a policy #4, with regard to a request for making a new E-LSP, of: making a decision as to whether or not the E-LSP can be accommodated by making a single newly established O-LSP of a number of hops less than or equal to a predetermined hop number; if it can thus be accommodated, accommodating the E-LSP in the newly established O-LSP; if, at this time, a plurality of candidates for the newly established O-LSP are available, selecting from among the candidates the one whose path cost is the least after accommodation of the E-LSP; if it is not possible to accommodate the E-LSP in a single newly established O-LSP, making a decision as to whether or not it is possible to make a number M of newly established O-LSPs of a number of hops less than or equal to a predetermined hop number; and, if they can be made, accommodating the E-LSP by distributing it among the number M of newly established O-LSPs.

Furthermore, as the function for performing rearrangement, a function may be implemented of performing rearrangement with the exception of E-LSPs of the already established bandwidth reservation type.

By recording the program of this twenty-fourth preferred embodiment of the present invention upon the recording medium of this preferred embodiment, it is possible to install the program of this preferred embodiment upon a computer device by using this recording medium. Or, it is possible to install the program of this preferred embodiment of the present invention directly upon a computer device via a network from a server upon which the program of this preferred embodiment is stored.

By doing this it is possible to implement, using a computer device, a multi-layer photonic network which is capable of performing establishment and release of, and of rearranging, the most suitable O-LSPs or E-LSPs dynamically according to the traffic as it changes with time.

In the following, this twenty-fourth preferred embodiment of the present invention will be explained in greater detail.

FIG. 34 is a diagram showing the overall structure of the multi-layer photonic network according to this twenty-fourth preferred embodiment of the present invention, and depicts the entire link state. The reference symbol 1D denotes a photonic core network which performs optical fiber communication, and the reference symbols 101 through 107 denote packet routers (PR: Packet Router), which have an LSC function of being able to switch in units of optical wavelengths and a PSC function of being able to switch in units of packets.

The reference symbols 2D through 7D denote electrical packet switching sub-networks (sub-nets) which are packet communication networks over local areas, and the reference symbols 201 to 203, 301 to 303, 401 to 403, 501 to 503, 601 to 603, and 701 to 703 denote routers, comprised in the corresponding sub-networks 2D through 7D, which incorporate packet communication paths or E-LSPS, and the border routers 201, 301, 401, 501, 601, and 701 which perform connection with the photonic core network 1D also can incorporate optical communication paths or O-LSPs.

A first method of rearrangement by performing establishment, release, and rearrangement of optical paths dynamically, according to the traffic quantity between the sub-networks 2D through 7D, is to rearrange optical wavelength links by traffic engineering (TE) within this multi-layer photonic network so that the traffic becomes optimal; and the policy when performing such rearrangement should be to effect the rearrangement entirely by autonomous and distributed control in as simple a manner as possible, as quickly as possible, with as beneficial effect as possible, with as flexible a correspondence as possible, and causing as few sudden interruptions when altering the topology as possible. Since the control is autonomous and distributed, the various structures in the network operate with almost the same functions and have almost the same information, but what type of policy to employ as network policy is directed from a single location, for example from a specific packet router.

Each of the packet routers 101 through 107 always counts the traffic of electrical packets through itself, and, since they mutually communicate with each other, each packet router maintains its own traffic matrix with the photonic core network 1D. Rearrangement of the O-LSP network is performed if, in the traffic matrix, a multi hop E-LSP is occupying equal to or more than γ% of the bandwidth of an O-LSP. If this is not done, traffic engineering is performed upon the E-LSP level. Path rearrangement upon the E-LSP level is performed according to OSPF (Open Shortest Path First).

Figure 35A:
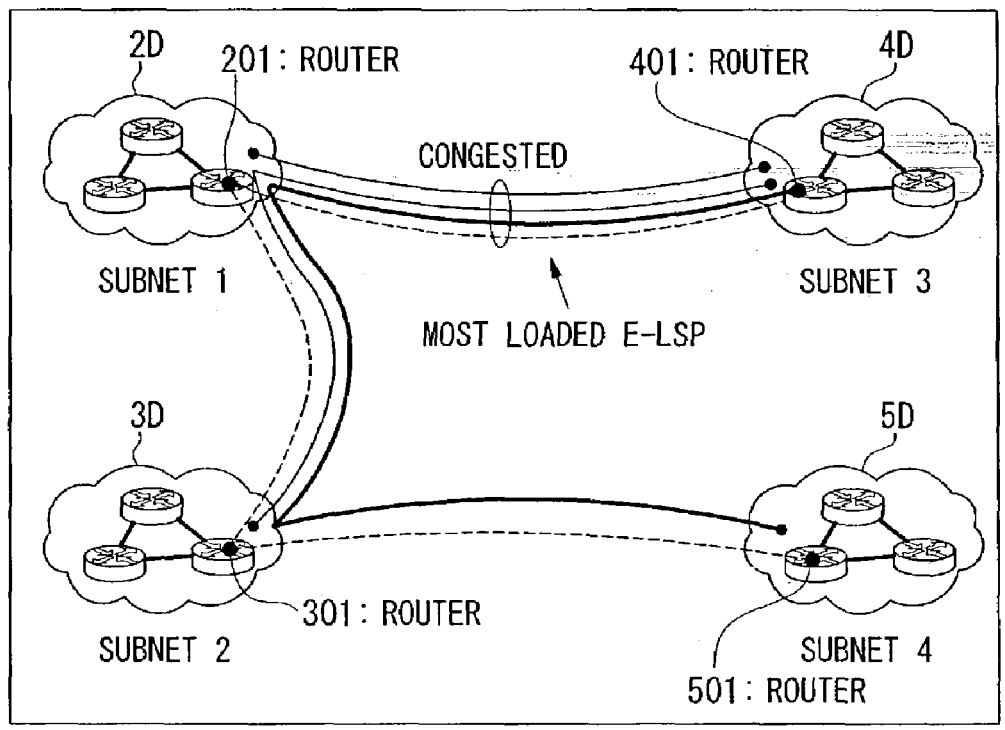
FIGS. 35A and 35B are drawings showing an adaptable O-LSP according to this twenty-fourth preferred embodiment.
Figure 35B:
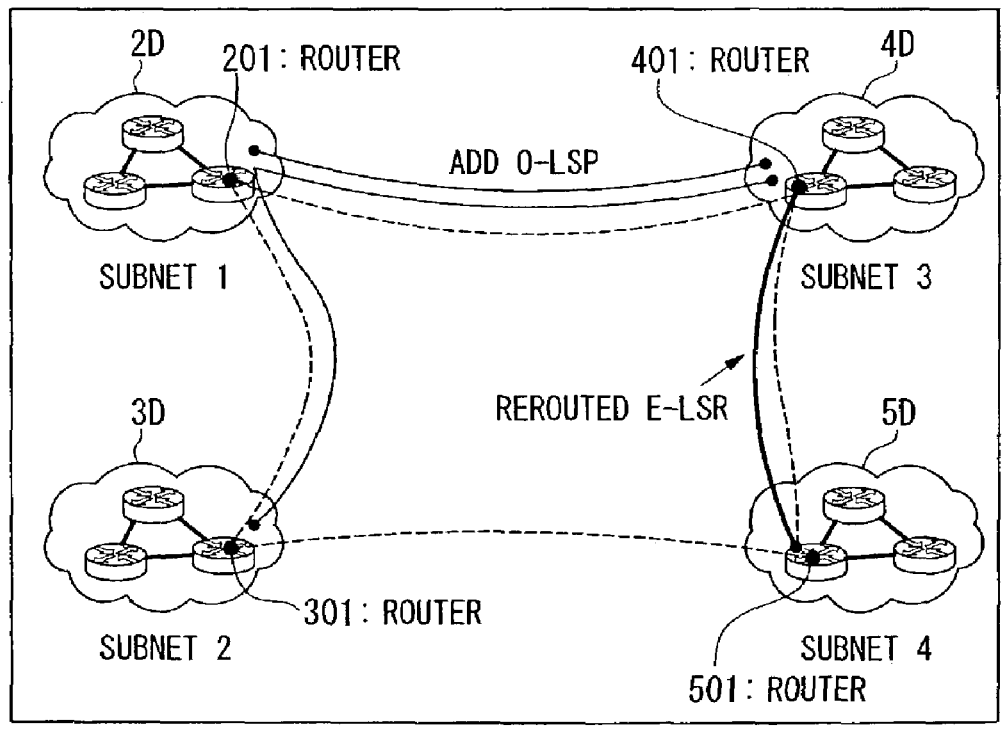

If the usage ratio of an O-LSP exceeds a threshold value a, a new O-LSP is established. First, the largest E-LSP among the multi hop E-LSPs is selected. An O-LSP is newly established so that this E-LSP is connected with a single hop (a direct O-LSP is established between its S and D (Start-Destination) pair). If such an O-LSP cannot be established, the next largest E-LSP is chosen. This will be explained in detail using the drawings. In FIGS. 35A and 35B, among the plurality multi hop E-LSPs which take [sub-net #3] sub-net #4 as S and takes [sub-net #4] sub-net #5 via [sub-net #1] sub-net #2 and [sub-net #2] sub-net #3 as D, the E-LSP shown by the thick black line is the one in which the traffic quantity is the greatest. Accordingly, traffic distribution is planned by the border router 401 of [sub-net #3] sub-net #4, for example, based upon the traffic matrix which has been obtained by using the BGP-4 protocol, newly establishing an O-LSP of a single hop by taking [sub-net #3] sub-net #4 as S and [sub-net #4] sub-net #5 as D, and, in the same manner, establishing an E-LSP of a single hop over the O-LSP (FIG. 35B).

Next the algorithm of FIGS. 35A and 35B will be explained with reference to the flow chart (1) shown in FIG. 36.

Step 1: Update the traffic matrix, for example in accordance with the BGP-4 protocol.

Step 2: Is the usage ratio of the O-LSP equal to or greater than a threshold value α? If it is equal to or greater than a, then the flow of control proceeds to the step 3; if it is not, then the flow of control is transferred to the step 9.

Step 3: Select, among the multi hop E-LSPs via the O-LSP, the one for which the traffic quantity is the greatest.

Step 4: Does the E-LSP which was selected in the step 3 occupy γ% of the bandwidth of this O-LSP ? If it does occupy equal to or greater than γ%, then the flow of control proceeds to the step 5; if it does not occupy γ%, then the flow of control is transferred to the step 7.

Step 5: Establish an O-LSP so that the E-LSP which was chosen in the step 3 becomes a single hop, and also establish a new E-LSP.

Step 6: Advertise the new O-LSP and the new E-LSP.

Step 7: Rearrange and optimize all the E-LSPs within the new O-LSP by traffic engineering.

Step 8: Advertise the new E-LSPs.

Step 9: Have all the O-LSPs been checked ? If the checks have been completed, then the flow of control proceeds to the step 10; if they have not been completed, then the flow of control is transferred to the step 1.

Step 10: Link rearrangement operation completed.

When the new O-LSP (a single hop which takes [sub-net #3] sub-net #4 as S and [sub-net #4] sub-net #5 as D) has been established in the step 5, then this path is advertised to all of the packet routers in the step 6.

Although in the step 3 of the flow chart (1) of FIG. 36 the rearrangement took as its object the E-LSP which had the most traffic, in the flow chart (2) of FIG. 37, the rearrangement is performed by newly making an O-LSP in a single hop for the E-LSP for which the bandwidth used is the widest, or for which the hop number is the largest, or whose cost is the highest. The candidates for rearrangement are taken in order from the E-LSPs which use wide bandwidth, from the E-LSPs which have large hop number, and from the E-LSPs whose cost is high.

The processing of the algorithm of the flow chart (2) shown in FIG. 37 is as follows:

Step 1: Update the traffic matrix, for example, in accordance with the BGP-4 protocol.

Step 2: Is the usage ratio of the O-LSP equal to or greater than a threshold value α? If it is equal to or greater than α, then the flow of control proceeds to the step 3; if it is not, then the flow of control is transferred to the step 6.

Step 3: Select, among the multi hop E-LSPs which pass the O-LSP, the one for which the bandwidth used is the widest, or for which the hop number is the largest, or whose cost is the highest. Take the candidates for rearrangement in order from the E-LSPs which use wide bandwidth, from the E-LSPs which have large hop number, and from the E-LSPs whose cost is high.

Step 4: Establish an O-LSP so that the E-LSP which was chosen in the step 3 becomes a single hop, and also establish a new E-LSP.

Step 5: Advertise the new O-LSP and the new E-LSP.

Step 6: Have all the O-LSPs been checked ? If the checks have been completed., then the flow of control proceeds to the step 7; if they have not been completed, then the flow of control is transferred to the step 1.

Step 7: Link rearrangement operation completed.

In the flow chart (3) of FIG. 38, rearrangement (optimization) of all the E-LSPs over the entire network is performed by a traffic engineering (TE) technique.

Thus, the algorithm of the flow chart (3) shown in FIG. 38 is as follows:

Step 1: Update the traffic matrix, for example, in accordance with the BGP-4 protocol.

Step 2: Is the usage ratio of the O-LSP equal to or greater than a threshold value α? If it is greater than α, then the flow of control proceeds to the step 3; if it is not, then the flow of control is transferred to the step 6.

Step 3: Rearrange and optimize by traffic engineering technique, taking as object all the E-LSPs which pass the O-LSP.

Step 4: Advertise the new E-LSPs.

Step 5: Have all the O-LSPs been checked ?

Step 6: Link rearrangement operation completed.

In the flow chart (4) of FIG. 39, rearrangement (optimization) of the O-LSPs is performed virtually by cut and try, so as to make the cost minimum over the entire network.

The processing of the algorithm of the flow chart (4) shown in FIG. 39 is as follows:

Step 1: Update the traffic matrix! for example, in accordance with the BGP-4 protocol.

Step 2: Is the usage ratio of the O-LSP equal to or greater than a threshold value α? If it is equal to or greater than α, then the flow of control proceeds to the step 3; if it is not, then the flow of control is transferred to the step 10.

Step 3: Perform rearrangement.(optimization) of all the E-LSPs in the O-LSP virtually by cut and try.

Step 4: Is the network cost which is the objective function, minimal ? If it is minimal, then the flow of control proceeds to the step 5; if it is not minimal, then the flow of control is transferred to the step 6 and the step 7.

Step 5: Store the O-LSP and the E-LSP for which, over the entire network, the cost is made minimal.

Step 6: Have there been equal to or more than N tries ? If the result is YES then the flow of control proceeds to the step 8; if it is NO, then the flow of control is transferred to the step 3.

Step 7: Has a time interval t0 elapsed from the start of the step 2 ? If the result is YES then the flow of control proceeds to the step 8; if it is NO, then the flow of control is transferred to the step 3.

Step 8: Establish the O-LSP and the E-LSP stored in the step 5 for which the cost is minimal.

Step 9: Advertise the new O-LSP and the new E-LSP which were established in the step 8.

Step 10: Have all the O-LSPs been checked ? If the checks have been completed, then the flow of control proceeds to the step 11; if they have not been completed, then the flow of control is transferred to the step 1.

Step 11: Link rearrangement operation completed.

By doing this, a method of rearrangement is also possible with a limit being imposed upon the number of times of, or upon the time period for, the cut and try.

By performing the rearrangement of the O-LSPs and of the E-LSPs virtually according to the order of the cut and try, the rearrangement can be performed efficiently. In other words, since in the conventional BXCQ (Branch exchange Constraint Qos) of the reconfiguration of the O-LSP topology a local solution is obtained by repeating addition and/or elimination of O-LSPs from some initial topology, therefore as many initial topologies are made as possible, and, from the plurality of local solutions, the best topology (here, the optimal topology) is selected. However, when such a conventional method is employed, even if the optimal topology is obtained there is a constraint upon network resources, and there is no guarantee that it is possible to shift from the current topology to the optimal topology without interruption of service. Thus, with the present invention, the initial topology is limited to the present topology, and, subject to actual network resources, the BXCQ method is employed with a restriction being imposed upon reorganization of the O-LSPs.

The BXCQ method consists of repeatedly performing the addition and/or the elimination of O-LSPs upon a computer, until a local solution starting from the present topology is obtained.

For the order of addition and/or elimination of the O-LSPs, for example, the following options a) through c) are available:

a) Random (in this case, a plurality of local solutions may be generated according to the value of a seed which is supplied)
b) O-LSP usage ratio dependent
c) State of empty wavelengths upon links Here, for the O-LSP routing, a conventional method or some other method may be employed.

The local solution which has been obtained ensures any shift from the current topology. In simple terms, the process which has been explored upon the computer is actually followed up.

If the usage ratio of any O-LSP within the network has fallen below the threshold value $\beta$, this O-LSP is released after having confirmed that the E-LSPs which were using this O-LSP are shifted over to other O-LSPs in advance, and that connection of all of the routers will be ensured even if the O-LSP is released, and that congestion will not occur upon other O-LSPs.

FIG. 40 is a flow chart for O-LSP release, and the processing of this algorithm proceeds as follows:

Step 1: Update the traffic matrix, for example, in accordance with the BGP-4 protocol.

Step 2: Is the usage ratio of the O-LSP equal to or less than a threshold value $\beta$? If it is equal to or less than the threshold value $\beta$, then the flow of control proceeds to the step 3; if it is more than the threshold value $\beta$, then the flow of control is transferred to the step 8.

Step 3: Virtually re-route all the E-LSPs in the virtual topology with the exception of the O-LSP.

Step 4: Has congestion occurred upon at least one or more O-LSPs ? If such congestion has occurred then the flow of control proceeds to the step 5; if such congestion has not occurred, then the flow of control is transferred to the step 6.

Step 5: Do not release the O-LSP.

Step 6: Is it ensured that all of the routers will be connected even if the O-LSP is released ? If the result is YES then the flow of control proceeds to the step 7; if it is NO, then the flow of control is transferred to the step 3

Step 7: Release the O-LSP.

Step 8: Have all the O-LSPs been checked ? If the checks have been completed, then the flow of control proceeds to the step 9; if they have not been completed, then the flow of control is transferred to the step 2.

Step 9: Release operation for the O-LSP completed.

When a request has occurred for making a new E-LSP, to the utmost extent possible, the E-LSP is made by using already established O-LSPs; or the new E-LSP may be made by making a new O-LSP. The flow chart shown in FIG. 42 is for this preferred embodiment of the present invention.

The processing in the algorithm of the flow chart of FIG. 42 is as follows:

Step 1: Establish a new E-LSP virtually in a single hop between the S and D to which the making request was made.

Step 2: Update the traffic matrix.

Step 3: Is there an already established O-LSP within the already established O-LSPs for which the usage ratio is equal to or greater than a threshold value $\alpha$? If there is, then the flow of control proceeds to the step 4; if there is not, then the flow of control is transferred to the step 8.

Step 4: Is it possible to rearrange and optimize all of the E-LSPs within the already established O-LSPs by traffic engineering ? If it is possible, then in the step 5 advertisement is performed; if it is not possible, then the flow of control is transferred to the step 6.

Step 5: Advertise the new E-LSPs.

Step 6: Establish the new O-LSP of a single hop, and shift a portion of the traffic upon the E-LSPs.

Step 7: Advertise the new O-LSPs and the new E-LSPs.

Step 8: Have all the O-LSPs been checked ? If the checks have been completed, the flow of control proceeds to the step 9 and terminates; while, if they have not been completed, the flow of control returns to the step 2 and the steps 2 through 8 are repeated.

Step 9: Terminate.

E-LSPs are newly established or rearranged in response to increase of traffic demand, but when performing such rearrangement, the rearrangement and reorganization are performed with the exception of those E-LSPs which are of the already established bandwidth reservation type; and the selection algorithm for the reorganized E-LSPs and the O-LSPs which are the target of reorganization is as follows. In this case, the flow charts are shown in FIGS. 45 through 49.

In the algorithm of the flow chart (the step 100) for reorganization shown i11 FIG. 45, the processing proceeds as follows:

Step 101: In order to check whether or not it is possible, among the O-LSPs which are related to the E-LSP which is to be reorganized, to reorganize the i-th largest E-LSP in an O-LSP of a direct hop which is already established, in the step 101, when calculating the path of the i-th largest E-LSP, it is checked whether or not it can be reorganized in the j-th path candidate (the initial value for j=1). If the result is OK then the flow of control is transferred to the step 104, while, if the result is NG (No Good) and when also i<I, the operation i=i+1 is executed and the step 101 is repeated; while if the result is NG and when also i=I, then the counter i and j are reset to 1 and the flow of control is transferred to the step 200.

Step 102: When calculating the path of the selected E-LSP, it is checked whether or not it can be reorganized in the j-th path candidate (the initial value for j=1). If the result is OK then in the step 104 the reorganization is performed and the flow of control proceeds to the step 105, and, if the result is NG and also when j<J, then the operation j=j+1 is executed and the step 101 is repeated; while if the result is NG and also when j=J, if i<I then the operation i=i+1 is executed and the flow of control is transferred to the step 101, while if i=I then the counters i and j are reset to 1 and the flow of control is transferred to the step 200.

Step 103: i<I? If the result is YES then the operation i=i+1 is executed and the flow of control is transferred to the step 101, while if the result is NO then the counters i and j are reset to 1 and the flow of control is transferred to the step 200.

Step 104: Perform the reorganization.

Step 105: O-LSP base cleared? If the result is YES then the reorganization is completed, while if the result is NO then the operation i=i+1 is executed and the flow of control is transferred to the step 101.

Figure 46:
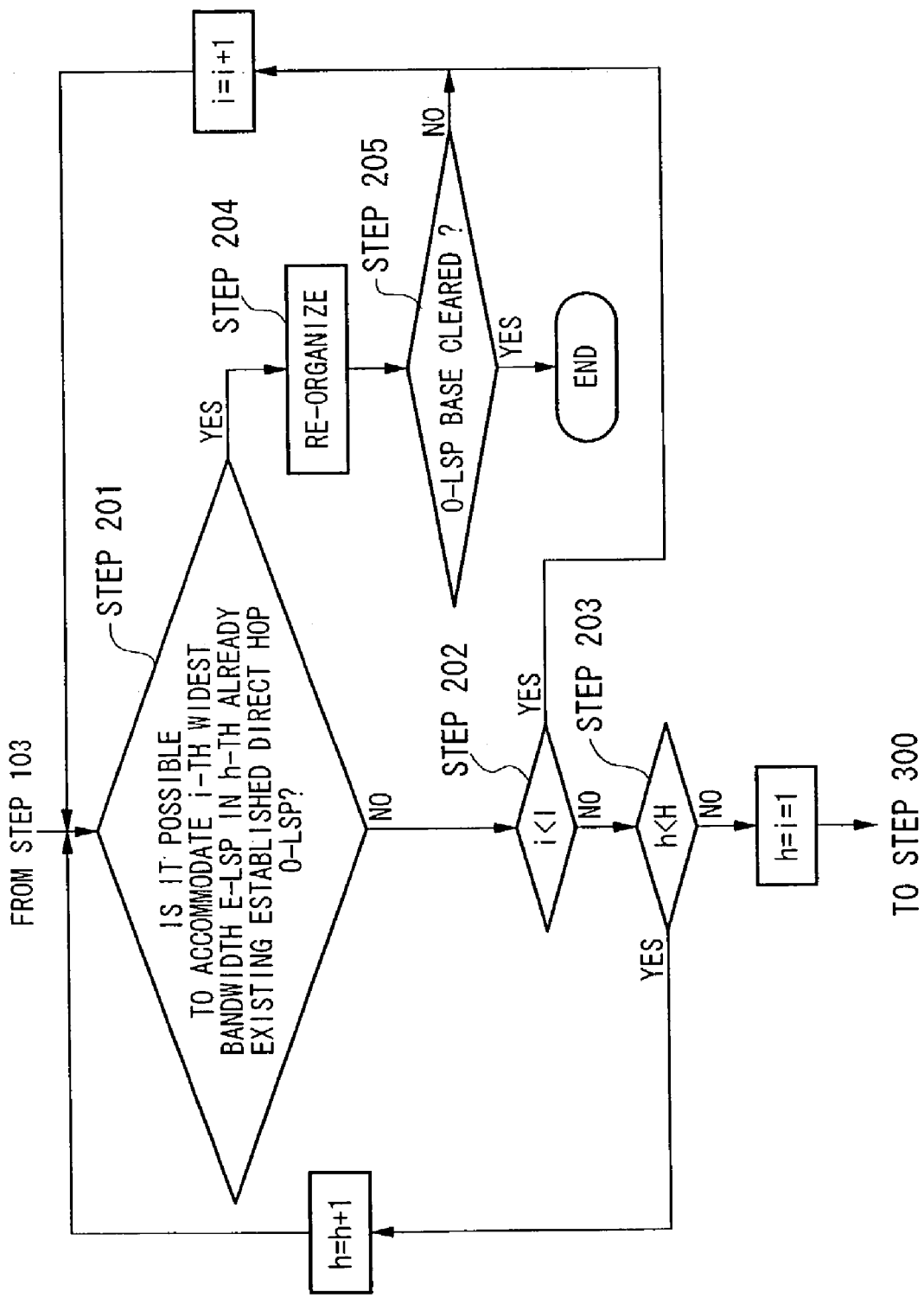
FIG. 46 is another flow chart for reorganizing an E-LSP according to this twenty-fourth preferred embodiment.

Next, in the algorithm of the flow chart (the step 200) for reorganization shown in FIG. 46, the processing proceeds as follows:

Step 201: It is checked whether or not it is possible to reorganize the i-th largest E-LSP in an O-LSP of h hops (the initial value of h=2) which is already established. If the result is OK then reorganization is performed in the step 204 and the flow of control is transferred to the step 205, while if the result is NO then the flow of control continues to the step 202.

Step 202: i<I? If the result is YES then the operation i=i+1 is executed and the step 101 is repeated, while if the result is NO and also i=I, then the flow of control continues to the step 203.

Step 203: h<H? If h<H, then the operation h=h+1 is executed and the flow of control is transferred to the step 201; while if h=H, then the counters h and i are reset to 1 and the flow of control is transferred to the step 300.

Step 204: Perform the reorganization.

Step 205: O-LSP base cleared? If the result is YES then the reorganization is completed, while if the result is NO then i=i+1 and the flow of control is transferred to the step 201.

Figure 47:
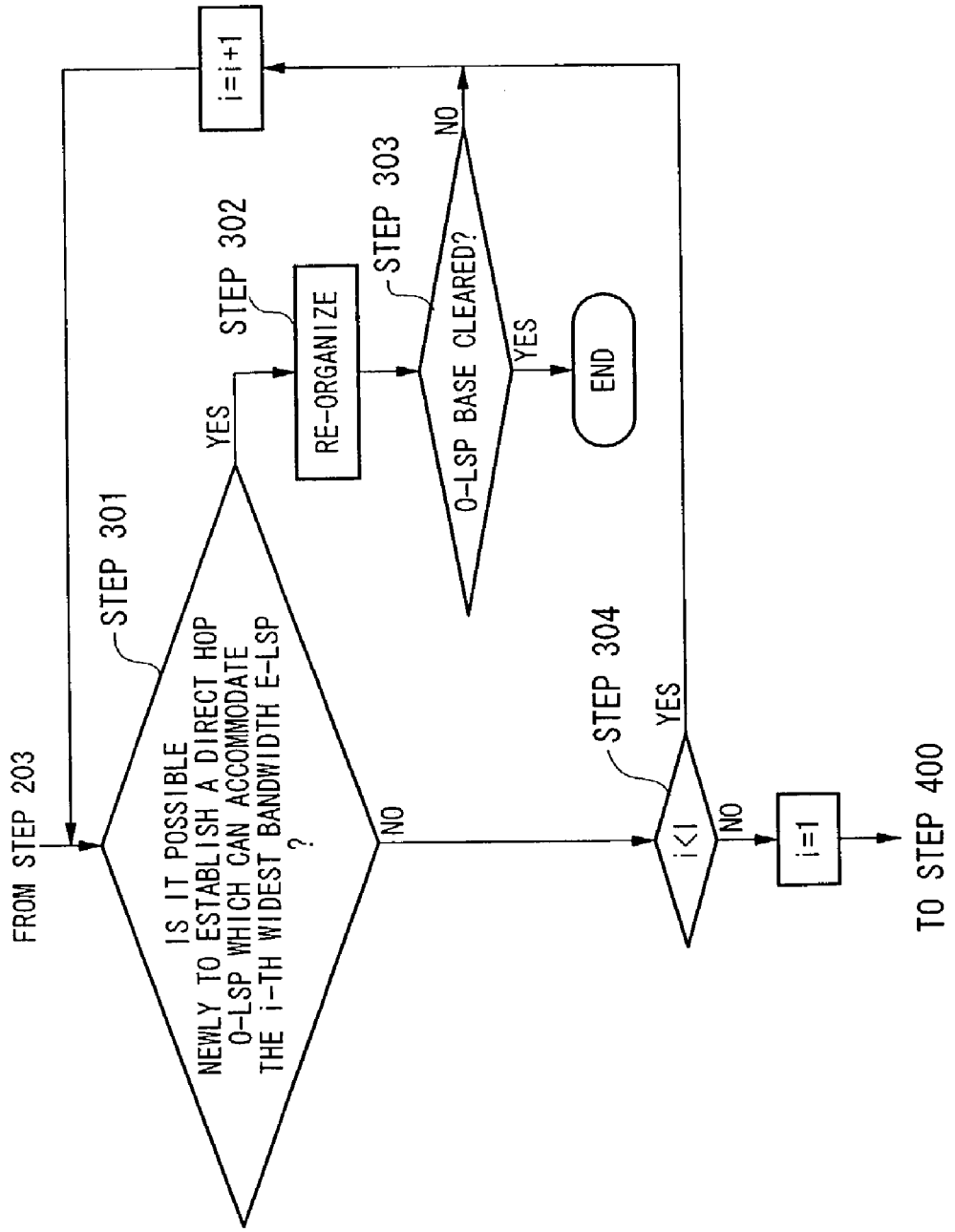
FIG. 47 is yet another flow chart for reorganizing an E-LSP according to this twenty-fourth preferred embodiment.

Next, in the algorithm of the flow chart (the step 300) for reorganization shown in FIG. 47, the processing proceeds as follows:

Step 301: It is checked whether or not it is possible newly to establish a direct hop O-LSP which is capable of accommodating the i-th largest E-LSP. If the result is YES then the new establishment and the reorganization are performed in the step 302 and the flow of control proceeds to the step 303, while if the result is NO and also when i<I then the operation i=i+1 is executed and the step 301 is repeated; while, if the result is NO and also when i=I, then the counter i is reset to 1 and the flow of control is transferred to the step 400.

Step 302: Perform the reorganization.

Step 303: O-LSP base cleared? If the result is YES then the reorganization is completed, while if the result is NO then the operation i=i+1 is executed and the flow of control is transferred to the step 301.

Step 304: i<I? If the result is YES then the operation i=i+1 is executed and the flow of control is transferred to the step 301, while if the result is NO and also i=I, then the counter i is reset to I and the flow of control is transferred to the step 400.

Figure 48:
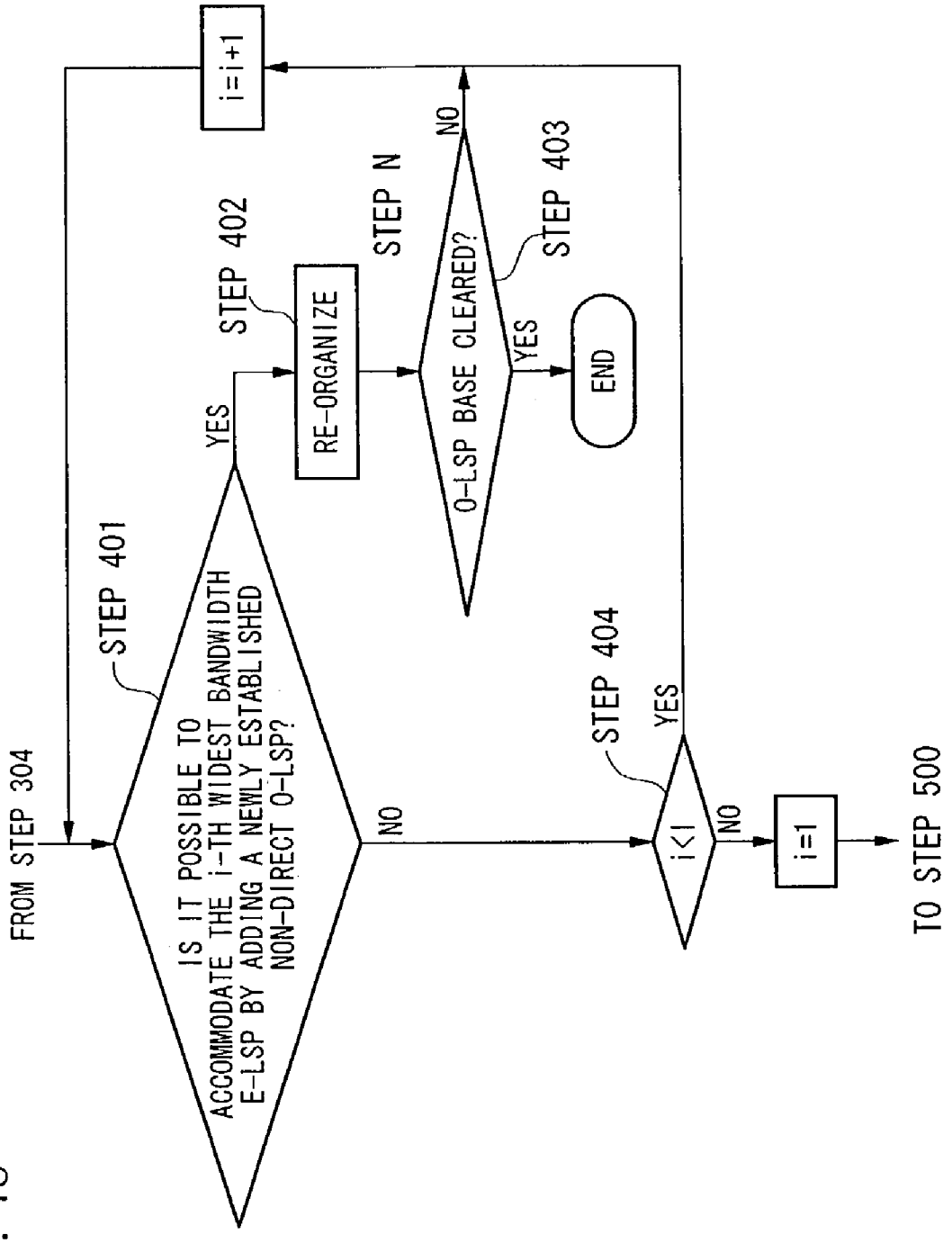
FIG. 48 is still yet another flow chart for reorganizing an E-LSP according to this twenty-fourth preferred embodiment.

Next, in the algorithm of the flow chart (the step 400) for reorganization shown in FIG. 48, the processing proceeds as follows:

Step 401: It is checked whether or not it is possible, by newly establishing a non-direct hop O-LSP, to accommodate the i-th largest E-LSP with already established O-LSPs in a multi-hop manner. If the result is YES then the reorganization is performed in the step 402 and the flow of control proceeds to the step 403, while if the result is NO and also when i<I then the operation i=i+1 is executed and the step 401 is repeated; while, if the result is NO and also when i=I, then the counter i is reset to I and the flow of control is transferred to the step 500.

Step 402: Perform the reorganization.

Step 403: O-LSP base cleared? If the result is YES then the reorganization is completed, while if the result is NO then the operation i=i+1 is executed and the flow of control is transferred to the step 401.

Step 404: i<I ? If the result is YES then the operation i=i+1 is executed and the flow of control is transferred to the step 401, while if the result is NO and also i=I, then the counter i is reset to 1 and the flow of control is transferred to the step 500.

Next, in the algorithm of the flow chart (the step 500) for reorganization shown in FIG. 49, the processing proceeds as follows:

Step 501: It is checked whether or not it is possible to divide the i-th largest E-LSP into a plurality of E-LSPs, and to accommodate these E-LSPs into different O-LSPs. If the result is YES then the reorganization is performed in the step 502 and the flow of control proceeds to the step 503, while if the result is NO and also when i<I then the operation i=i+1 is executed and the step 501 is repeated; while, if the result is NO and also when i=I, then the counter i is reset to I and the flow of control terminates.

Step 502: Perform the reorganization.

Step 503: Bandwidth of O-LSP base cleared? If the result is YES then the reorganization is completed, while if the result is NO then the operation i=i+1 is executed and the flow of control is transferred to the step 501.

Step 504: i<I? If the result is YES then the operation i=i+1 is executed and the flow of control is transferred to the step 501, while if the result is NO and also i=I, then the counter i is reset to 1 and the flow of control terminates.

Figure 45:
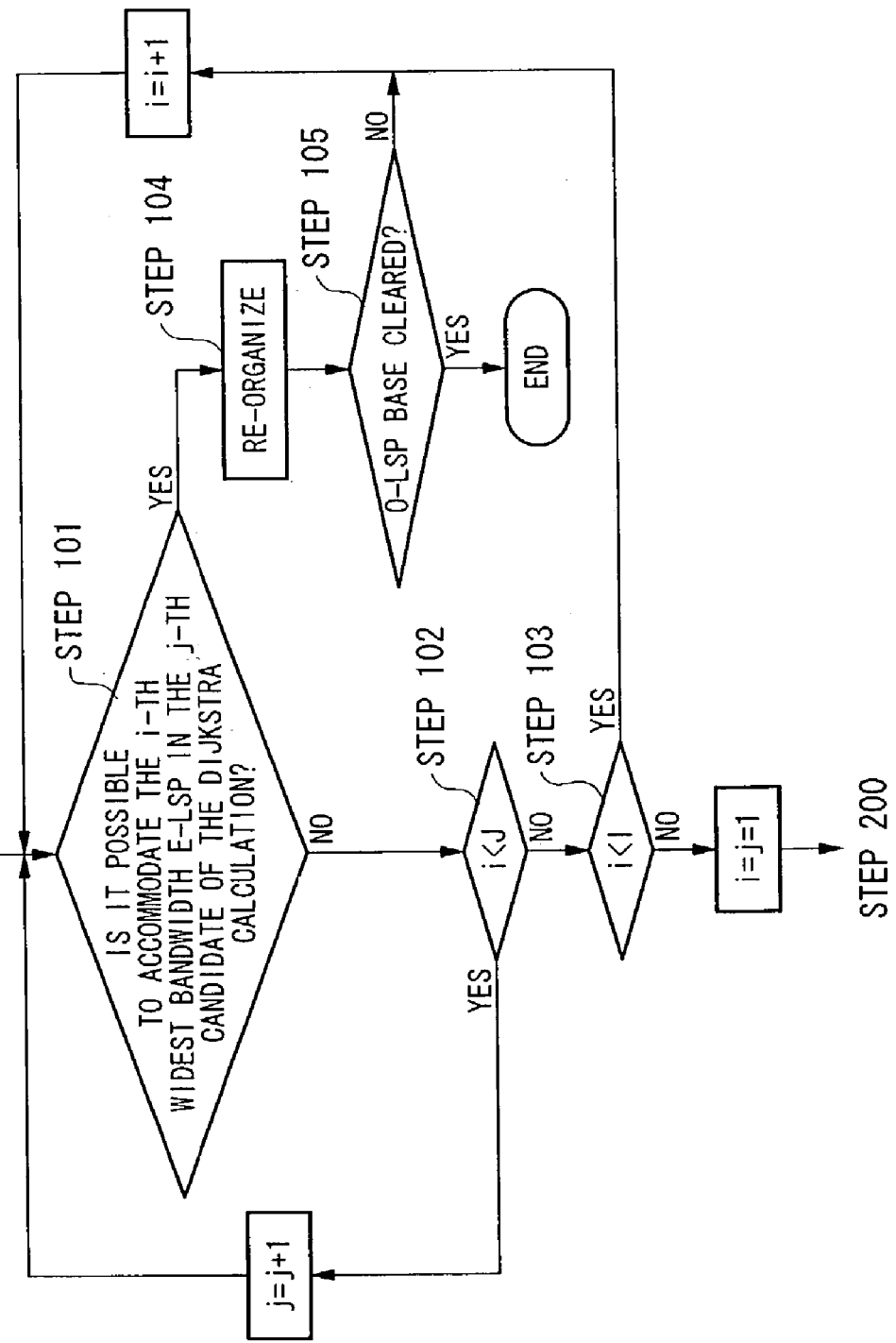
FIG. 45 is a flow chart for reorganizing an E-LSP according to this twenty-fourth preferred embodiment.
Figure 49:
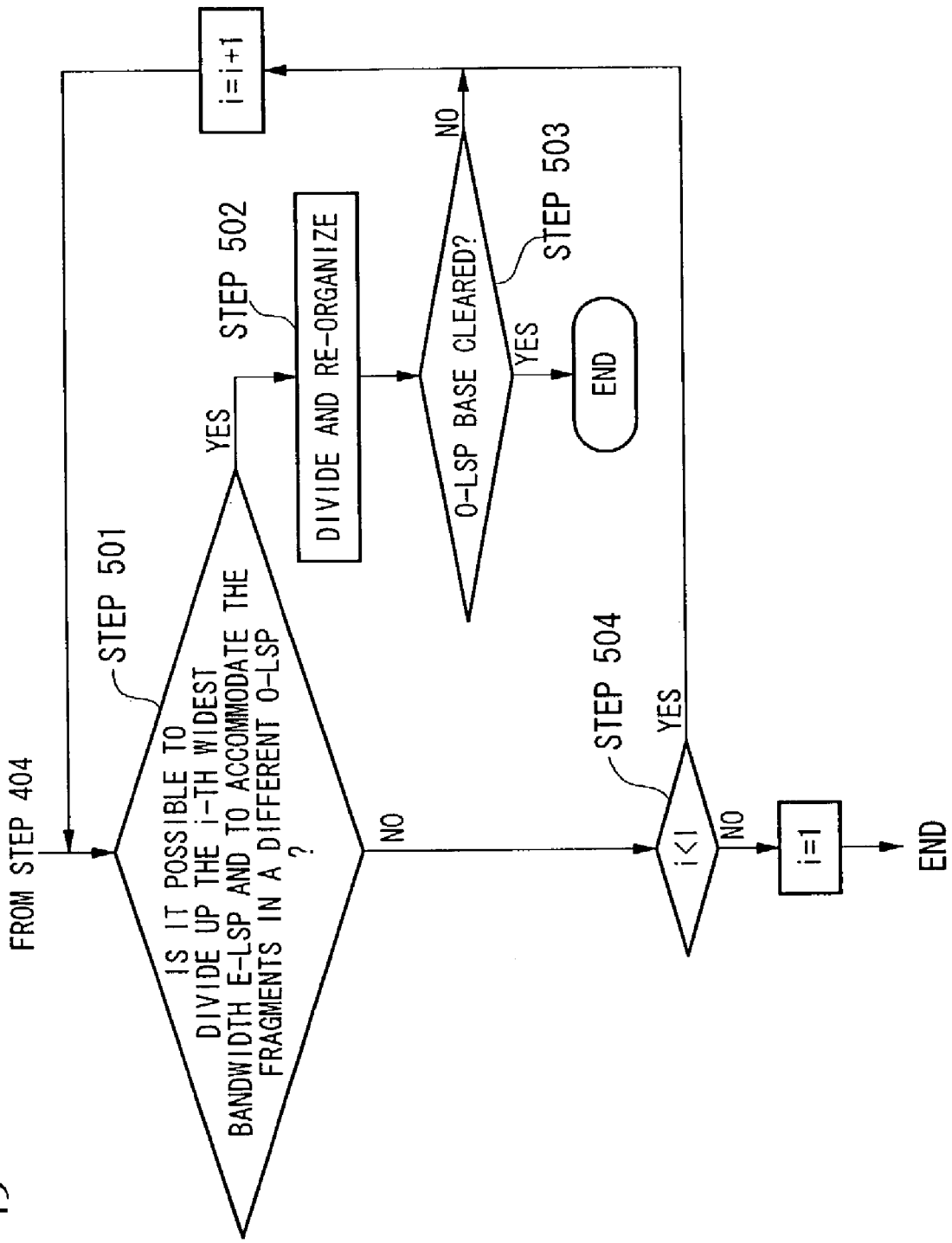
FIG. 49 is even yet another flow chart for reorganizing an E-LSP according to this twenty-fourth preferred embodiment.

In the above explanation of the continuous flow chart of FIG. 45 through FIG. 49, although the explanation was made in terms of the flow of control proceeding in order from FIG. 45 through to FIG. 49, it would be possible to alter the order of the five flow charts of FIG. 45 through FIG. 49 to any desired order. For example, by bringing the flow chart of FIG. 47 to the head if it is desired to establish new O-LSPs as much as possible, or, according to circumstances, by bringing some other flow chart to the head.

The policy to be adopted when establishing an optical wavelength link structure to optimize the traffic by traffic engineering (TE) within the multi-layer photonic network differs according to network circumstances, and it is possible to select and to execute a plurality of policies by the functioning of policy selectors which are provided within the packet routers 101 through 107. According to the functional diagram of the policy selectors shown in FIG. 41, the policy selectors select between a policy #1, a policy #2, a policy #3, and a policy #4 in accordance with a command sent through a command line interface (CLI).

In the algorithm for the flow chart for policy #1 shown in FIG. 42, the processing proceeds as follows:

Step 1: In response to an establishment request to newly establish an E-LSP, it is checked whether or not it is possible to accommodate the new E-LSP in a direct already existing O-LSP. If the result is OK, then the flow of control is transferred to the step 5; if the result is NO, then the flow of control proceeds to the step 2.

Step 2: It is checked whether or not it is possible to accommodate the E-LSP with two hops using a non-direct already existing O-LSP. If the result is OK, then the flow of control is transferred to the step 5; if the result is NO, then the case of three hops is checked. If the result is YES, then the flow of control is transferred to the step 5; if the result is NO, then the checking proceeds as far as H hops. If the result is YES, then the flow of control is transferred to the step 5; if the result is NO then the flow of control is transferred to the step 3. (Default: H=2). In the E-LSP path search, a minimum hop or "Least Loaded" policy is employed.

Step 3: It is checked whether or not it is possible to establish a new direct O-LSP. If the result is YES, then the flow of control is transferred to the step 5; if the result is NO, then the flow of control proceeds to the step 4.

In the new establishment of the new O-LSP, a wavelength routing algorithm (LL, LL+AWCC, ERW, or SPF−WC) is utilized.

Figure 50A:
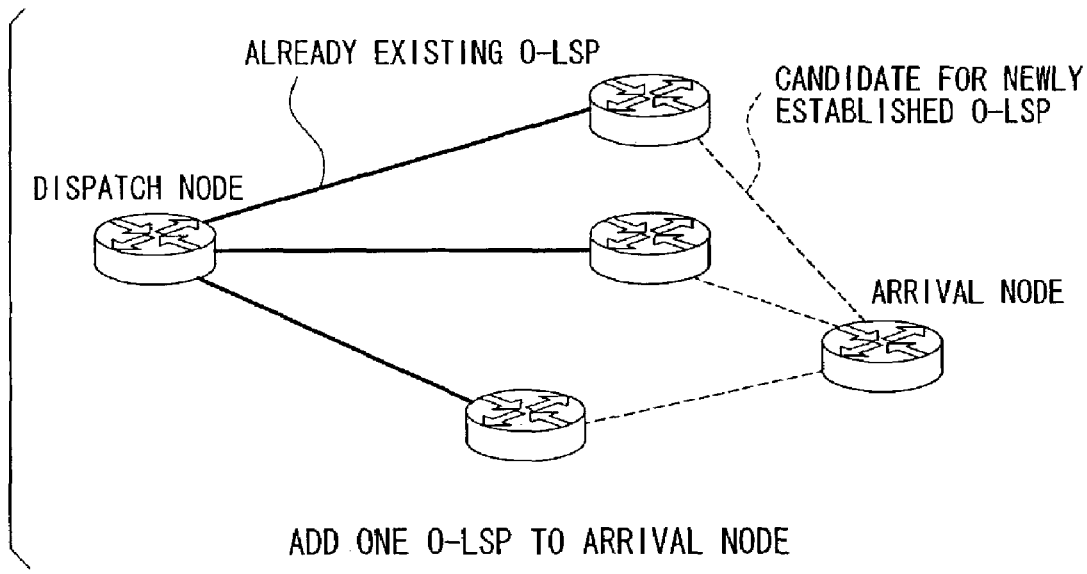
FIGS. 50A and 50B are drawings for explanation of the details of an algorithm for a step 4 in a flow chart for the policy 2 of this twenty-fourth preferred embodiment (for an example of a single addition).
Figure 50B:
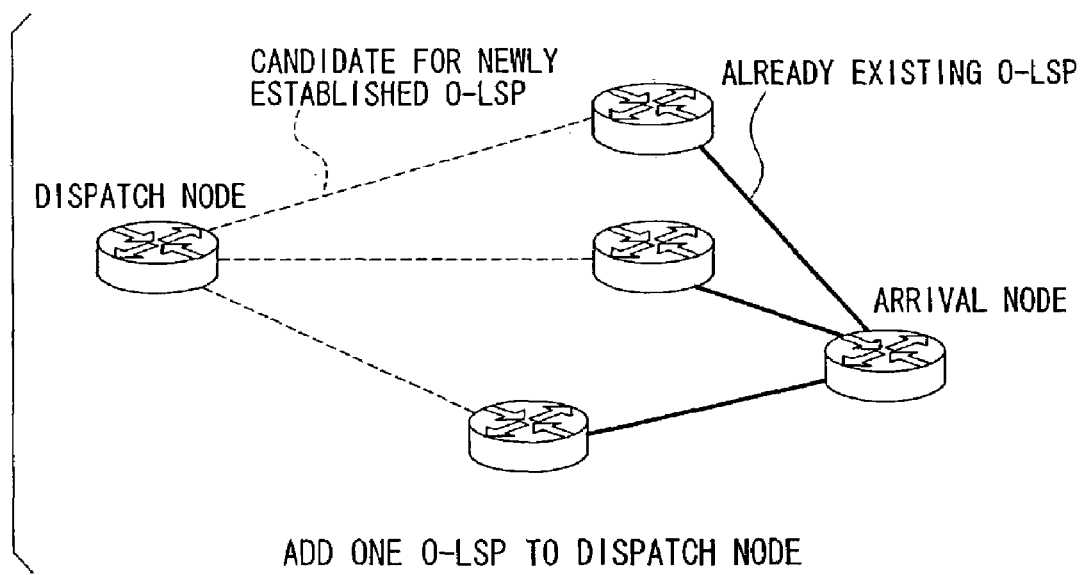

Step 4 (Optional): It is checked whether or not, by adding a single newly established non direct O-LSP, it is possible to establish the E-LSP, giving highest priority to the E-LSP paths for which the number of enroute O-LSPs is minimum. In the addition of an O-LSP, there are at most two patterns (refer to FIGS. 50A and 50B): when adding it to the arrival node side; and when adding it to the departure node side. If there are a plurality of branches to be selected between, the O-LSP is added so that, after adding the O-LSP, the cost of the E-LSP will be minimum. If the result is YES, then the flow of control is transferred to the step 5; if the result is NO, then attempts continue up to addition of M newly established non direct O-LSPs. If the result is YES, then the flow of control proceeds to the step 5; if the result is NO, then the flow of control is transferred to the step 6 (Default: M=1).

Figure 51A:
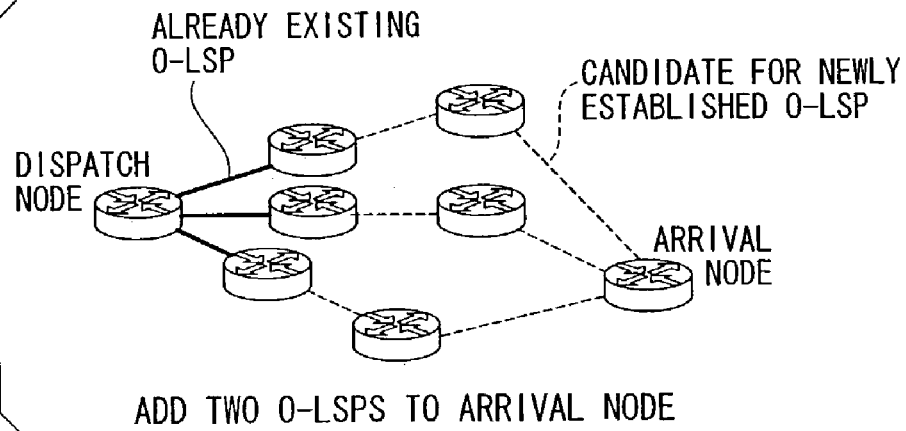
FIGS. 51A through 51C are drawings for explanation of the details of an algorithm for a step 4 in a flow chart for the policy 2 of this twenty-fourth preferred embodiment (for an example of two additions).
Figure 51B:
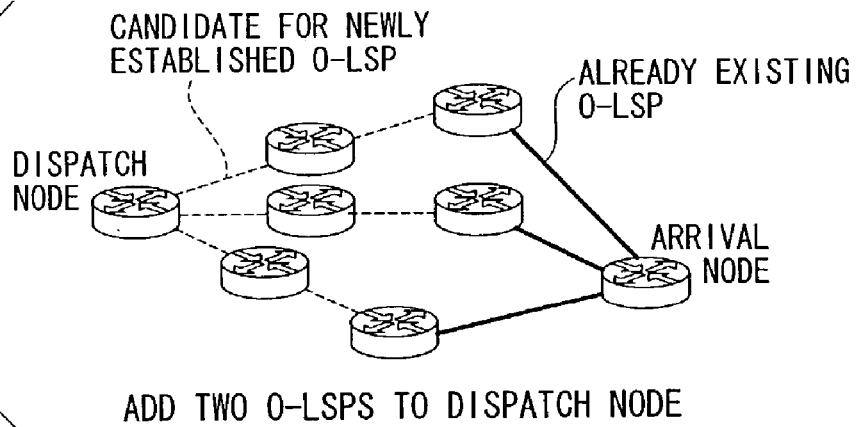
Figure 51C:
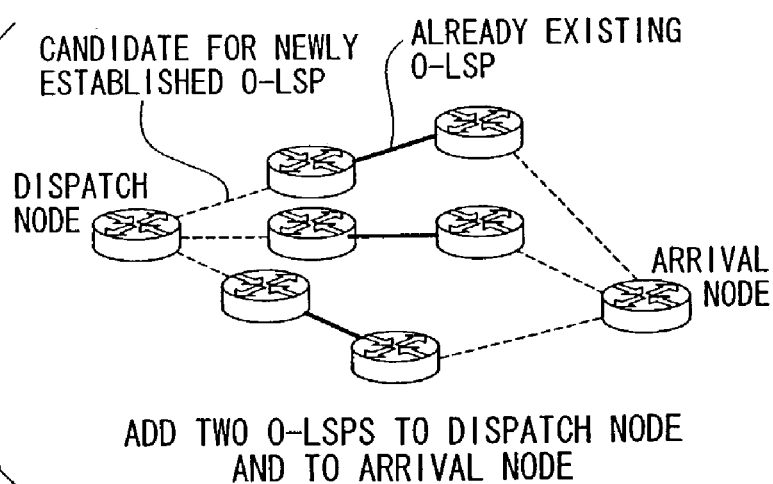

In FIGS. 51A to 51C, the algorithm for this step 4 in the case of adding two E-LSPs is shown in detail by way of example.

Step 5: Accept request to newly establish an E-LSP.
Step 6: Reject request to newly establish an E-LSP.

In the algorithm for the flow chart for policy #2 shown in FIG. 43, the processing proceeds as follows:

Step 1: In response to an establishment request to newly establish an E-LSP, it is checked whether or not it is possible to accommodate the new E-LSP in a direct already existing O-LSP. If the result is YES, then the flow of control is transferred to the step 5; if the result is NO, then the flow of control proceeds to the step 2.

Step 2: It is checked whether or not it is possible to establish a new direct O-LSP. If the result is OK, then the flow of control is transferred to the step 5; if the result is NO, then the flow of control proceeds to the step 3. In the establishment of the new O-LSP, a wavelength routing algorithm (LL, LL+WCC, ERW, or SPF−WC) is utilized. In the E-LSP path search, a minimum hop or "Least Loaded" policy is employed.

Step 3: It is checked whether or not it is possible to accommodate the E-LSP with two hops using a non-direct already existing O-LSP. If the result is YES, then the flow of control is transferred to the step 5; if the result is NO, then the case of three hops is checked. If the result is YES, then the flow of control is transferred to the step 5; if the result is NO, then the checking proceeds as far as H hops. If the result is YES, then the flow of control is transferred to the step 5; if the result is NO, then the flow of control proceeds to the step 4 (Default: H=2).

Step 4 (Optional): It is checked whether or not it is possible to establish the E-LSP by adding a single newly established non direct O-LSP. If there are a plurality of branches to be selected between, the O-LSP is added so that, after adding the O-LSP, the cost of the E-LSP will be minimum. If the result is YES then the flow of control is transferred to the step 5; if the result is NO, then attempts continue up to the addition of M newly established non direct O-LSPs. If the result is YES, then the flow of control proceeds to the step 5; if the result is NO, then the flow of control is transferred to the step 6 (Default: M=1).

Refer to FIG. 50 and FIG. 51.
Step 5: Accept request to newly establish an E-LSP.
Step 6: Reject request to newly establish an E-LSP.

In the algorithm for the flow chart for policy #3 shown in FIG. 44, the processing proceeds as follows:

Step 1: In response to an establishment request to newly establish an E-LSP, it is checked whether or not it is possible to establish a new direct O-LSP; and if the result is YES, then the flow of control is transferred to the step 5; while, if the result is NO, then the flow of control proceeds to the step 2, and, in the establishment of the new O-LSP, a wavelength routing algorithm (LL, LL+AWCC, ERW, or SPF−WC) is utilized. In the E-LSP path search, a minimum hop or "Least Loaded" policy is employed.

Step 2: It is checked whether or not it is possible to accommodate the new E-LSP in a direct already existing O-LSP. If the result is OK, then the flow of control is transferred to the step 5; if the result is NO, then the flow of control proceeds to the step 3.

Step 3: It is checked whether or not it is possible to accommodate the E-LSP with two hops using a non-direct already existing O-LSP. If the result is YES, then the flow of control is transferred to the step 5; if the result is NO, then the case of three hops is checked. If the result is YES, then the flow of control is transferred to the step 5; if the result is NO, then the checking proceeds as far as H hops. If the result is YES, then the flow of control is transferred to the step 5; if the result is NO, then the flow of control proceeds to the step 4 (Default: H=2).

Step 4: (Optional): It is checked whether or not it is possible to establish the E-LSP by adding a single newly established non direct O-LSP. If there are a plurality of branches to be selected between, the O-LSP is added so that, after adding the O-LSP, the cost the E-LSP will be minimum. If the result is YES, then the flow of control is transferred to the step 5; if the result is NO, then attempts continue up to the addition of M newly established non direct O-LSPs. If the result is YES, then the flow of control proceeds to the step 5; if the result is NO, then the flow of control is transferred to the step 6 (Default: M=1).

Refer to FIG. 50 and FIG. 51.
Step 5: Accept request to newly establish an E-LSP.
Step 6: Reject request to newly establish an E-LSP.

By doing this, it becomes possible to establish, or to release the establishment of, optical paths in an autonomous and distributed manner dynamically at high speed, according to the traffic quantity between the various electrical packet switches and sub-networks, which fluctuates.

By doing this, it is possible to restrain the consumption of resources to a low level, because the optical paths are established along the shortest paths.

Moreover, it becomes possible to implement an optical communication service network which covers a wide area, and which can deal with high capacity data packet demand, which is increasing along with the promulgation of the broadband era.

What is claimed is:

1. A node for use in a multi-layer photonic network of the type having a first layer consisting of optical wavelength paths capable of switching in units of optical wavelengths and having a second layer consisting of packet paths capable of switching in units of packets, said node comprising:
   a first optical switch associated with said first layer;
   a first packet switch associated with said second layer and coupled for interaction with said first optical switch;
   an establishment section which automatically establishes
     a communication path to an optical switch associated with another node based on path information extracted from an establishment request for a packet path communicated via said first packet switch, said path information including at least one of path cost, resource consumption and traffic quantity; and a section which, in regard to a request to make a new packet path, newly establishes or rearranges packet paths and optical wavelength paths according to a predetermined policy, wherein the policy includes a policy of, in regard to a request to make a new packet path: deciding whether or not it is possible to accommodate the packet path in an already established optical wavelength path of a single hop; if such accommodation is possible, thus accommodating the packet path; if it is not possible to accommodate the packet path in an already established optical wavelength path of a single hop, deciding whether or not it is possible to accommodate the packet path in an already established optical wavelength path whose hop number is within the predetermined hop number; if such accommodation is possible, thus accommodating the packet path; if it is not possible to accommodate the packet path in an already established optical wavelength path whose hop number is within a predetermined hop number, deciding whether or not it is possible to make a newly established optical wavelength path of a single hop; and, if it is possible to make the newly established optical wavelength path, accommodating the packet path in the newly established optical wavelength path.

2. A node for use in a multi-layer photonic network of the type having a first layer consisting of optical wavelength paths capable of switching in units of optical wavelengths and having a second layer consisting of packet paths capable of switching in units of packets, said node comprising:

a first optical switch associated with said first layer;

a first packet switch associated with said second layer and coupled for interaction with said first optical switch;

an establishment section which automatically establishes a communication path to an optical switch associated with another node based on path information extracted from an establishment request for a packet oath communicated via said first packet switch, said path information including at least one of path cost, resource consumption and traffic quantity; and a section which, in regard to a request to make a new packet path, newly establishes or rearranges packet paths and optical wavelength paths according to a predetermined policy, wherein the policy includes a policy of, in regard to a request to make a new packet path: deciding whether or not it is possible to accommodate the packet path in an already established optical wavelength path of a single hop; if such accommodation is possible, thus accommodating the packet path; if it is not possible to accommodate the packet path in an already established optical wavelength path of a single hop, deciding whether or not it is possible to make a newly established optical wavelength path of a single hop; if it is possible to make the newly established optical wavelength path of a single hop, accommodating the packet path in the newly established optical wavelength path; if it is not possible to make the newly established optical wavelength path, deciding whether or not it is possible to accommodate the packet path in an already established optical wavelength path whose hop number is within a predetermined hop number; and, if such accommodation is possible, thus accommodating the packet path.

3. A node for use in a multi-layer photonic network of the type having a first layer consisting of optical wavelength paths capable of switching in units of optical wavelengths and having a second layer consisting of packet paths capable of switching in units of packets, said node comprising:

a first optical switch associated with said first layer;

a first packet switch associated with said second layer and coupled for interaction with said first optical switch;

an establishment section which automatically establishes a communication path to an optical switch associated with another node based on path information extracted from an establishment request for a packet oath communicated via said first packet switch, said path information including at least one of path cost, resource consumption and traffic quantity; and a section which, in regard to a request to make a new packet path, newly establishes or rearranges packet paths and optical wavelength paths according to a predetermined policy, wherein the policy includes a policy of, in regard to a request to make a new packet path: deciding whether or not it is possible to make a newly established optical wavelength path of a single hop which accommodates the packet path; if it is possible to make the new established optical wavelength path of a single hop, newly establishing the optical wavelength path and accommodating the packet path in the newly established the optical wavelength path; if it is not possible to make the newly established optical wavelength path, deciding whether or not possible to accommodate the packet path in an already established optical wavelength path of a single hop; if such accommodation is possible, accommodating the packet path in the already established optical wavelength path; if it is not possible to accommodate the packet path in the already established optical wavelength path, deciding whether or not it is possible to accommodate the packet path in an already established optical wavelength path whose hop number is within a predetermined hop number; and, if such accommodation is possible, thus accommodating the packet path.

4. A node for use in a multi-layer photonic network of the type having a first layer consisting of optical wavelength paths capable of switching in units of optical wavelengths and having a second layer consisting of packet paths capable of switching in units of packets, said node comprising:

a first optical switch associated with said first layer;

a first packet switch associated with said second layer and coupled for interaction with said first optical switch;

an establishment section which automatically establishes a communication path to an optical switch associated with another node based on path information extracted from an establishment request for a packet path communicated via said first packet switch, said path information including at least one of path cost, resource consumption and traffic quantity; and a section which, in regard to a request to make a new packet path, newly establishes or rearranges packet paths and optical wavelength paths according to a predetermined policy, wherein the policy includes a policy of, in regard to a request to make a new packet path: deciding whether or not it is possible to accommodate the packet path by making a single newly established optical wavelength path whose hop number is within a predetermined hop number; if such accommodation is possible, accommodating the packet path in the newly established optical wavelength path, and, at this time, if a plurality of candidates for the newly established optical wavelength path are available, selecting from among the candidates the one for which, after accommodating the packet path, the path cost is the minimum; while, if it is not possible to accommodate the packet path in the single newly established optical wavelength path, deciding whether or not it is possible to accommodate the packet path by making up to M newly established optical wavelength paths whose hop number is within a predetermined hop number; and, if it is possible to make the M newly established optical wavelength paths, accommodating the packet path by distributing the packet path among the M newly established optical wavelength paths.

5. A multi-layer photonic network comprising:
a plurality of optical wavelength paths each having optical wavelength switching capability and defining nodes at the respective ends of optical transmission lines;
packet paths associated with said optical wavelength paths and having packet switching capability and defining at least one sub-network that performs switching and transfer in units of packets;
an establishment section which automatically establishes a path for an optical wavelength path based on path information extracted from an establishment request for a packet path, said path information including at least one of path cost, resource consumption and traffic quantity; and
a section which, in regard to a request to make a new packet path, newly establishes or rearranges packet paths and optical wavelength path according to a predetermined policy;
wherein the policy includes a policy of, in regard to a request to make a new packet path: deciding whether or not it is possible to accommodate the packet path in an already established optical wavelength path of a single hop; if such accommodation is possible, thus accommodating the packet path; if it is not possible to accommodate the packet path in an already established optical wavelength path of a single hop, deciding whether or not it is possible to accommodate the packet path in an already established optical wavelength path whose hop number is within a predetermined hop number; if such accommodation is possible, thus accommodating the packet path; if it is not possible to accommodate the packet path in an already established optical wavelength path whose hop number is within a predetermined hop number, deciding whether or not it is possible to make a newly established optical wavelength path of a single hop; and, if it is possible to make the newly established optical wavelength path of a single hop, accommodating the packet path in the newly established optical wavelength path.

6. A multi-layer photonic network comprising:
a plurality of optical wavelength paths each having optical wavelength switching capability and defining nodes at the respective ends of optical transmission lines;
packet paths associated with said optical wavelength paths and having packet switching capability and defining at least one sub-network that performs switching and transfer in units of packets;
an establishment section which automatically establishes a path for an optical wavelength path based on path information extracted from an establishment request for a packet path, said path information including at least one of path cost, resource consumption and traffic quantity; and
a section which, in regard to a request to make a new packet path, newly establishes or rearranges packet paths and optical wavelength path according to a predetermined policy;
wherein the policy includes a policy of, in regard to a request to make a new packet path: deciding whether or not it is possible to accommodate the packet path in an already established optical wavelength path of a single hop; if such accommodation is possible, thus accommodating the packet path; if it is not possible to accommodate the packet path in an already established optical wavelength path of a single hop, deciding whether or not it is possible to make a newly established optical wavelength path of a single hop; if it is possible to make the a newly established optical wavelength path of a single hop, accommodating the packet path in the newly established optical wavelength path; if it is not possible to make the newly established optical wavelength path, deciding whether or not it is possible to accommodate the packet path in an already established optical wavelength path whose hop number is within a predetermined hop number; and, if such accommodation is possible, thus accommodating the packet path.

7. A multi-layer photonic network comprising:
a plurality of optical wavelength paths each having optical wavelength switching capability and defining nodes at the respective ends of optical transmission lines;
packet paths associated with said optical wavelength paths and having packet switching capability and defining at least one sub-network that performs switching and transfer in units of packets;
an establishment section which automatically establishes a path for an optical wavelength path based on path information extracted from an establishment request for a packet path, said path information including at least one of path cost, resource consumption and traffic quantity; and
a section which, in regard to a request to make a new packet path newly establishes or rearranges packet paths and optical wavelength path according to a predetermined policy;
wherein the policy includes a policy of, in regard to a request to make a new packet path: deciding whether or not it is possible to make a newly established optical wavelength path of a single hop which accommodates the packet path; if it is possible to make the newly established optical wavelength path of a single hop which accommodates the packet path, newly establishing the optical wavelength path and accommodating the packet path in the newly establishing the optical wavelength path; if it is not possible to make the newly established optical wavelength path of a single hop which accommodates the packet path, deciding whether or not it is possible to accommodate the packet path in an already established optical wavelength path of a single hop; if such accommodation is possible, accommodating the packet path in the already established optical wavelength path; if it is not possible to accommodate the packet path in the already established optical wavelength path, deciding whether or not it is possible to accommodate the packet path in an already established optical wavelength path whose hop number is within a predetermined hop number; and, if such accommodation is possible, thus accommodating the packet path.

8. A multi-layer photonic network comprising:

a plurality of optical wavelength paths each having optical wavelength switching capability and defining nodes at the respective ends of optical transmission lines;

packet paths associated with said optical wavelength paths and having packet switching capability and defining at least one sub-network that performs switching and transfer in units of packets;

an establishment section which automatically establishes a path for an optical wavelength path based on path information extracted from an establishment request for a packet path, said path information including at least one of path cost, resource consumption and traffic quantity; and a section which, in regard to a request to make a new packet path, newly establishes or rearranges packet paths and optical wavelength path according to a predetermined policy;

wherein the policy includes a policy of, in regard to a request to make a new packet path: deciding whether or not it is possible to accommodate the packet path by making a single newly established optical wavelength path whose hop number is within a predetermined hop number; if such accommodation is possible, accommodating the packet path in the newly established optical wavelength path, and, at this time, if a plurality of candidates for the newly established optical wavelength path are available, selecting from among the candidates the one for which, after accommodating the packet path, the path cost is the minimum; while, if it is not possible to accommodate the packet path by making such a single newly established optical wavelength path, deciding whether or not it is possible to accommodate the packet path by making up to M newly established optical wavelength paths whose hop number is within the predetermined hop number; and, if it is possible to make the M newly established optical wavelength paths, accommodating the packet path by distributing the packet path among the M newly established optical wavelength paths.

\* \* \* \* \*